US008862903B2

(12) United States Patent
Kuno et al.

(10) Patent No.: US 8,862,903 B2
(45) Date of Patent: Oct. 14, 2014

(54) INFORMATION PROCESSING APPARATUS, INFORMATION PROCESSING METHOD AND PROGRAM

(75) Inventors: Hiroshi Kuno, Kanagawa (JP); Yoshiyuki Kobayashi, Tokyo (JP); Takamichi Hayashi, Tokyo (JP); Katsumi Muramatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 11 days.

(21) Appl. No.: 13/558,687

(22) Filed: Jul. 26, 2012

(65) Prior Publication Data

US 2013/0073871 A1  Mar. 21, 2013

(30) Foreign Application Priority Data

Sep. 15, 2011 (JP) ................... 2011-202185

(51) Int. Cl.
*G06F 12/14* (2006.01)
(52) U.S. Cl.
CPC ..................................... *G06F 12/14* (2013.01)
USPC .......................................... 713/193; 380/201
(58) Field of Classification Search
CPC ....................................................... G06F 12/14
USPC .......................................................... 173/193
See application file for complete search history.

(56) References Cited

U.S. PATENT DOCUMENTS

| 7,020,636 B2 * | 3/2006 | Ohmori et al. ................... 705/51 |
| 2010/0247074 A1 * | 9/2010 | Kimura ............................. 386/94 |

OTHER PUBLICATIONS

Yusei Nishimoto, A Digital Rights Management System for Digital Broadcasting Based on Home Servers, IEEE Transactions on Broadcasting, vol. 52, No. 2, Jun. 2006.*
Stefan Bechtold, From Copyright to Information Law. Implications of Digital Rights Management, Springer-Verlag Berlin Heidelberg 2002.*
U.S. Appl. No. 13/673,042, filed Nov. 9, 2012, Kobayashi, et al.
U.S. Appl. No. 13/593,824, filed Aug. 24, 2012, Kuno, et al.
U.S. Appl. No. 13/562,788, filed Jul. 31, 2012, Kobayashi, et al.
U.S. Appl. No. 13/463,017, filed May 3, 2012, Kuno, et al.
U.S. Appl. No. 13/556,301, filed Jul. 24, 2012, Kuno, et al.

* cited by examiner

*Primary Examiner* — Kambiz Zand
*Assistant Examiner* — Gita Faramarzi
(74) *Attorney, Agent, or Firm* — Oblon, Spivak, McClelland, Maier & Neustadt, L.L.P.

(57) ABSTRACT

An information processing apparatus, including: a data processing section reproducing contents stored in a medium having a general purpose area in which encrypted contents and utilization controlling information corresponding to the contents are stored, and a protected area configured from a plurality of blocks to which access limitation is set and which include a block in which an encryption key for decrypting the contents and information of a plurality of validity periods indicative of content utilization permission periods applied to the application contents of the encryption key are stored, wherein the data processing section acquires the utilization controlling information of a reproduction object content, extracts selection information of validity period information to be applied to the content, and decides whether or not content reproduction is to be permitted by comparison between the validity period information selected from within the block and current date information in accordance with the selection information.

16 Claims, 30 Drawing Sheets

FIG. 7

| | PROTECTED AREA | | GENERAL PURPOSE AREA |
|---|---|---|---|
| | BLOCK#0 | BLOCK#1 | |
| SERVER A | Kt(a1)-UR(a1)hash<br>Kt(a2)-UR(a2)hash<br>Kt(a3)-UR(a3)hash | --- | Con(a1)-UR(a1)<br>Con(a2)-UR(a2)<br>Con(a3)-UR(a3) |
| SERVER B | --- | Kt(b1)-UR(b1)hash<br>Kt(b2)-UR(b2)hash | Con(b1)-UR(b1)<br>Con(b2)-UR(b2) |

FIG.19

| | PROTECTED AREA | | GENERAL PURPOSE AREA |
|---|---|---|---|
| | BLOCK#0 | BLOCK#1 | |
| SERVER A | Kt(a1)-UR(a1)hash<br>Kt(a2)-UR(a2)hash<br>Kt(a3)-UR(a3)hash | --- | Con(a1)-UR(a1)<br>Con(a2)-UR(a2)<br>Con(a3)-UR(a3) |
| SERVER B | Kt(b1)-UR(b1)hash<br>Kt(b2)-UR(b2)hash | --- | Con(b1)-UR(b1)<br>Con(b2)-UR(b2) |
| SERVER C | --- | Kt(c1)-UR(c1)hash | Con(c1)-UR(c1) |
| SERVER D | --- | Kt(d1)-UR(d1)hash<br>Kt(d2)-UR(d2)hash | Con(d1)-UR(d1)<br>Con(d2)-UR(d2) |

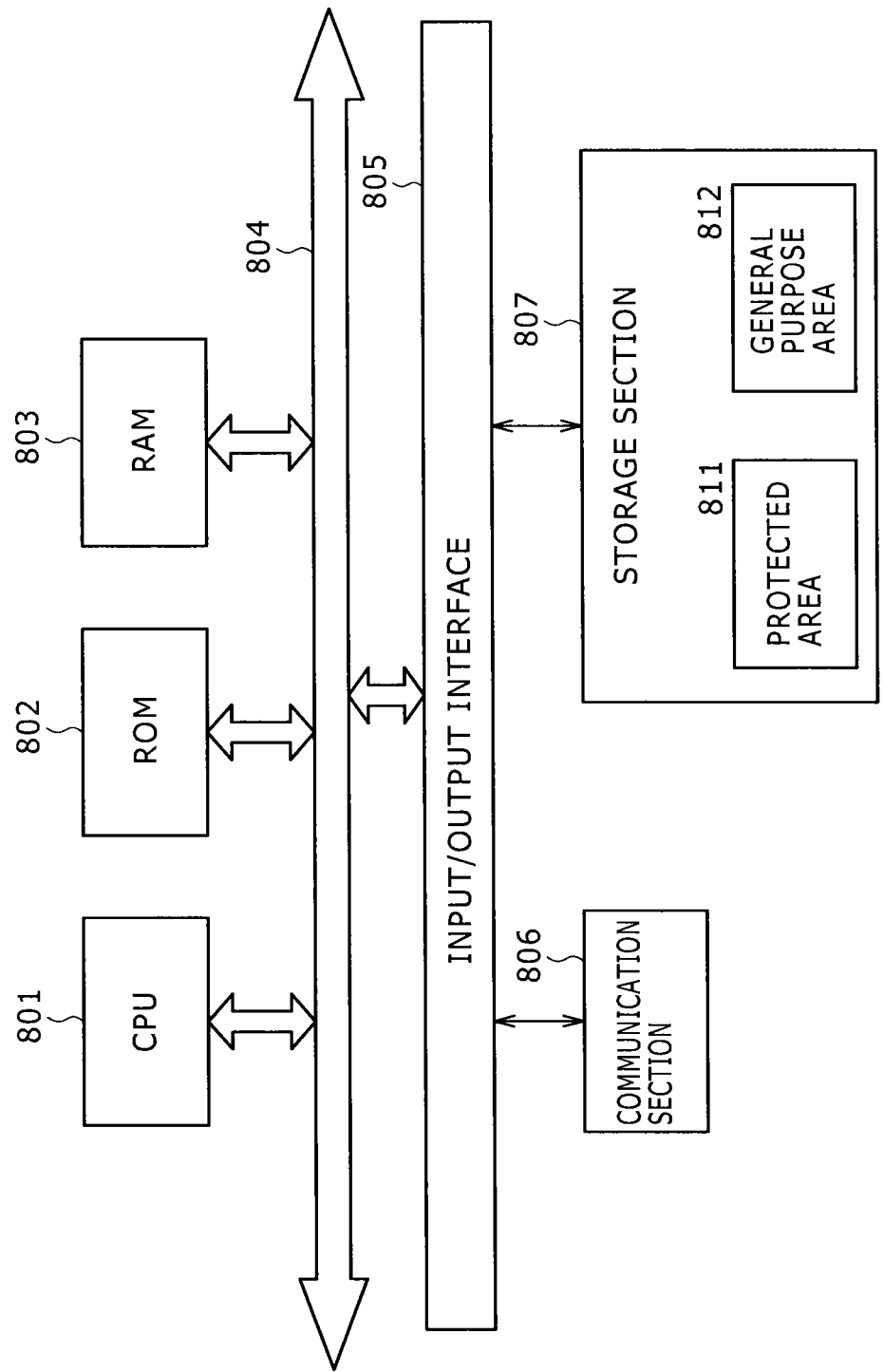

INFORMATION PROCESSING APPARATUS, INFORMATION PROCESSING METHOD AND PROGRAM

BACKGROUND

The present disclosure relates to an information processing apparatus, an information processing method and a program, and more particularly to an information processing apparatus, an information processing method and a program which carry out utilization control of a content recorded in a recording medium such as, for example, a memory card.

Recently, various media such as a DVD (Digital Versatile Disc), a Blu-ray Disk (registered trademark) and a flash memory are utilized as information recording media. Particularly in recent years, a memory card in which a flash memory having a large storage capacity is incorporated is utilized extensively. A user can record a content such as music or a movie into such various information recording media and load the media into a reproduction apparatus or player to carry out reproduction of the content.

However, in regard to many contents such as music data and image data, a copyright, a distribution right and so forth are owned by content creators or content sellers. Accordingly, when a content is to be provided to a user, usually such control as to apply fixed utilization restrictions, that is, to grant a license to utilize a content only to a user who has a legal utilization right so that disorderly utilization such as copying without permission may not be carried out is applied.

For example, as a standard relating to utilization control of contents, the AACS (Advanced Access Content System) is known. The AACS standard defines utilization control configurations for a content recorded, for example, on a Blu-ray Disc (registered trademark). In particular, the AACS standard prescribes that an encrypted content is applied as a content to be recorded, for example, on a Blue-ray Disc (registered trademark) and prescribes an algorithm and so forth for making it possible to restrict a user who can acquire an encryption key of the content only to an authorized user. The process is disclosed, for example, in Japanese Patent Laid-Open No. 2008-98765.

As the utilization control configuration of a content, for example, a configuration which utilizes utilization controlling information (Usage Rule) corresponding to a content is available in addition to content encryption.

For example, when a content is provided to a user, information relating to a permissible utilization form of the content such as, for example, information regarding a utilization period of the content or utilization controlling information (Usage Rule) in which permission information of a copy process or the like is recorded is provided additionally.

When the content is to be utilized on a reproduction apparatus of the user, the utilization controlling information corresponding to the content is referred to such that utilization of the content is carried out within a range prescribed by the utilization controlling information (Usage Rule).

However, in recent years, a content acquisition process from a server and so forth has become popular, and the recording capacity of recording media utilized in the user apparatus has increased and the number of contents retained by the user apparatus has increased rapidly.

In the user apparatus which retains such a large number of contents, a large number of pairs of a content and utilization controlling information corresponding to the content are retained.

For example, in the utilization controlling information (Usage Rule), a utilization permission period of the content associated with the utilization controlling information, that is, validity period information, is recorded.

When the user wants to extend the utilization period of the content, a process for rewriting the validity period of the utilization controlling information (Usage Rule) corresponding to the content is required. This rewriting process cannot be executed arbitrarily by the user apparatus but is carried out by a content management server or the like.

In order to extend the validity period of a large number of contents, a process for rewriting a large number of pieces of the utilization controlling information (Usage Rule) one by one is required. This increases the communication process between the user apparatus and the server and increases the processing load to them.

SUMMARY

Thus, it is desirable to provide an information processing apparatus, an information processing method and a program which make it possible to efficiently execute change of a utilization permission period or an updating process of a content of a utilization management object to enhance the convenience in content utilization control.

According to an embodiment of the present disclosure, there is provided an information processing apparatus, including: a data processing section configured to reproduce contents stored in a medium. The medium includes a general purpose area in which encrypted contents and utilization controlling information corresponding to the encrypted contents are stored, and a protected area configured from a plurality of blocks to which access limitation is set and which include a block in which an encryption key for decrypting the encrypted contents and information of a plurality of validity periods indicative of content utilization permission periods applied to the application contents of the encryption key are stored. The data processing section is operable to acquire the utilization controlling information of a reproduction object content from the general purpose area, extract selection information of validity period information to be applied to the reproduction object content from within the information of the validity periods recorded in the block from the utilization controlling information, and decide whether or not content reproduction is to be permitted by comparison between the validity period information selected from within the block and current date information in accordance with the selection information.

The information processing apparatus may be configured such that the utilization controlling information has stored therein a block identifier of the block in which the encryption key for decrypting the encrypted contents is stored, and an identifier of the validity period information to be applied to the reproduction object content; the data processing section selects one block from within the protected area based on the block identifier; and the data processing section selects validity period information to be applied to the reproduction object content from within the information of the validity periods recorded in the selected block based on the identifier of the validity period information.

The information processing apparatus may be configured such that the validity period information recorded in the block in which the encryption key for decrypting the encrypted contents is stored and to which access limitation is set is applied commonly to a plurality of contents corresponding to a plurality of encryption keys recorded in the block.

The information processing apparatus may be configured such that the information of the validity periods recorded in the block includes validity period information for permitting content utilization on and after a prescribed date and validity period information for permitting content utilization on and before another prescribed date.

The information processing apparatus may be configured such that the data processing section carries out a process to which current date information acquired from a reliable time information providing server is applied when the comparison process between validity period information acquired from the utilization controlling information or the block and the current date information is carried out.

The information processing apparatus may be configured such that the block in which the encryption key is stored is a block access to which is permitted based on access privilege decision by the medium; and upon a data reading out process of the block, the data processing section transmits a certificate of the information processing apparatus to the medium and carries out data reading out of the block taking it as a condition that a data reading out privilege is confirmed by the access privilege decision by the medium.

The information processing apparatus may be configured such that the block in which the encryption key is stored is a block access to which is permitted based on access privilege decision by the medium; and the validity period information recorded in the block is written and updated by a server which has a privilege of a data writing process into the block.

According to a second embodiment of the present disclosure, there is provided an information processing apparatus including a data processing section configured to record a content into a medium. The medium has a general purpose area in which encrypted contents and utilization controlling information corresponding to the encrypted contents are stored and a protected area configured from a plurality of blocks to which access limitation is set and which include a block in which an encryption key for decrypting the encrypted contents and information of a plurality of validity periods indicative of content utilization permission periods applied to the application contents of the encryption key are stored. The data processing section carries out a process for recording an encrypted content and utilization controlling information corresponding to the encrypted content into the general purpose area; records an encryption key for decrypting encrypted contents recorded in the general purpose area into a block of the protected area; and carries out a process for setting an identifier of validity period information to be selectively applied from within the information of the validity periods recorded in the block of the protected area to the utilization controlling information to be recorded into the general purpose area.

The information processing apparatus may be configured such that the block in which the encryption key is stored is a block access to which is permitted based on access privilege decision by the medium; and upon a data recording process into the block, the data processing section transmits a certificate of the information processing apparatus to the medium and carries out the data recording process into the block taking it as a condition that it is confirmed that the information processing apparatus has a privilege of a data recording process by the access privilege decision by the medium.

According to a third embodiment of the present disclosure, there is provided an information storage apparatus, including: a data storage section. The data storage section includes a general purpose area in which encrypted contents and utilization controlling information corresponding to the encrypted contents are stored; and a protected area configured from a plurality of blocks to which access limitation is set and which include a block in which an encryption key for decrypting the encrypted contents and information of a plurality of validity periods indicative of content utilization permission periods applied to the application contents of the encryption key are stored. The utilization controlling information has stored therein a block identifier of the block in which the encryption key for decrypting the encrypted contents is stored, and an identifier of validity period information to be applied to a reproduction object content. The information processing apparatus causes a reproduction apparatus, which executes a reproduction process of the encrypted contents, to execute selection of the storage block of the encryption key and selection of validity period information to be applied based on recorded data of the utilization controlling information and carry out content reproduction permission/inhibition decision based on a referencing process to the selected validity period information.

The information storage apparatus may further include a data processing section configured to acquire a certificate of an access requesting apparatus to a block of the protected area and carry out an access permission decision process based on the acquired certificate.

According to a fourth embodiment of the present disclosure, there is provided an information processing system, including: a medium configured to record data therein; a reproduction apparatus configured to reproduce contents stored in the medium; and a server configured to carry out data recording into the medium. The medium includes a general purpose area in which encrypted contents and utilization controlling information corresponding to the encrypted contents are stored, and a protected area configured from a plurality of blocks to which access limitation is set and which include a block in which an encryption key for decrypting the encrypted contents and information of a plurality of validity periods indicative of content utilization permission periods applied to the application contents of the encryption key are stored. The server is operable to carry out a process for recording the encrypted contents and the utilization controlling information corresponding to the encrypted contents into the general purpose area, record the encryption key for decrypting the encrypted contents recorded in the general purpose area into a block of the protected area, and carry out a process for setting an identifier of the validity period information to be selectively applied from within the information of the validity periods recorded in the block of the protected area to the utilization controlling information to be recorded into the general purpose area. The reproduction apparatus is operable to acquire the utilization controlling information corresponding to the contents from the general purpose area, extract selection information of the validity period information to be applied to a reproduction object content from within the information of the validity periods recorded in the block from the utilization controlling information, and decide whether or not content reproduction is to be permitted based on comparison between the validity period information selected from within the block and current date information in accordance with the selection information.

According to a fifth embodiment of the present disclosure, there is provided an information processing method executed by an information processing apparatus which executes a content reproduction process and has a data processing section configured to reproduce contents stored in a medium. The medium has a general purpose area in which encrypted contents and utilization controlling information corresponding to the encrypted contents are stored and a protected area configured from a plurality of blocks to which access limitation is set and which include a block in which an encryption key for decrypting the encrypted contents and information of a plurality of validity periods indicative of content utilization permission periods applied to application contents of the encryption key are stored. The information processing method is executed by the data processing section and includes: acquiring the utilization controlling information of a reproduction object content from the general purpose area; extracting selection information of validity period information to be applied to the reproduction object content from within the information of the validity periods recorded in the block from the utilization controlling information; and deciding whether or not content reproduction is to be permitted based on comparison between the validity period information selected from within the block and current date information in accordance with the selection information.

According to a sixth embodiment of the present disclosure, there is provided an information processing method executed by an information processing apparatus which carries out a content recording process into a medium. The medium has a general purpose area in which encrypted contents and utilization controlling information corresponding to the encrypted contents are stored and a protected area configured from a plurality of blocks to which access limitation is set and which include a block in which an encryption key for decrypting the encrypted contents and information of a plurality of validity periods indicative of content utilization permission periods applied to application contents of the encryption key are stored. The information processing method is executed by the information processing apparatus and includes: carrying out a process for recording an encrypted content and utilization controlling information corresponding to the encrypted content into the general purpose area; recording an encryption key for decrypting encrypted contents recorded in the general purpose area into a block in the protected area; and carrying out a process for setting an identifier of validity period information to be selectively applied from within the information of the validity periods recorded in the block of the protected area to the utilization controlling information to be recorded into the general purpose area.

According to a seventh embodiment of the present disclosure, there is provided a program for causing an information process to be executed by an information processing apparatus which executes a content reproduction process and has a data processing section configured to reproduce contents stored in a medium. The medium has a general purpose area in which encrypted contents and utilization controlling information corresponding to the encrypted contents are stored and a protected area configured from a plurality of blocks to which access limitation is set and which include a block in which an encryption key for decrypting the encrypted contents and information of a plurality of validity periods indicative of content utilization permission periods applied to application contents of the encryption key are stored. The program causes the data processing section to execute: a process for acquiring the utilization controlling information of a reproduction object content from the general purpose area; a process for extracting selection information of validity period information to be applied to the reproduction object content from within the information of the validity periods recorded in the block from the utilization controlling information; and a process for deciding whether or not content reproduction is to be permitted based on comparison between the validity period information selected from within the block and current date information in accordance with the selection information.

According to an eighth embodiment of the present disclosure, there is provided a program for causing an information process to be executed by an information processing apparatus which carries out a content recording process into a medium. The medium has a general purpose area in which encrypted contents and utilization controlling information corresponding to the encrypted contents are stored and a protected area configured from a plurality of blocks to which access limitation is set and which include a block in which an encryption key for decrypting the encrypted contents and information of a plurality of validity periods indicative of content utilization permission periods applied to application contents of the encryption key are stored. The program causes the information processing apparatus to execute: a process for recording an encrypted content and utilization controlling information corresponding to the encrypted content into the general purpose area; a process for recording an encryption key for decrypting encrypted contents recorded in the general purpose area into a block in the protected area; and a process for setting an identifier of validity period information to be selectively applied from within the information of the validity periods recorded in the block of the protected area to the utilization controlling information to be recorded into the general purpose area.

It is to be noted that the programs of the present disclosure can be provided, for example, through a storage medium or a communication medium which is provided in a computer-readable form to an information processing apparatus or a computer system which can execute various program codes. By providing such programs in a computer-readable form, processes in accordance with the programs are implemented on the information processing apparatus or the computer system.

With the configurations of the embodiments of the present disclosure, apparatus and methods wherein validity period information corresponding to a block is set to an encryption key storage block of contents stored in a medium and setting and updating of a collective validity period of a plurality of contents can be carried out are implemented.

In particular, a content stored in a medium having a general purpose area in which encrypted contents and utilization controlling information are stored and a protected area configured from a plurality of blocks to which access limitation is set and which includes a block in which an encryption key for decrypting the encypted contents is stored is reproduced. A reproduction apparatus acquires the utilization controlling information corresponding to a content from the general purpose area. Then, the reproduction apparatus decides, based on the recorded data of the utilization controlling information, whether validity period information indicative of a content utilization permission period is to be acquired from the utilization controlling information or the block in which the encryption key is stored. Then, the reproduction apparatus acquires the validity period information from the utilization controlling information or the block in response to a result of the decision and then decides permission or inhibition of content reproduction by comparison between the acquired validity period information and current date information.

By the processes, apparatus and methods which can set block-corresponding validity period information to the encryption key storage block of a content stored in the medium and carry out setting and updating of a collective validity period of a plurality of contents are implemented.

The above and other features and advantages of the present disclosure will become apparent from the following description and the appended claims, taken in conjunction with the accompanying drawings in which like parts or elements denoted by like reference characters. It is to be noted that, in the present specification, the term "system" is used to represent a logical aggregate configuration of a plurality of appa-

BRIEF DESCRIPTION OF THE DRAWINGS

FIG. 7 is a view illustrating an example of stored data of the memory card;

FIG. 19 is a view illustrating an example of recording data in the case where one block is utilized by a plurality of servers in the configuration wherein validity period information corresponding to a plurality of blocks is set to one block;

FIG. 30 is a block diagram showing an example of a hardware configuration of the memory card.

DETAILED DESCRIPTION OF THE PREFERRED EMBODIMENTS

In the following, details of an information processing apparatus, an information processing method and a program according to the present disclosure are described with reference to the accompanying drawings. It is to be noted that the description is given in accordance with the following items.

1. Outline of a Content Providing Process and a Content Utilization Process

2. Example of the Configuration and Example of the Utilization of a Memory Card

3. Certificate Having Access Permission Information to a Protected Area

4. Example of an Accessing Process to a Memory Card to Which Certificates for Different Apparatus Are Applied 5. Example of a Process of Setting Validity Period Information in a Unit of a Block 6. Example of a Coexistence Utilization Process of Validity Period Information in a Unit of a Block and Validity Period Information of Utilization Controlling Information 7. Example of a Process of Setting Information of a Plurality of Validity Periods to a Block and Selectively Applying the Information in response to a Content 8. Example of a Processing of Recording First Time Utilization Information of a Content 9. Move Process of a Content between Media 10. Example of the Hardware Configuration of the Apparatus 11. Summary of the Configuration of the Present Disclosure 1. Outline of a Content Providing Process and a Content Utilization Process In the following, details of the information processing apparatus, information processing method and program of the present disclosure are described with reference to the drawings.

First, an outline of a content providing process and a content utilization process is described with reference to FIG. 1 and so forth.

Figure 1:
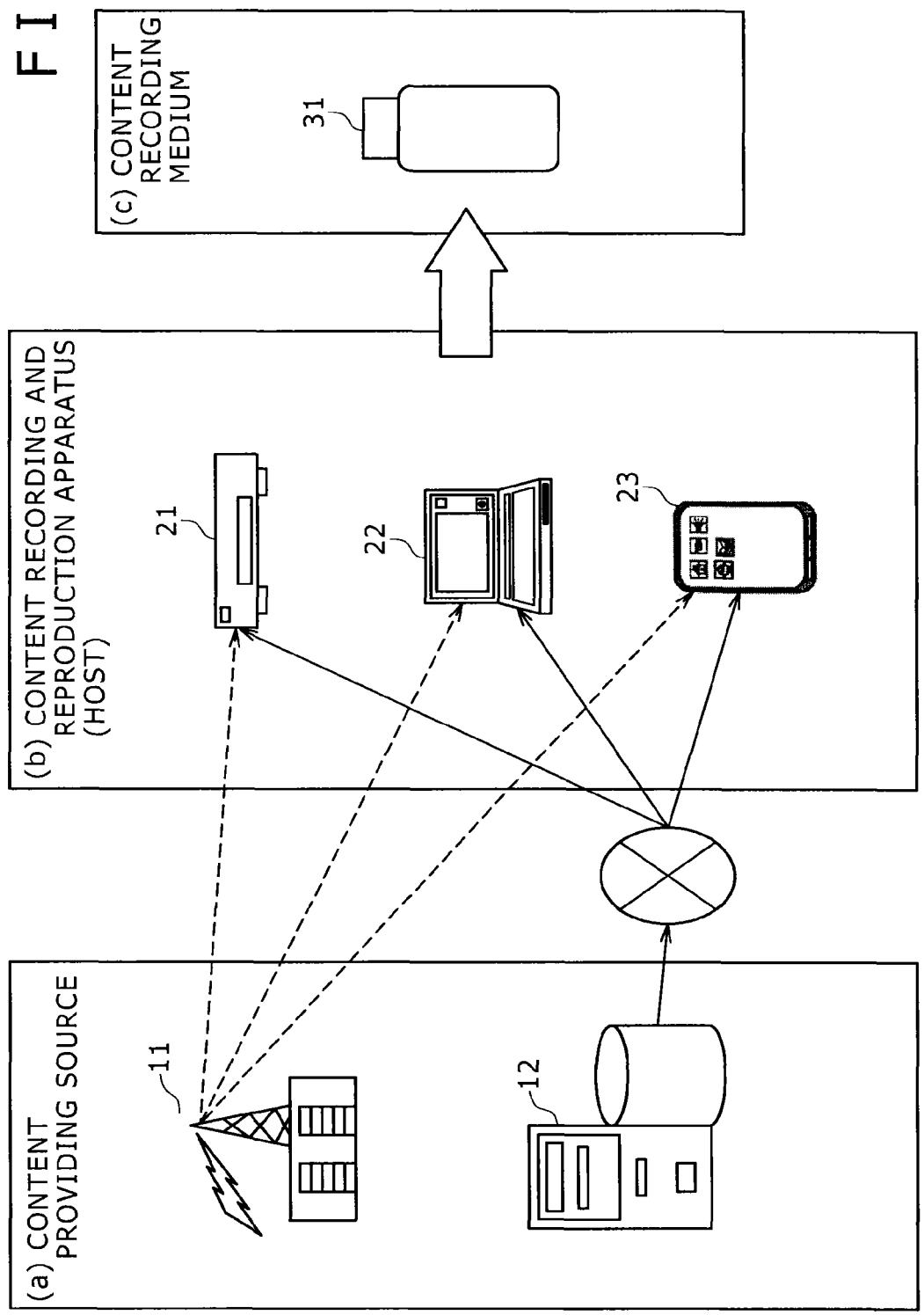
FIG. 1 is a schematic view illustrating an outline of a content providing process and a content utilization process.

FIG. 1 shows, from the left, (a) a content providing source, (b) a content recording and reproduction apparatus (host), and (c) a content recording medium.

The (c) content recording medium is a medium into or on which a content is recorded by a user and which is utilized for a reproduction process of the content. Here, the content recording medium indicates a memory card 31 which is an information recording device such as, for example, a flash memory.

The user would record various contents such as music and movies into the memory card 31 and utilize them. The contents include those contents which become an object of utilization control such as, for example, those contents which become an object of management of the copyright.

The contents which become an object of utilization control are, for example, contents with regard to which unregulated copying, unregulated copy data distribution and so forth are inhibited, contents with regard to which the period of utilization is limited and like contents. It is to be noted that, when a utilization controlled content is recorded into the memory card 31, utilization controlling information (Usage Rule) corresponding to the content is recorded together.

In the utilization controlling information (Usage Rule), information relating to content utilization such as, for example, a permitted content utilization period and a permitted copy time number is recorded.

The content providing source provides utilization controlling information corresponding to a content together with the content.

The (a) content providing source is a providing source of contents such as music or movies. In FIG. 1, a broadcasting station 11 and a content server 12 are shown as examples of the content providing source.

The broadcasting station 11 is, for example, a television broadcasting station and provides various broadcasting contents to a user apparatus such as the "(b) content recording and reproduction apparatus (host)" on a ground wave or a satellite wave through a satellite.

The content server 12 is a server which provides contents such as music or movies through a network such as the Internet.

The user can load, for example, the memory card 31, which is the (c) content recording medium, into the (b) content recording and reproduction apparatus (host) and record a content provided from the broadcasting station 11 or the content server 12 into the memory card 31. The content can be received by a reception section of the (b) content recording and reproduction apparatus (host) itself or by a reception apparatus connected to the (b) content recording and reproduction apparatus (host).

The (b) content recording and reproduction apparatus (host) is loaded with the memory card 31, which is the (c) content recording medium, and records a content received from the broadcasting station 11 or the content server 12, each of which is the (a) content providing source, into the memory card 31.

As the (b) content recording and reproduction apparatus (host), a recording and reproduction apparatus (CE apparatus: Consumer Electronics apparatus) 21 including a disk such as a hard disk, a DVD (Digital Versatile Disk) or a BD such as, for example, a DVD player is available. Further, a PC (Personal Computer) 22 and a portable terminal 23 such as a smartphone, a portable telephone set, a portable player or a tablet terminal are available. All of them are apparatus which can load therein the memory card 31 which is the (c) content recording medium.

The user would utilize the recording and reproduction apparatus 21, PC 22, portable terminal 23 or the like to receive a content such as music or a movie from the broadcasting station 11 or the content server 12 and record the received content into the memory card 31.

A utilization pattern of a content recorded in the memory card 31 is described with reference to FIG. 2.

The memory card 31, which is an information recording device, is a recording medium which can be removably loaded into a content reproduction apparatus such as, for example, a PC. The memory card 31 can be freely unloaded from the apparatus by which content recording has been executed and then loaded into another user apparatus.

Figure 2:
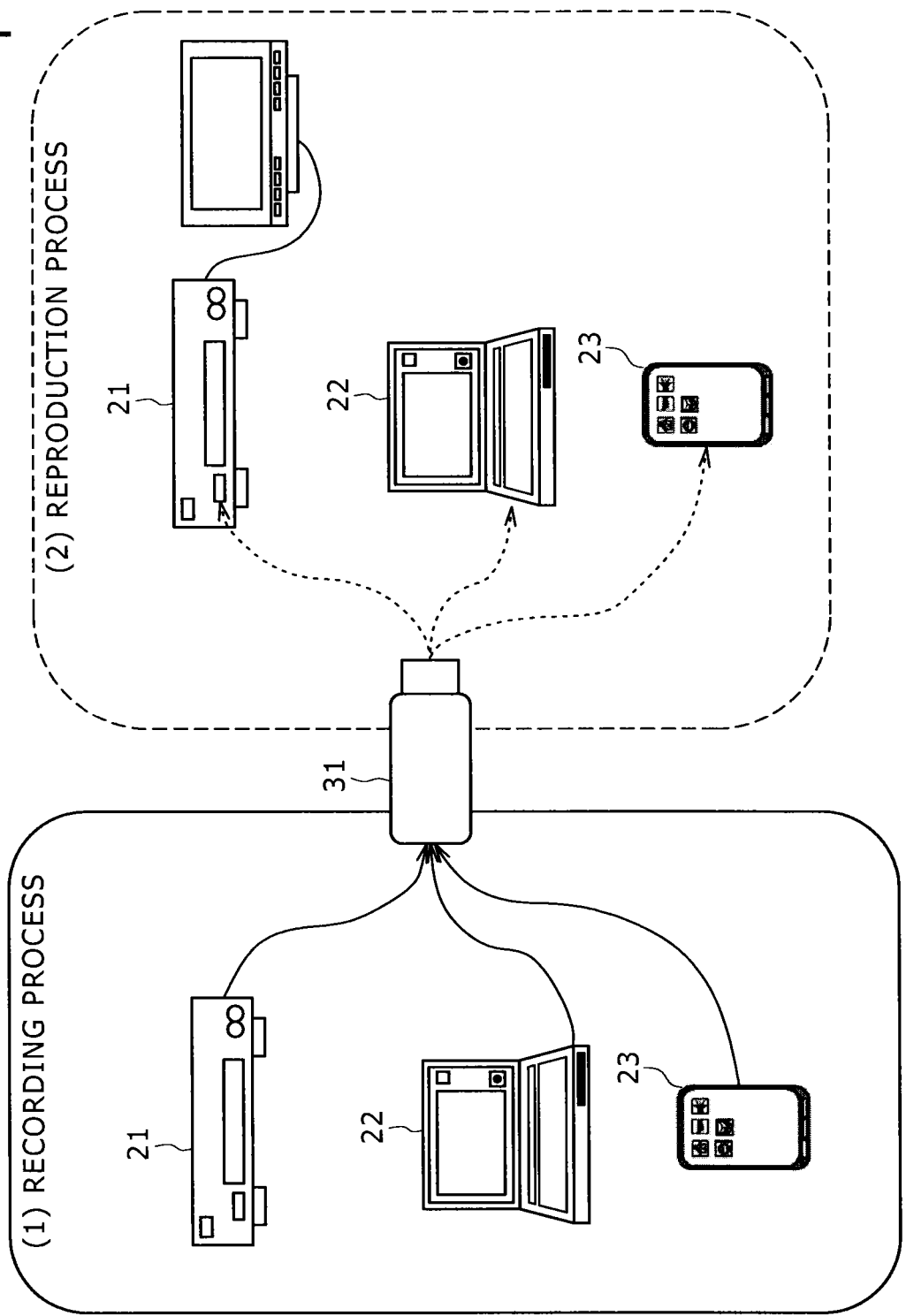
FIG. 2 is a schematic view illustrating a utilization form of a content recorded in a memory card.

In particular, as seen in FIG. 2, the memory card 31 executes such processes as
 (1) a recording process, and
 (2) a reproduction process.
It is to be noted that an apparatus which executes only one of recording and reproduction may be applied.

Further, it is not essentially required for a single apparatus to execute both of recording and reproduction processes, but the user may selectively use a recording apparatus and a reproduction apparatus freely.

It is to be noted that, in most cases, a utilization controlled content recorded in the memory card 31 is recorded as an encrypted content, and a content reproduction apparatus such as the recording and reproduction apparatus 21, PC 22 or portable terminal 23 first executes a decryption process in accordance with a predetermined sequence and then carries out reproduction of the content.

Further, the content reproduction apparatus carries out a reproduction process and so forth in a permitted utilization pattern recorded in the utilization controlling information (Usage Rule) set corresponding to the content.

In the (b) content recording and reproduction apparatus (host), a program or host application for executing content utilization and content decryption processes in accordance with the utilization controlling information (Usage Rule) is stored. The content reproduction is executed in accordance with the program or host application.

2. Example of the Configuration and Example of the Utilization of a Memory Card

Now, an example of a configuration and an example of utilization of a memory card such as a flash memory used as a recording medium for a content are described.

Figure 3:
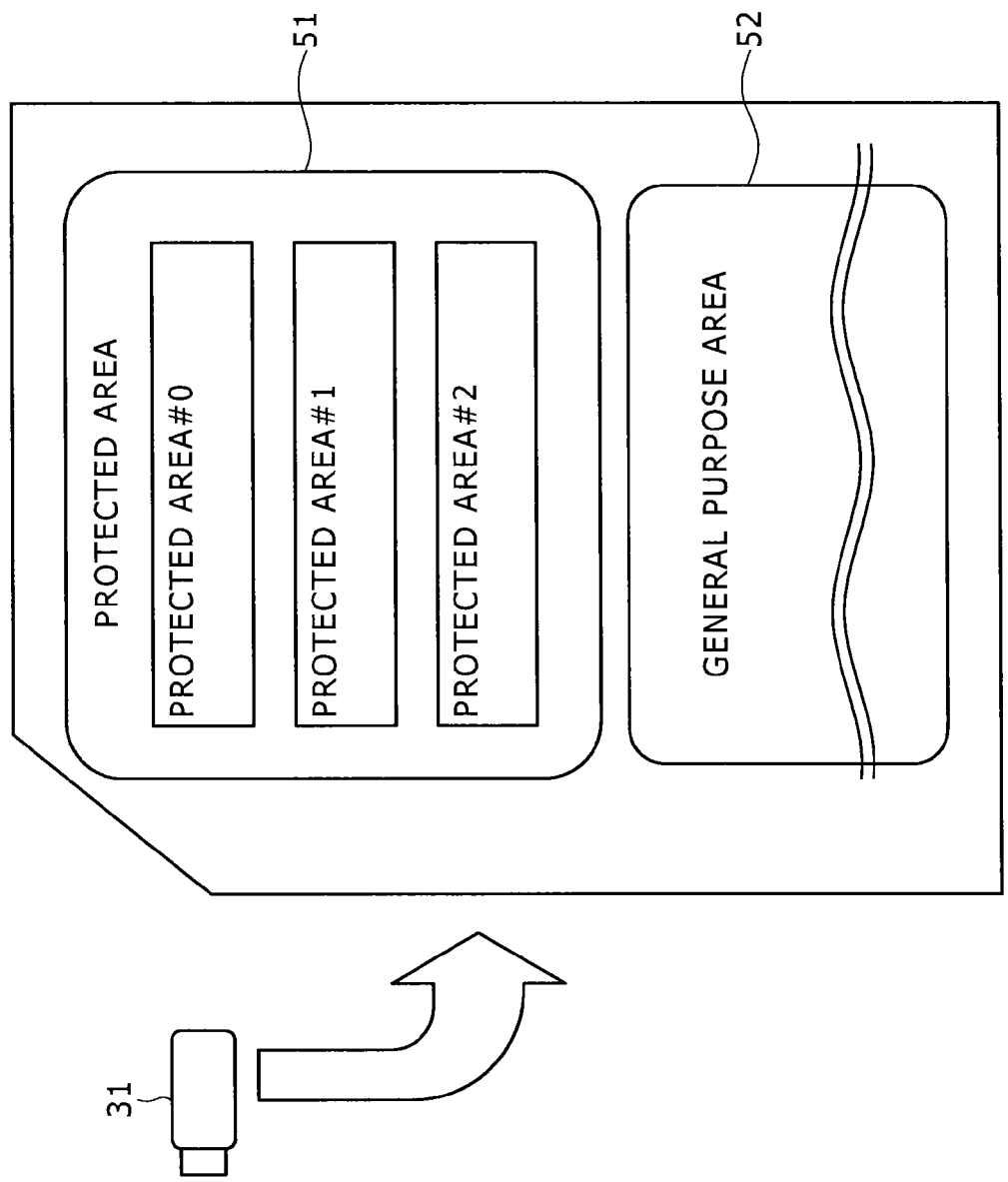
FIG. 3 is a view illustrating an example of a particular configuration of a storage area of the memory card.

An example of the particular configuration of a storage area of the memory card 31 is illustrated in FIG. 3.

Referring to FIG. 3, the storage area of the memory card 31 is configured from two areas including
 (a) a protected area 51, and
 (b) a general purpose area 52.

The general purpose area 52 is an area which can be accessed freely by a recording and reproduction apparatus used by the user, and contents, utilization controlling information (Usage Rule) corresponding to the contents, other general content management data and so forth are recorded in the general purpose area 52.

The general purpose area 52 is an area into and from which data can be written or read out freely by a server, a recording and reproduction apparatus of the user or the like.

Meanwhile, the protected area 51 is an area which does not permit free accessing thereto.

The protected area 51 is divided into blocks #0, #1, #2, . . . as a plurality of partitioned areas, and an access privilege is set in a unit of a block.

For example, if it is tried to carry out writing or reading of data by means of a recording and reproduction apparatus used by the user or a server or the like connected to the recording and reproduction apparatus through a network, then a data processing section of the memory card 31 determines whether such reading (Read) or writing (Write) is to be permitted or inhibited in a unit of a block in response to the apparatus in accordance with the program stored in advance in the memory card 31.

The memory card 31 includes a data processing section for executing a program stored in advance and an authentication processing section for executing an authentication process. The memory card 31 first carries out an authentication process with regard to an apparatus which tries to execute writing or reading of data into or from the memory card 31.

At this stage of the authentication process, the memory card 31 receives an apparatus certificate such as a public key certificate from the opposite apparatus, that is, the access requesting apparatus.

For example, if the access requesting apparatus is a server, then the memory card 31 receives a server certificate owned by the server and uses information described in the certificate to decide whether or not access is to be permitted in a unit of a block or partitioned area of the protected area 51.

On the other hand, if the access requesting apparatus is a host apparatus such as, for example, a recording and reproduction apparatus (host) as a user apparatus which executes content recording or reproduction, then the memory card 31 receives a host certificate owned by the recording and reproduction apparatus or host apparatus. Then, the memory card 31 uses information described in the received certificate to decide whether or not access to each of the blocks or partitioned areas of the protected area 51 is to be permitted.

The access privilege decision process is carried out in a unit of a block in the protected area 51 illustrated in FIG. 3, that is, for the individual areas #0, #1, #2, . . . . The memory card 31 allows the server or the host to execute only a process (process such as reading/writing of data) permitted in a unit of a block.

Read/write limiting information (PAD Read/PAD Write) from/to a medium is set, for example, in a unit of an apparatus which tries to access the medium such as, for example, in a unit of a content server or a recording and reproduction apparatus or host apparatus. Such information is recorded into a server certificate or a host certificate corresponding to each apparatus.

It is to be noted that "certificate" may be abbreviated as "cert" in the accompanying drawings.

In this manner, the memory card 31 carries out a process of verifying recorded data of a server certificate or a host certificate and permitting access only to an area access to which is permitted in accordance with a prescribed program stored in advance in the memory card 31.

3. Certificate Having Access Permission Information to a Protected Area

Now, examples of the configuration of a certificate whose presentation to the memory card 31 is required when a server or a host apparatus which is a recording and reproduction apparatus and is a user apparatus is to be accessed to the protected area 51 of the memory card 31 are described with reference to FIGS. 4 and 5.

As described hereinabove, the memory card 31 carries out an authentication process with regard to an apparatus which tries to execute writing or reading of data into or from the memory card 31. At this stage of the authentication process, the memory card 31 receives an apparatus certificate such as a public key certificate such as, for example, a server certificate or a host certificate from the opposite apparatus, that is, the access requesting apparatus. Then, the memory card 31 uses information described in the received certificate to decide whether or not the access to each partitioned area of the protected area 51 is to be permitted.

An example of a configuration of a host certificate stored in the user apparatus or host apparatus such as the recording and reproduction apparatus 21, PC 22 or portable terminal 23 shown in FIG. 1 as an example of the apparatus certificate used in the authentication process is described with reference to FIG. 4.

The host certificate is provided to each user apparatus or host apparatus by the certificate authority which is the main constituent of issuance of a public key certificate. For example, the host certificate is a certificate for a user apparatus issued to a user apparatus or host apparatus whose content utilization process is permitted by the certificate authority and has a public key and so forth contained therein. In the host certificate, a signature is set by an authentication authority secret key and is configured as data whose falsification is prevented.

It is to be noted that the apparatus certificate can be stored into a memory in the apparatus in advance based on apparatus confirmation of a type of the apparatus or the like, for example, upon fabrication of the apparatus. If the user acquires the apparatus certificate after it purchases the apparatus, then a confirmation process of the apparatus type, a type of usable contents and so forth in accordance with a predetermined sequence between the apparatus and the authentication authority or some other management authority may be carried out. Then, the apparatus certificate may be issued to each apparatus and stored into the memory in the apparatus.

It is to be noted that a server for carrying out access to the protected area of the memory card 31 retains a server certificate in which a server public key and access permission information to the memory card are recorded and which has a configuration similar to that of the host certificate.

Figure 4:
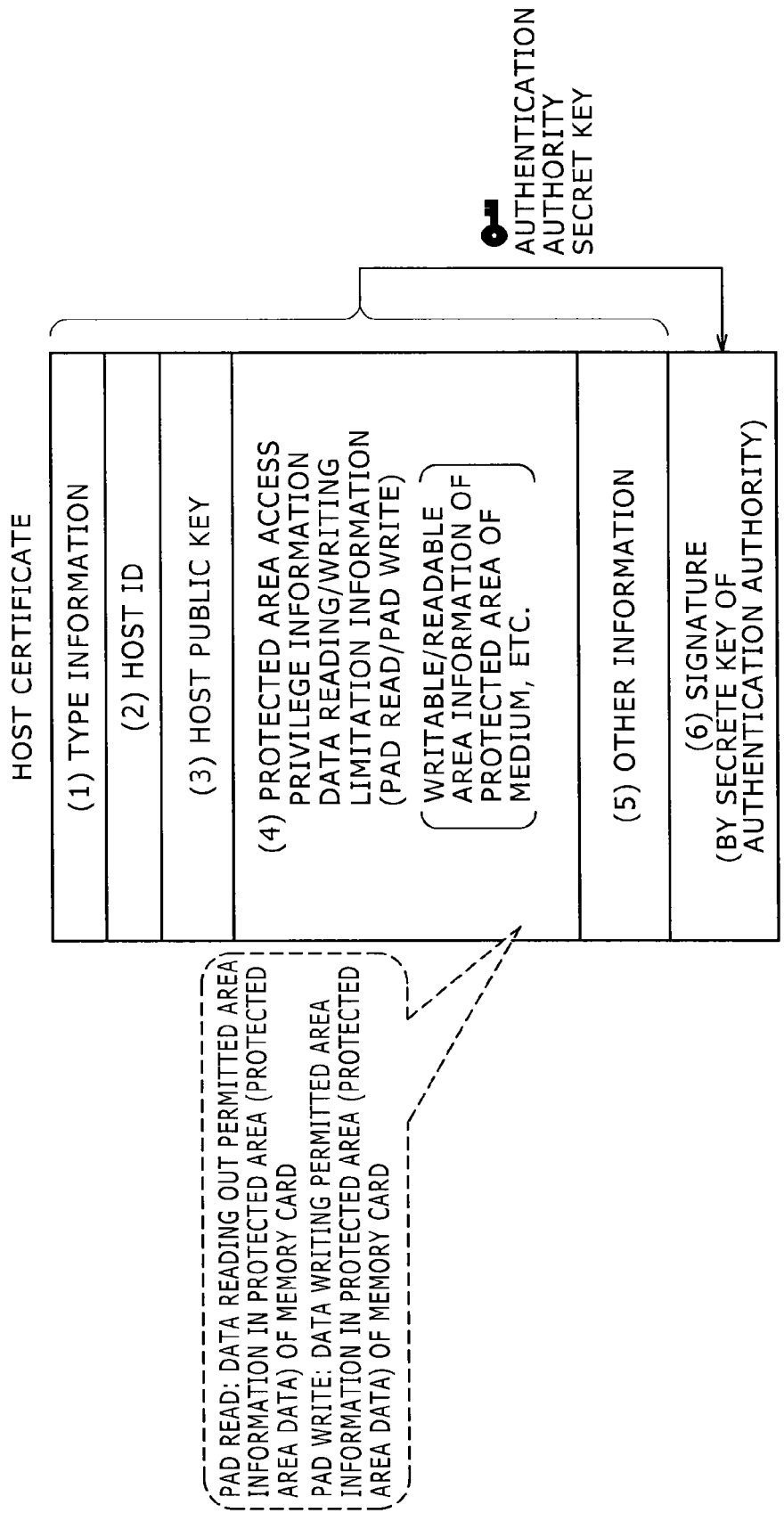
FIG. 4 is a view illustrating a host certificate.

FIG. 4 illustrates a particular example of the host certificate provided to each host apparatus or user apparatus by the authentication authority.

The host certificate includes the following data as seen in FIG. 4:

(1) type information,
(2) host ID or user apparatus ID,
(3) host public key,
(4) protected area access privilege information (read/write limitation information from/into a protected area of a medium (PAD Read/PAD Write)),
(5) other information, and
(6) signature.

In the following, the data (1) to (6) mentioned above are described.

(1) Type Information

The type information is information representative of a type of a certificate or a type of a user apparatus. In the Type information, information such as, for example, data indicating that the pertaining certificate is a host certificate and a type of the apparatus like the information that the apparatus is a PC or a music reproduction player is recorded.

(2) Host ID

The host ID is an area into which an apparatus ID is to be recorded as apparatus identification information.

(3) Host Public Key

The host public key is a public key of the host apparatus. The Host public key configures a key pair in accordance with the public key method together with a secret key provided to the host apparatus or user apparatus.

(4) Protected Area Access Privilege Information (Read/Write Limitation Information from/into a Protected Area of a Medium (PAD Read/PAD Write))

In the protected area access privilege information, information in a unit of a block or partitioned area from and into which data reading (Read) or writing (Write) is permitted in the protected area 51 set in the storage area of a medium in which a content is recorded such as, for example, the memory card 31 shown in FIG. 3 is recorded.

The access privilege is recorded as an access privilege in a unit of a block or partitioned area in the protected area.

(5) Other Information and (6) Signature

In the host certificate, various kinds of information are recorded in addition to the information (1) to (4) described above, and particularly, signature data regarding the information of (1) to (5) is recorded.

The signature is executed by a secret key of the authentication authority. When information recorded in the host certificate, for example, the host public key, is to be taken out and used, a signature verification process to which the public key of the authentication authority is applied is executed to confirm that the host certification does not undergo any falsification. Taking that this confirmation is made successfully as a condition, utilization of the certificate stored data such as the host public key is carried out.

FIG. 4 illustrates the host certificate in which access permission information of the user apparatus or host apparatus to the protected area of the memory card is recorded. However, to a server necessitated to access the protected area such as, for example, a content providing server which provides a content to the memory card, a certificate in which access permission information to the protected area of the memory card is recorded, that is, a server certificate such as, for example, a public key certificate in which a server public key is stored, similarly to the host certificate illustrated in FIG. 4, is provided.

An example of the configuration of a server certificate provided to a server is described with reference to FIG. 5. It is to be noted that, in the following description, a server includes all content providing sources shown in FIG. 1, or in other words, includes any apparatus which provides a content to the user apparatus such as the broadcasting station 11 and the content server 12.

The server certificate is provided, for example, from an authentication authority which is a main constituent which issues a public key certificate to an apparatus which carries out content provision such as a content server. For example, the server certificate is a certificate of a server which is issued to a server whose content providing process is admitted by the authentication authority and in which a server public key and so forth are stored. To the server certificate, a signature is set by an authentication authority secret key and configured as data whose falsification is prevented.

Figure 5:
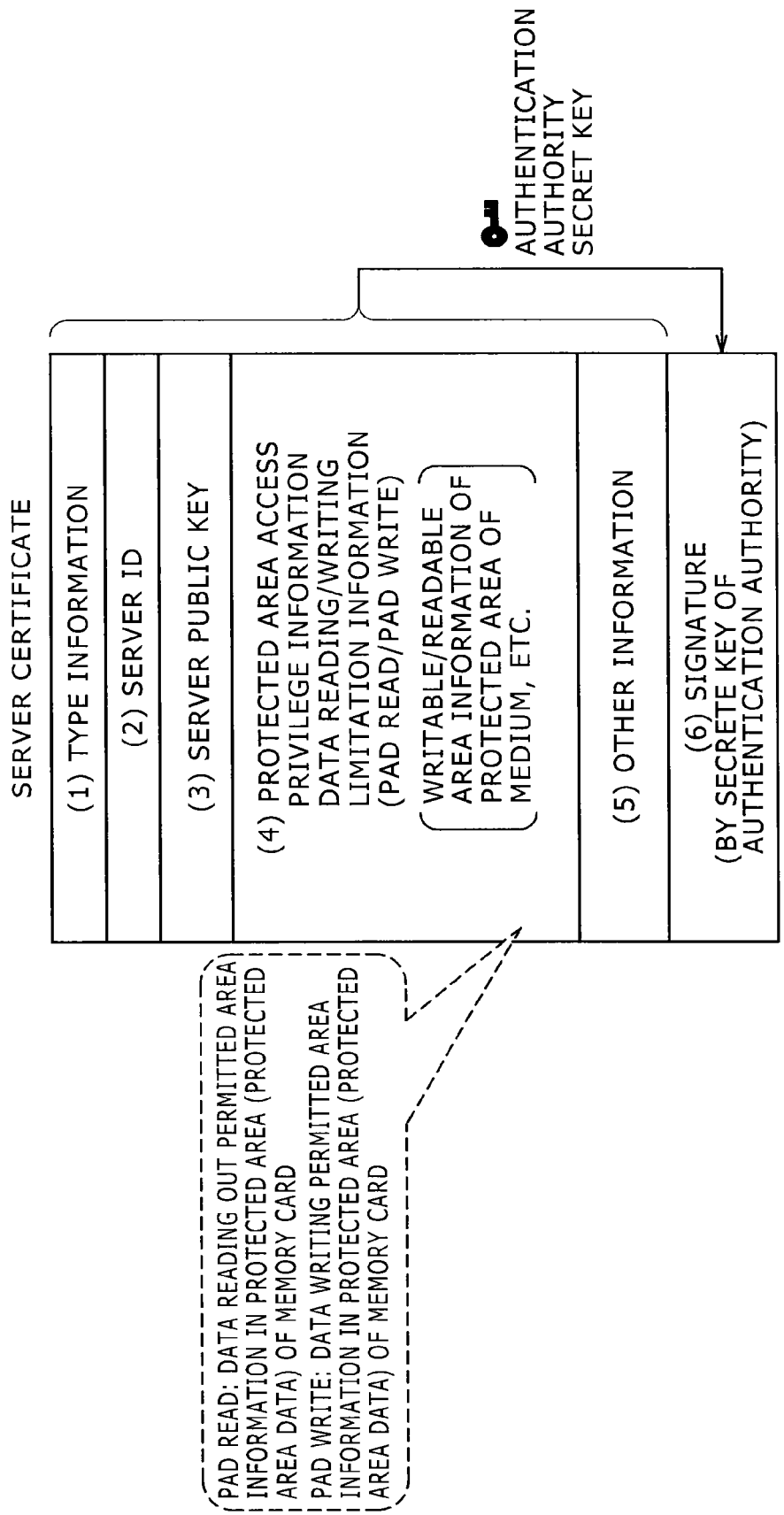
FIG. 5 is a view illustrating a server certificate.

FIG. 5 illustrates a particular example of a server certificate provided from the authentication authority to each content server.

Referring to FIG. 5, the server certificate includes the following data similarly to the host certificate described hereinabove with reference to FIG. 4:

(1) type information, (2) server ID, (3) server public key, (4) Read/Write limitation information from/into a medium (PAD Read/PAD Write), (5) other information, and (6) signature.

The kinds of information mentioned above are information similar to that described hereinabove with reference to FIG. 4, and therefore, overlapping detailed description of them is omitted herein to avoid redundancy.

It is to be noted that, in the "(4) Read/Write limitation information from/into a medium (PAD Read/PAD Write)," an access privilege in a unit of a block or partitioned area of the protected area 51 of the memory card 31, that is, data reading (Read)/writing (Write) permission information, is recorded in a unit of a server.

It is to be noted that, in the case where information recorded in the server certificate, for example, the server public key, is to be taken out and used, a signature verification process wherein the public key of the authentication authority is applied is executed to confirm that the server certificate is free from falsification. Then, taking that this confirmation is made successfully as a condition, utilization of the certificate stored data such as the server public key and so forth is carried out.

4. Example of an Accessing Process to a Memory Card to which Certificates for Different Apparatus are Applied As described hereinabove with reference to FIGS. 4 and 5, in order for a server or a host apparatus, which is a user apparatus such as a recording and reproduction apparatus, to access a block in the protected area 51 of the memory card 31, such a certificate as described hereinabove with reference to FIG. 4 or 5 is presented to the memory card.

The memory card 31 confirms the certificate illustrated in FIG. 4 or 5 to decide whether or not access in a unit of a block of the protected area 51 of the memory card 31 illustrated in FIG. 3 is to be permitted.

The host apparatus retains, for example, the host certificate described hereinabove with reference to FIG. 4 while the server which carries out provision and so forth of a content retains the server certificate described hereinabove with reference to FIG. 5.

In order for each of those apparatus to access the protected area of the memory card, it provides the certificate owned thereby to the memory card so that the memory card decides permission/rejection of the access based on verification.

An example of setting of access limitation when the access requesting apparatus to the memory card is a server and when the access requesting apparatus is a host apparatus such as a recording and reproduction apparatus is described with reference to FIG. 6.

Figure 6:
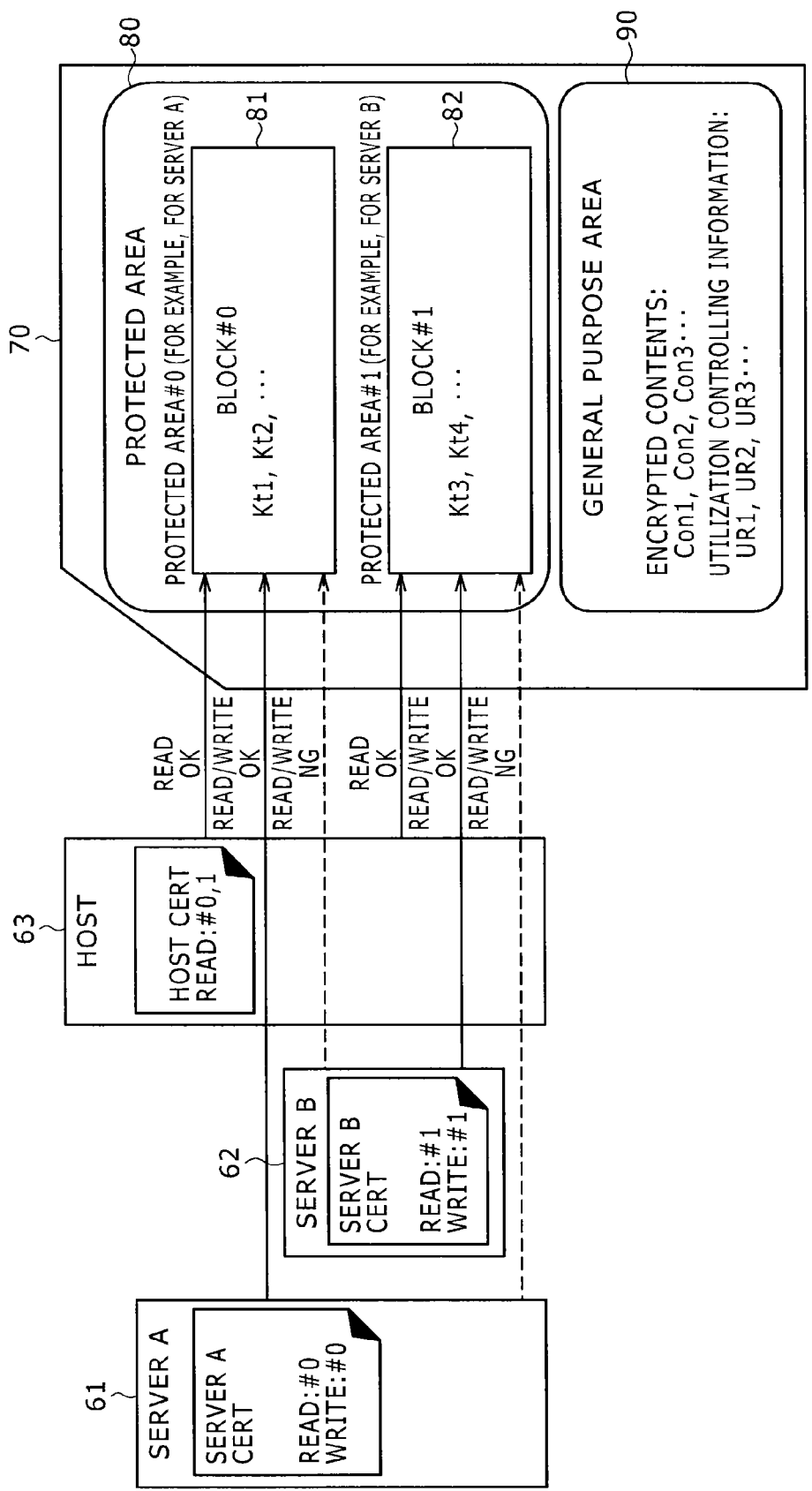
FIG. 6 is a diagrammatic view illustrating an example of a particular configuration of storage data of the memory card and an example of an access controlling process.

In FIG. 6, a server A 61, a server B 62, a host apparatus 63 which are access requesting apparatus to a memory card and the memory card 70 are shown in order from the left.

The server A 61 and the server B 62 provide, for example, encrypted contents Con1, Con2, Con3, . . . which are recording contents to the memory card 70.

The server A 61 and the server B 62 provide title keys Kt1, Kt2, . . . which are keys for decryption of an encrypted content and utilization controlling information (Usage Rule) UR1, UR2, . . . corresponding to the contents.

The host apparatus 63 carries out a reproduction process of a content stored in the memory card 70.

The host apparatus 63 reads encrypted contents Con1, Con2, Con3, . . . and utilization controlling information (Usage Rule) UR1, UR2, . . . recorded in a general purpose area 90 of the memory card 70. Further, the host apparatus 63 reads a title key Kt1, Kt2, . . . to be applied to a content decryption process from blocks or partitioned areas 81 and 82 of a protected area 80 and executes a decryption process by the title key to carry out content utilization in accordance with the utilization controlling information (Usage Rule).

The memory card 70 has the protected area 80 and the general purpose area 90, and the encrypted contents, utilization controlling information (Usage Rule) and so forth are recorded in the general purpose area 90.

Title keys which are required upon content reproduction are recorded in the protected area 80.

As described hereinabove with reference to FIG. 3, the protected area 80 is partitioned in a plurality of blocks or partitioned areas.

In the example illustrated in FIG. 6, only two blocks including a block #0 (Protected Area #0) 81 and another block #1 (Protected Area #1) 82 are shown.

The protected area 80 includes a large number of blocks in addition to the two blocks mentioned above.

As a setting pattern of blocks, various setting patterns are available.

In the example illustrated in FIG. 6, the block #0 (Protected Area #0) 81 is a block for exclusive use for the server A 61, that is, an area for storing a title key for decryption of providing contents of the server A 61, and the block #1 (Protected Area #1) 82 is a block for exclusive use for the server B 62, that is, an area for storing a title key for decryption of providing contents of the server B 62.

In such setting as described above, for example, the content providing server A 61 records a title key necessary for decryption of providing contents into the block #0 (Protected Area #0) 81.

In this instance, the write permitted area information (PAD Write) recorded in the server certificate of the server A 61 is configured as a certificate in which write permission into the block #0 (Protected Area #0) 81 is set.

It is to be noted that the example illustrated in FIG. 6 represents setting that, for a block whose writing (Write) is permitted, also reading (Read) is permitted.

Further, the server B 62 records a title key required for decryption of the providing content into the block #1 (Protected Area #1) 82.

In this instance, the write permitted area information (PAD Write) to be recorded into the server certificate of the server B 62 is configured as a certificate in which writing (Write) permission into the block #1 (Protected Area #1) 82 is set.

Meanwhile, the host certificate retained by the host apparatus 63 which is a reproduction apparatus, which reads the title keys recorded in the blocks #0 and #1 to execute content reproduction, is configured as a certificate in which reading (Read) permission of the blocks #0 and #1 is set.

In the present example, writing (Write) permission into the blocks #0 and #1 is not set in the host certificate.

However, in order to use setting that, upon content deletion, deletion of a title key corresponding to the content to be deleted is enabled, such setting that a deletion process is permitted may be used.

Further, when it becomes necessary, in other processes, for the host apparatus 63 to carry out data writing into a protected area, writing (Write) permission into the host certificate may be set.

When the data processing section of the memory card 70 receives an access request to the protected area 80 from an access requesting apparatus such as a server which provides a content or a host which uses a content, it refers to the apparatus certificate of the apparatus to confirm the access permission information in a unit of a block to decide whether or not access to the blocks is to be permitted.

The memory card 70 decides a type of write or read requesting data in response to an input thereto of a data writing or reading request from the access requesting apparatus and selects a block #0, #1, #2, ... as a data writing or reading destination.

The access controlling information is recorded in a certificate of each access requesting apparatus such as a server certificate or a host certificate as described hereinabove with reference to FIGS. 4 and 5. Thus, the memory card first carries out signature verification of the certificate received from the access requesting apparatus. After the validity of the certificate is confirmed, the memory card reads the access controlling information described in the certificate, that is, the following information:

Read permitted area information (PAD Read), and
Write permitted area information (PAD Write).

The memory card permits, based on the read information, only a process admitted to the access requesting apparatus and executes the process.

An example of data to be written into the memory card 70 by the server A 61 and the server B 62 illustrated in FIG. 6 is illustrated in FIG. 7.

Each server records contents and other data into the memory card 70 loaded in the host apparatus as a user apparatus.

It is assumed that the providing contents of the server A are contents Con(a1), Con(a2) and Con(a3).

Also it is assumed that the providing contents of the server B are contents Con(b1) and Con(b2).

As seen in FIG. 7, the server A records the following data:
contents Con(a1), Con(a2) and Con(a3)
utilization controlling information (Usage Rule) UR(a1), UR(a2), and UR(a3) corresponding to the contents into the general purpose area of the memory card.

Further, the server A records the following data:
title keys to be applied in decryption of the contents Kt(a1), Kt(a2), and Kt(a3) or conversion data of the title keys
into the block #0 of the protected area of the memory card.

The conversion data of a title key to be recorded into the protected area of the memory card particularly is a result of an exclusive ORing (XOR) arithmetic operation between each title key and a hash value of the corresponding utilization controlling information (Usage Rule).

In particular, data of Kt(a1)−UR(a1)hash, Kt(a2)−UR(a2)hash, and Kt(a3)−UR(a3)hash are the conversion data.

The server B records the following data:
contents Con(b1) and Con(b2)
utilization controlling information (Usage Rule) UR(b1) and UR(b2) corresponding to the contents into the general purpose area of the memory card.

Further, the server B records the following data:
a result of an exclusive ORing (XOR) arithmetic operation between each title key and a hash value of the corresponding utilization controlling information (Usage Rule) Kt(b1)−UR(b1)hash and Kt(b2)−UR(b2)hash into the block #1 of the protected area of the memory card.

When each server records data into a block in the protected area of the memory card, the memory card executes an access privilege confirmation based on the record of the server certificate described hereinabove to carry out confirmation of the write privilege into the block. Then, only when the access privilege is confirmed, data writing is executed.

It is to be noted that, when a host apparatus which is a user apparatus utilizes a content, processing is executed in the following sequence.

First, the host apparatus acquires a utilization object content Con(xy) and corresponding utilization controlling information UR(xy) from the general purpose area of the memory card.

Further, the host apparatus acquires a corresponding title key hash value Kt(xy)−UR(xy)hash from the protected area.

Then, the host apparatus calculates a hash value UR(xy)hash of the utilization controlling information UR(xy).

Then, the host apparatus executes exclusive ORing (XOR) between the calculated hash value UR(xy)hash and the title key hash value Kt(xy)−UR(xy)hash read out from the protected area to acquire a title key Kt(xy).

Finally, the host apparatus utilizes the title key Kt(xy) to execute a decryption process of the encrypted content Con (xy) to carry out reproduction and utilization of the content.

Content utilization such as reproduction of a content is carried out in such a sequence as described above.

It is to be noted that, also upon this process, when the host apparatus acquires the title key hash value Kt(xy)–UR(xy) hash from a block of the protected area, confirmation of the access privilege, in this instance, the read privilege, to the block based on the host certificate by the memory card is executed. Only when the conformation of the access privilege is made, reading of the title key hash value Kt(xy)–UR(xy) hash is carried out.

5. Example of a Process of Setting Validity Period Information in a Unit of a Block Now, an example of a process of setting validity period information of a content which is a utilization permitted period of a content provided to a user not to utilization controlling information (Usage Rule) corresponding to the content but to a block in which a title key is stored is described.

Usually, when a utilization permitted period is set to a content provided to a user, the utilization permitted period is recoded into utilization controlling information (Usage Rule) to be issued corresponding to each content.

A user apparatus or host apparatus which is to execute content reproduction carries out such a process as described below. In particular, it confirms, before it carries out a content reproduction process, the record of the utilization controlling information (Usage Rule). Then, if a utilization permitted period is recorded in the utilization controlling information (Usage Rule), then it is decided whether or not the current date corresponds to the utilization permitted period. Only when the current date and time corresponds to the utilization permitted period, utilization of the content is carried out.

It is to be noted that the user apparatus or host apparatus retains a content reproduction program, which is a host application, including a process of referring to the utilization controlling information (Usage Rule) to decide permission/rejection of use of a content. Content reproduction is executed in accordance with the reproduction program.

However, the setting wherein a utilization permitted period is recorded in utilization controlling information (Usage Rule) issued corresponding to each content gives rise to the following problem.

As described hereinabove, if a large quantity of contents are recorded in a memory card which is a content recording medium of a user and a utilization permitted period of each content is set to the utilization controlling information which corresponds to each content, then when extension or updating of the use period is carried out, rewriting of recorded information of a large number of pieces of the utilization controlling information must be carried out.

This rewriting process is carried out by a server, and this process requires communication among the server, host and memory card. This applies a significant processing load to the individual apparatus.

As a configuration for reducing such a processing load as described just above, an example of a process of setting validity period information in a unit of a block of the protected area in which a title key is stored is described with reference to FIG. 8 and so forth.

Figure 8:
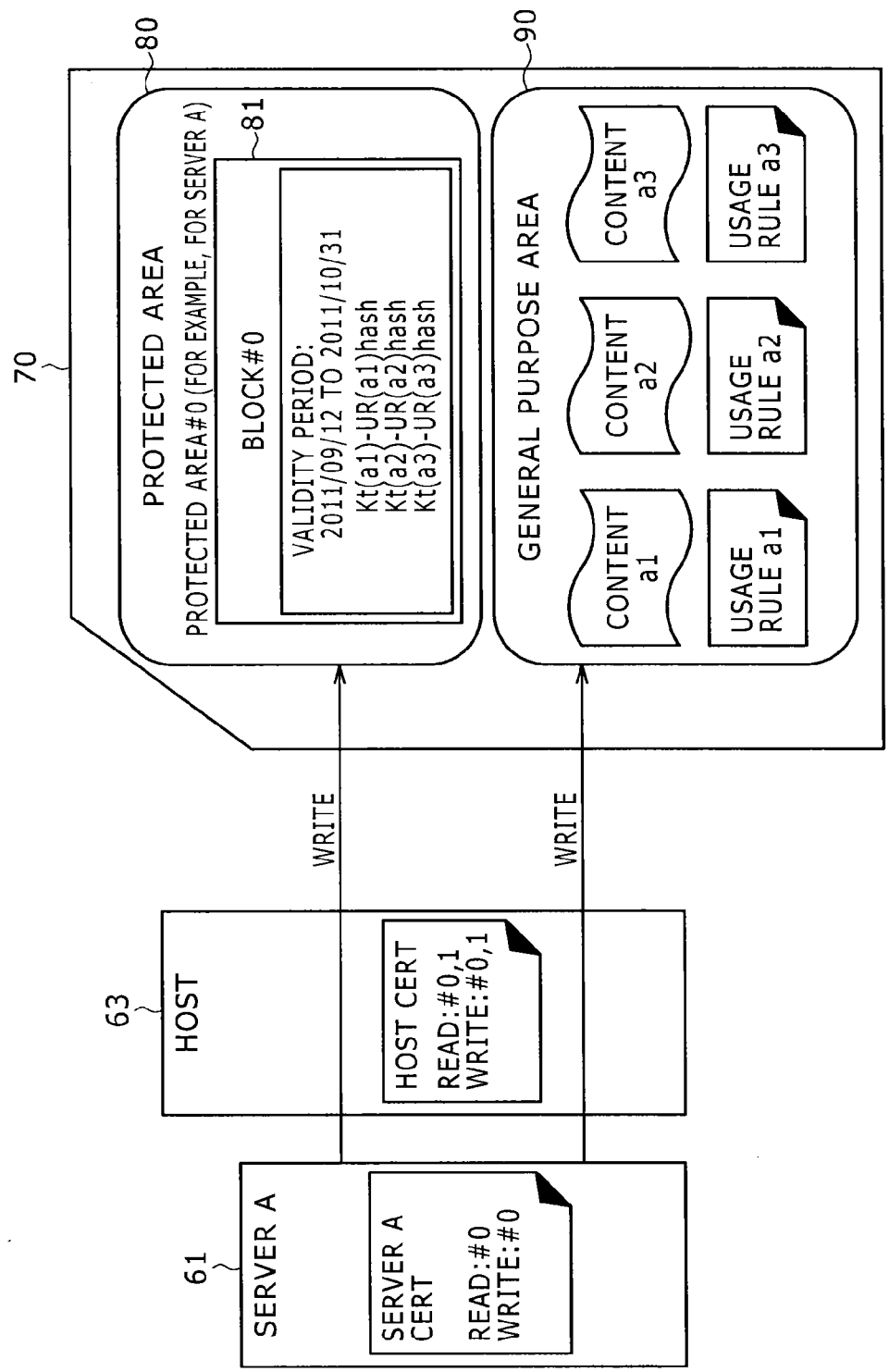
FIG. 8 is a block diagram illustrating an example of a data recording process of a server into the memory card.

FIG. 8 illustrates an example of a process by the server A 61 of providing and recording a content to and into the memory card 70. Upon this content providing process, validity period information which is a utilization permitted period of a providing content is set and is recorded into a block in the protected area in which the title key of the providing content is stored.

In particular, the validity period information is recorded into the block #0 (Protected Area #0) 81 of the protected area 80, in which a title key to be applied to decryption of the providing content from the server A 61 is stored, together with the title key.

In the example illustrated in FIG. 8, the server A 61 records contents and utilization controlling information given below into the general purpose area 90 of the memory card 70:

contents Con(a1), Con(a2), and Con(a3)

utilization controlling information (Usage Rule) UR(a1), UR(a2), and UR(a3) corresponding to the contents.

The set of the content utilization controlling information is recorded.

Further, the server A 61 records the following data into the block #0 (Protected Area #0) 81 of the protected area 80 of the memory card 70:

a result of an exclusive ORing (XOR) arithmetic operation between the title keys and the hash values of the corresponding utilization controlling information (Usage Rule) Kt(a1)–UR(a1)hash, Kt(a2)–UR(a2)hash, and Kt(a3)–UR(a3)hash validity period information which is utilization permitted periods of the providing contents Con(a1), Con(a2) and Con(a3) of the server A, for example 2011/01/12 to 2011/10/31.

The validity period information set for the plural contents is recorded in an associated relationship with the title keys.

In short, the server A sets a collective validity period corresponding to providing contents thereof and records the validity period information in an associated relationship with the title keys corresponding to the providing contents of the server A into the block in which the title keys are stored.

By executing a setting process of validity period information in a unit of a block in which a plurality of title keys are stored in this manner, for example, such merits as described below are achieved.

For example, when updating validity period of the providing contents of the server A, the server A only need to rewrite validity period information recorded in the block. In particular, the necessity to carry out a process of rewriting utilization controlling information (Usage Rule) corresponding to providing contents one by one is eliminated, and the communication process between the server, host and memory card and the processing load to them can be reduced.

It is to be noted that, while FIG. 8 illustrates an example of a process of the server A 61, for example, the server B 62 can record a collective validity period corresponding to providing contents of the server B into the block #1 of the protected area which is a storage area of title keys corresponding to the providing contents of the server B.

It is to be noted that the setting configuration of the validity period information in a unit of a block is convenient particularly in a case in which such a content utilization pattern in which a utilization permitted period of a providing content, for example, of the server A is successively updated after a predetermined interval of time, for example, in a unit of one month, is adopted.

For example, the user can set such that a providing content of the server A can be used freely in a unit of one month by paying a membership fee per month.

It is to be noted that such a content utilization service as just described is called, for example, subscription service.

A server which provides the subscription service can collectively update utilization permitted periods of contents corresponding to title keys recorded in a block if it rewrites the validity period information recorded in the block in each updating month.

It is to be noted that, while FIG. 8 illustrates a setting example wherein one collective validity period of providing contents of the server A is recorded in one block, also an alternative configuration is possible wherein a plurality of write permission blocks of the server A are set such that different validity periods are set for different blocks.

For example, a further configuration may be used wherein providing contents of the server A are divided into a plurality of partitions and the utilized block is changed in a unit of a partition such that different validity periods are set among different blocks.

A utilization process of a content when validity period setting in a unit of a block of the protected area of the memory card is carried out in this manner is described with reference to FIG. 9.

Figure 9:
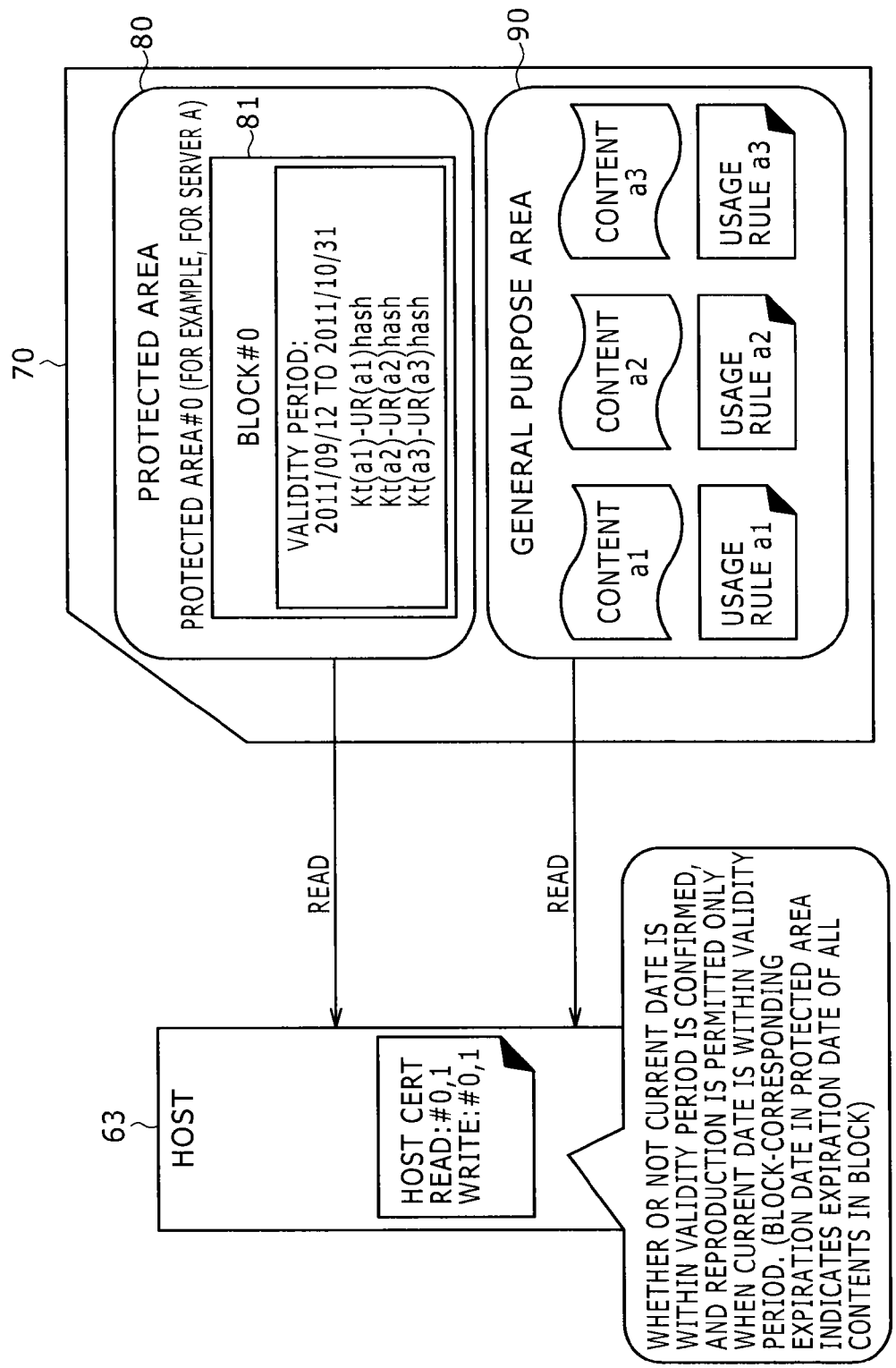
FIG. 9 is a similar view but illustrating an example of a reading process of recording data from the memory card by a host.

FIG. 9 shows the host apparatus 63 which is a user apparatus which utilizes a content and the memory card 70 in which a content and so forth are stored.

Referring to FIG. 9, the host apparatus 63 executes the following processes upon utilization of a content.

Further, the host apparatus 63 acquires a utilization object content Con(xy) and corresponding utilization controlling information UR(xy) from the general purpose area of the memory card.

Then, the host apparatus 63 refers to the utilization controlling information UR(xy) to confirm in which one of the blocks the title key of the utilization object content Con(xy) is stored.

In the utilization controlling information UR(xy), an identifier of the block in which the title key of the utilization object content Con(xy) is stored is recorded.

After the block is specified, a reading out process of recorded data in the block is carried out.

First, the validity period information recorded as in-block data is read out. The validity period and the current date are compared with each other, and if the current date is within the validity period, then a title key hash value Kt(xy)–UR(xy) hash recorded in the block is acquired.

If the current date is not within the validity period, then the processing is stopped at this point of time. In other words, decryption and utilization processes of the content are not executed.

Only when the current date is within the validity period, the host apparatus 63 acquires the title key hash value Kt(xy)–UR(xy)hash recorded in the block.

Then, the host apparatus 63 calculates the hash value UR(xy)hash of the utilization controlling information UR(xy). Then, the host apparatus 63 executes exclusive ORing (XOR) between the calculated hash value UR(xy)hash and the title key hash value Kt(xy)–UR(xy)hash read from the protected area to acquire the title key Kt(xy).

Finally, the host apparatus 63 uses the title key Kt(xy) to execute a decryption process of the encrypted content Con(xy) to carry out reproduction and utilization of the content.

It is to be noted that the current date information used upon the comparison process between the validity period information recorded as the in-block data and the current date information is preferably set so as to utilize time information provided by a reliable time information providing server.

Further, when the host apparatus 63 acquires the title key hash value Kt(xy)–UR(xy)hash from a block of the protected area 80 of the memory card 70, the memory card 70 executes confirmation of an access privilege, in this instance, a read privilege, to a block based on the host certificate. Only when the access privilege is confirmed, reading of the title key hash value Kt(xy)–UR(xy)hash is carried out.

Now, an updating processing sequence of the validity period set in a unit of a block in which a title key is stored is described with reference to FIG. 10.

Figure 10:
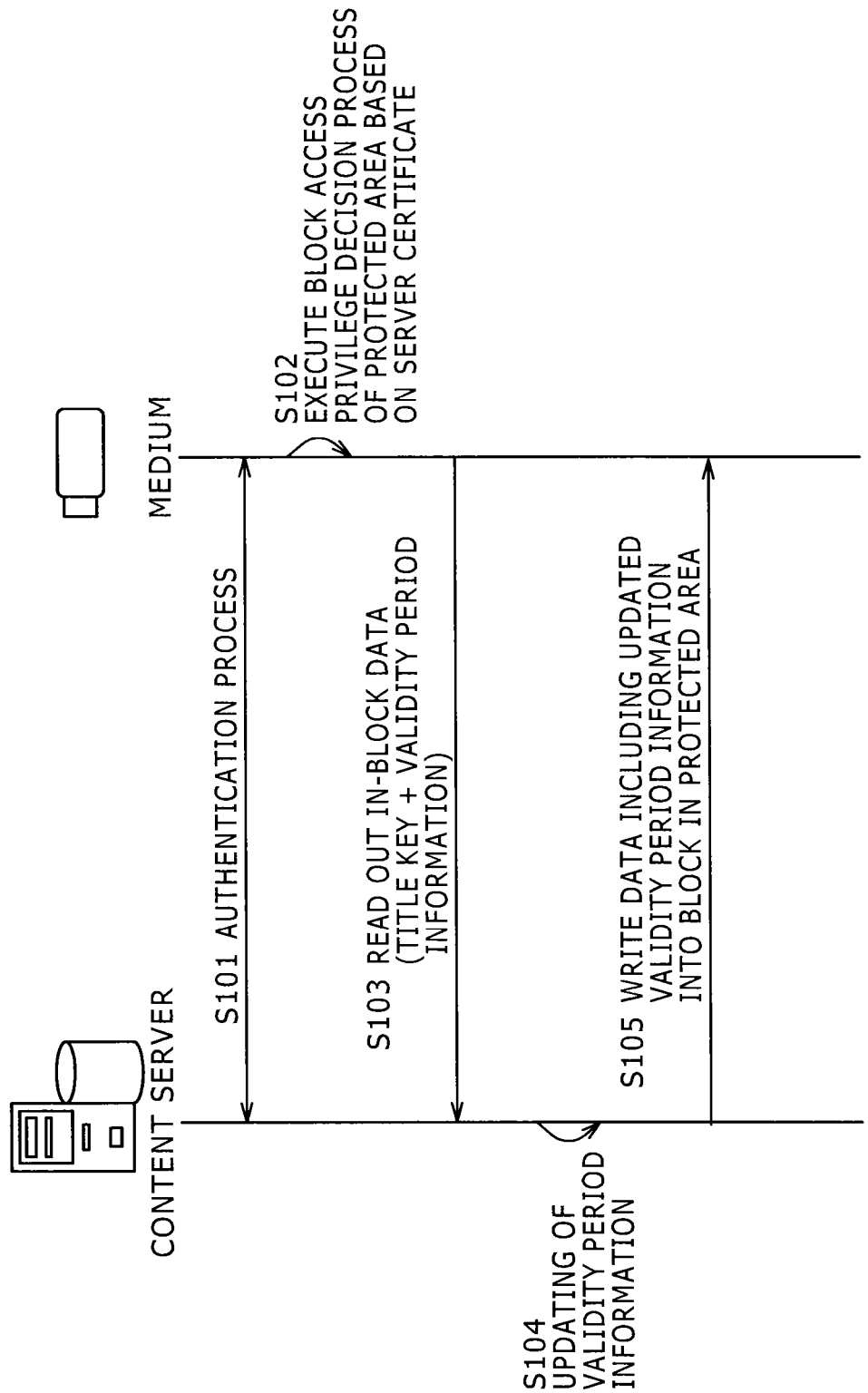
FIG. 10 is a diagram illustrating an updating processing sequence of validity period information of a content.

FIG. 10 illustrates an updating processing sequence of a validity period executed between a content server which provides and manages contents and a memory card in which contents to which a validity period is set in a unit of a block in which a title key is stored is stored.

It is to be noted that the memory card is loaded into a user apparatus which executes, for example, content recording or reproduction, and communication between the server and the memory card is executed through the user apparatus.

First at step S101, an authentication process between the content server and the memory card is executed.

For example, an authentication process which involves an exchanging process of public key certificates of the content server and the memory card and so forth is executed.

It is to be noted that, as regards this process, the server provides the server certificate described hereinabove with reference to FIG. 5 to the memory card.

If the authentication process results in failure, then the processing is stopped. In other words, the updating process of the validity period is not executed.

If the authentication process results in success and it is decided that both apparatus are reliable, then the memory card confirms, at step S102, the access privilege in a unit of a block in the protected area based on the server certificate. Only when the access privilege, that is, the write privilege, regarding a block with regard to which an updating request is received from the server is confirmed, the processing advances to the following process.

If the block access privilege is confirmed, then the server reads out, at step S103, recorded data of the block in which the title key of the server providing content and the validity period information in a unit of a block are recorded.

At step S104, the validity period information in the read out block data is updated.

For example, a rewriting process of the validity period information from before-updating validity period information 2011/09/01 to 2011/09/30 into after-updating validity period information 2011/10/01 to 2011/10/31 is carried out.

Finally, at step S105, a process of writing or overwriting the block recording data including the updated validity period information into the same block of the memory card is carried out.

Now, a content reproduction processing sequence by the user apparatus or host apparatus which carries out content utilization is described with reference to a flow chart shown in FIG. 11.

Figure 11:
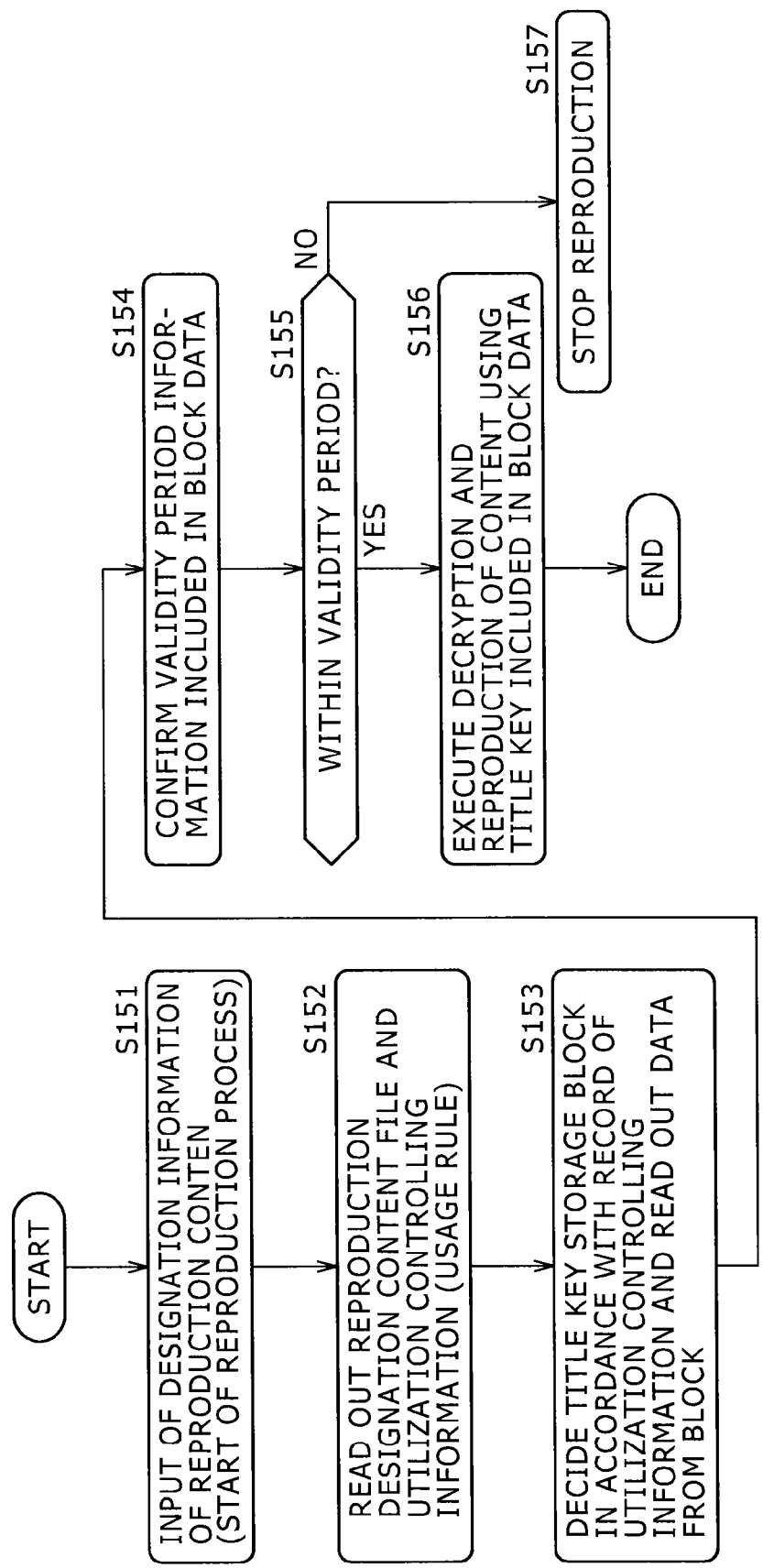
FIG. 11 is a flow chart illustrating a reproduction processing sequence of a content to which validity period information corresponding to a block is set.

The process in accordance with the flow illustrated in FIG. 11 is executed by a data processing section such as a CPU of the user apparatus in accordance with the content reproduction program or host application stored in the user apparatus.

First at step S151, the data processing section of the user apparatus detects an input of reproduction content designation information from the user. For example, the data processing section detects an input of content designation information which is an input of the user in regard to a content list as a menu displayed on a display section of the reproduction apparatus.

Then at step S152, the data processing section reads the reproduction designation content and utilization controlling information from the general purpose area of the memory card loaded in the user apparatus. In particular, the utilization object content Con(xy) and the corresponding utilization controlling information UR(xy) are acquired.

Then at step S153, the data processing section refers to the read utilization controlling information UR(xy) to confirm in which block a title key of the utilization object content Con (xy) is stored.

If the block is specified, then the data processing section carries out, at step S154, a reading process of the recorded data in the block to confirm validity period information recorded as in-block data.

The data processing section compares this validity period and the current date with each other to decide whether or not the current date is within the validity period.

If it is decided at step S155 that the current date is not within the validity period, then the processing advances to step S157, at which the processing is stopped. In other words, decryption and utilization processes of the content are not executed.

On the other hand, if it is decided at step S155 that the current date is within the validity period, then the processing advances to step S156.

At step S156, the data processing section acquires a title key recoded in the block and carries out a decryption process of the content using the title key to carry out reproduction and utilization of the content.

It is to be noted that the title key stored in the block is stored as a result of an exclusive ORing arithmetic operation thereof with a hash value of the utilization controlling information (UR: Usage Rule). Thus, the data processing section carries out acquisition of a title key by calculation of a UR hash, an exclusive ORing arithmetic operation process with the UR hash and so forth.

In this manner, when the current date is not within the validity period recorded in the block, the processing is stopped at this point of time. It is to be noted that preferably it is set that, as the current date information to be utilized upon a comparison process between the validity period information recorded as in-block data and the current date information, time information provided by a reliable time information providing server is utilized.

In this manner, in the present embodiment, the configuration is applied wherein validity period information of a content is set in a unit of a block in which a plurality of title keys corresponding to different contents are stored. Therefore, it is possible to reduce the load of a communication process or a data process involved in a setting or updating process of a validity period for a plurality of contents.

6. Example of a Coexistence Utilization Process of Validity Period Information in a Unit of a Block and Validity Period Information of Utilization Controlling Information An example of a coexistence utilization process of validity period information in a unit of a block and validity period information of utilization controlling information is described.

In the embodiment described above, an example wherein a server sets one validity period corresponding to one block for all of a plurality of contents to be provided to a user is described.

However, it is sometimes desired to set an independent validity period corresponding to one content.

Such single validity period corresponding to one content may be recorded, for example, in the utilization controlling information (Usage Rule) with regard to the content similarly as in apparatus up to now.

However, if this setting is applied, then two validity periods including the validity period information in a unit of a block and the validity period information of the utilization controlling information (Usage Rule) are involved, and it is unknown which one of the two validity periods is to be referred to.

In the following, an example of a configuration which solves such a problem as just described, that is, a configuration in which validity period information in a unit of a block and validity period information of utilization controlling information coexist such that one of the two kinds of validity period information is selectively applied for each content, is described.

An outline of the example of the present process is described with reference to FIG. 12.

For example, a content provided from a server is recorded into the general purpose area of the memory card.

Also utilization controlling information (Usage Rule) corresponding to the content is provided from the server to the memory card and recorded into the general purpose area of the memory card. This process is similar to that in the past, and a similar process is executed also by the configuration described hereinabove wherein validity period information in a unit of a block is recorded.

In the configuration described hereinabove wherein validity period information in a unit of a block is recorded, it is set that validity period information of the content is not recorded in the utilization controlling information (Usage Rule) corresponding to the content.

Figure 12:
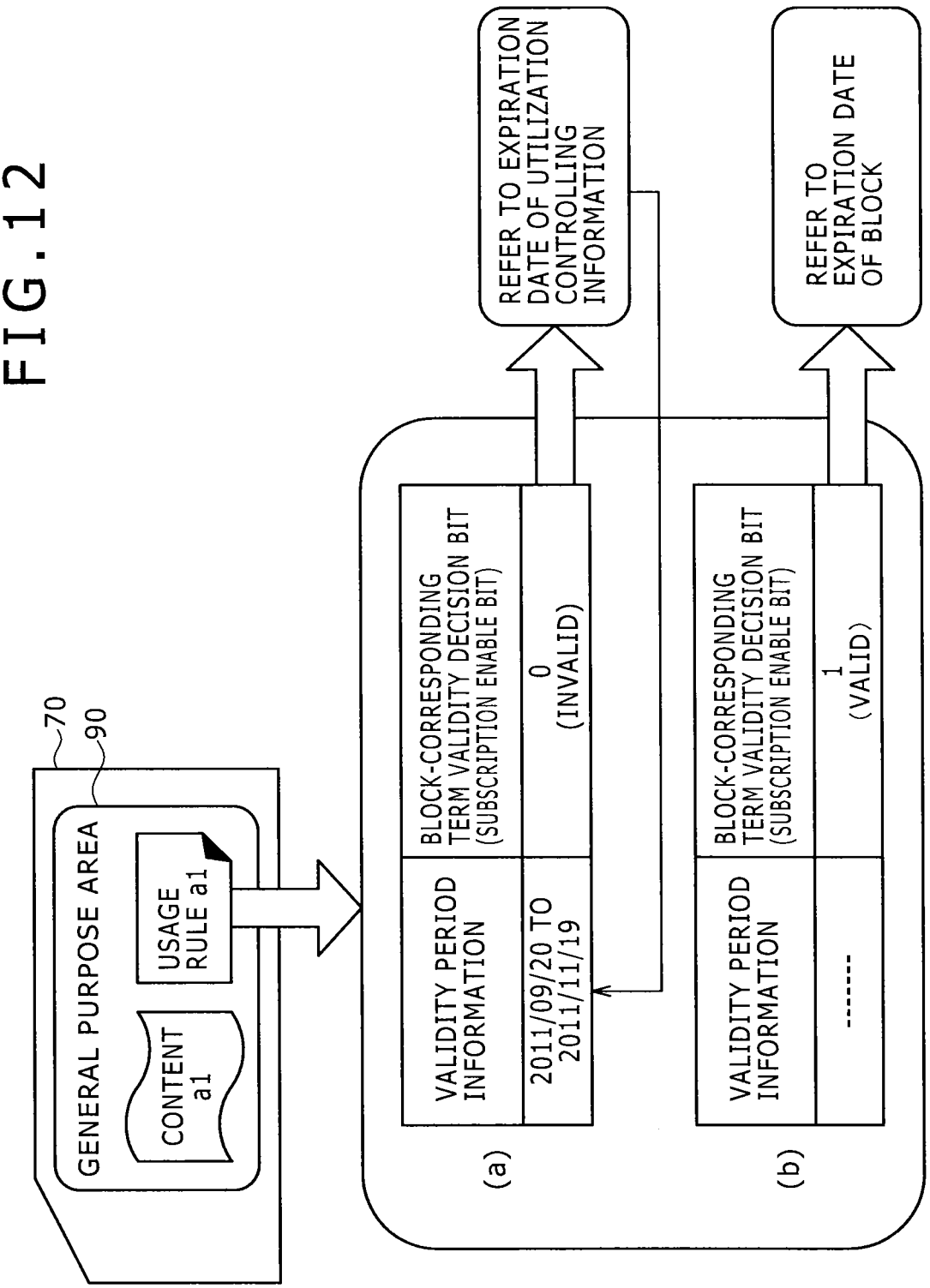
FIG. 12 is a diagrammatic view illustrating a coexistence configuration of validity period information corresponding to a block and validity period information of utilization controlling information.

In the present process example, utilization controlling information (Usage Rule) corresponding to a content assumes one of two settings (a) and (b) illustrated in FIG. 12.

In particular, (a) of FIG. 12 indicates a setting wherein validity period information of a content is recorded in the utilization controlling information (Usage Rule) and besides a bit "0" indicative of invalidity is recorded in a block-corresponding term validity decision bit (Subscription Enable bit).

(b) of FIG. 12 indicates a setting wherein validity period information of a content is not recorded in the utilization controlling information (Usage Rule) and besides a bit "1" indicative of validity is recorded in the block-corresponding term validity decision bit (Subscription Enable bit).

When a server which provides a content sets, as a validity period of a providing content, a validity period which is to be set singly for the content, utilization controlling information (Usage Rule) in accordance with the setting (a) described above is produced. Then, the utilization controlling information (Usage Rule) is provided to the user apparatus together with the content so as to be recorded into the general purpose area of the memory card.

On the other hand, when the server sets, as a validity period of a providing content, a validity period which is not to be set singly for the content but is to be set for a block for a plurality of contents in the block, utilization controlling information (Usage Rule) in accordance with the setting (b) described above is produced. Then, the utilization controlling information (Usage Rule) is provided to the user apparatus together with the content so as to be recorded into the general purpose area of the memory card.

The server selects and provides the utilization controlling information (Usage Rule) of one of the two settings in response to the content.

A user apparatus or host apparatus which carries out reproduction and utilization of a content refers, upon utilization of a content, to the utilization controlling information (Usage Rule) corresponding to the utilization content to confirm the setting of the block-corresponding term validity decision bit (Subscription Enable bit).

If the setting of the block-corresponding term validity decision bit (Subscription Enable bit) is the bit "0" representative of invalidity, then the validity period information in the utilization controlling information (Usage Rule) is referred to.

On the other hand, if the setting of the block-corresponding term validity decision bit (Subscription Enable bit) is the bit "1" representative of validity, then the validity period information recorded in a block of the protected area, in which a title key corresponding to the content is stored, is referred to.

By such a process as just described, it is possible to allow coexistence of a validity period singly for a content recorded in the utilization controlling information and a validity period corresponding to a block set commonly to a plurality of contents such that one of the validity periods can be selectively applied without an error in response to a content.

Now, a recording processing sequence of a new content into the memory card 70 by the server A 61 is described with reference to FIG. 13.

Figure 13:
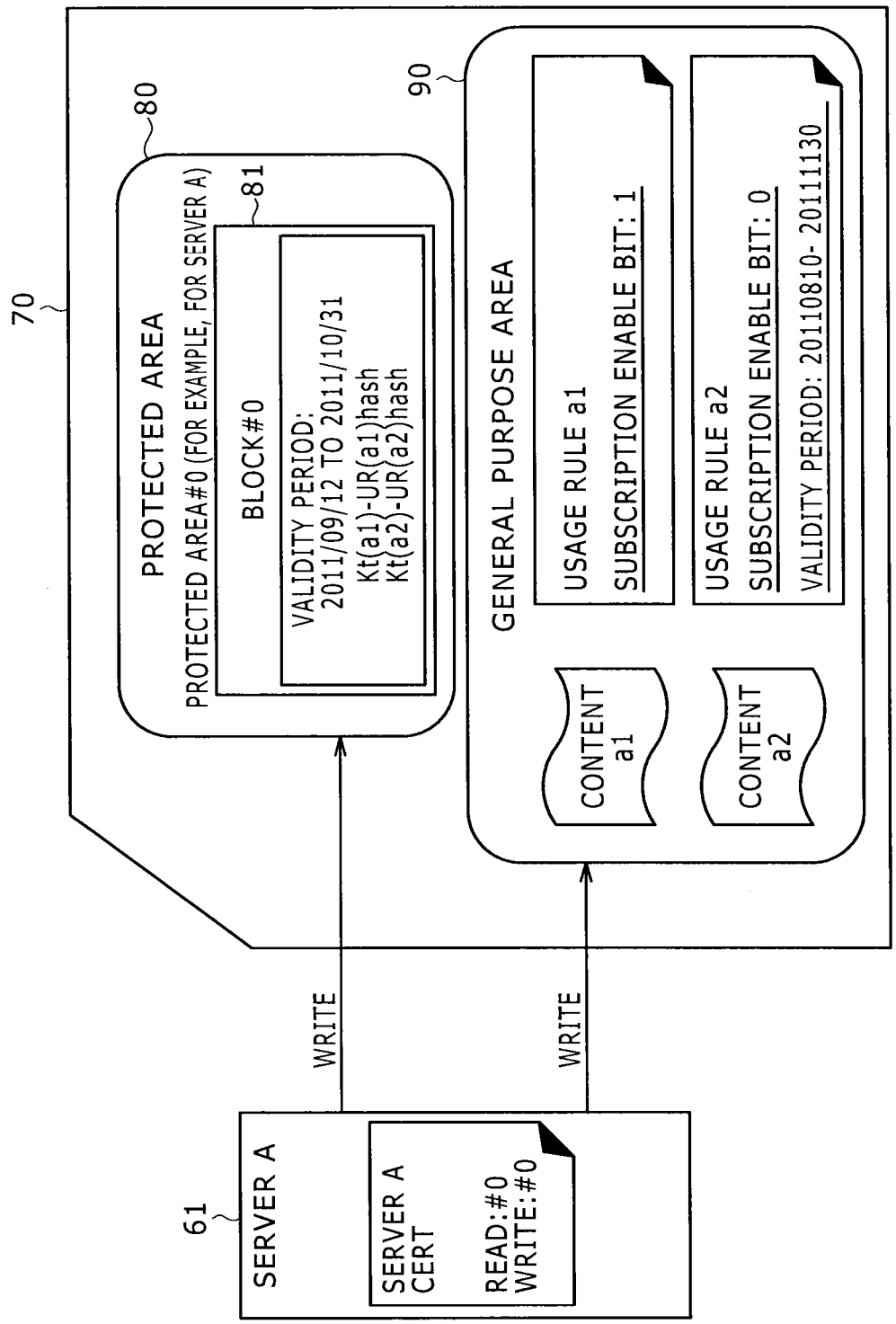
FIG. 13 is a diagrammatic view illustrating an example of a process executed by a server in the coexistence configuration of validity period information corresponding to a block and validity period information of utilization controlling information.

FIG. 13 illustrates two examples of a content providing process including:

a providing process of a content a1 which uses a validity period corresponding to a block, and a providing process of a content a2 wherein a validity period for a sole content is recorded in the utilization controlling information.

First, the providing process of a content a1 which uses a validity period corresponding to a block is described.

When the server A 61 is to record a content, to which a validity period corresponding to a block common to other providing contents is set, into the memory card 70, the block-corresponding term validity decision bit (Subscription Enable bit) of the utilization controlling information (Usage Rule) corresponding to the content is set to the bit "1" indicative of validity.

The utilization controlling information (Usage Rule) having this setting is recorded into the general purpose area of the memory card together with the content.

A title key corresponding to this content is recorded into a block in the protected area into which writing by the server A 61 is permitted.

In the example illustrated in FIG. 13, the block #0 81 is a block into which writing by the server A 61 is permitted, and the title key is written into this block. It is to be noted that particularly conversion data of the title key which is a result of an XOR arithmetic operation with a hash value of the utilization controlling information (Usage Rule) for the title key is recorded.

In this block #0 81, validity periods corresponding to other providing contents of the server A are recorded together. For the content a1, the validity period recorded in the block is used.

The user apparatus or host apparatus confirms, upon reproduction of the content, the setting of the block-corresponding term validity decision bit (Subscription Enable bit) recorded in the utilization controlling information (Usage Rule) corresponding to the content a1. Then, the user apparatus or host apparatus refers to the validity period recorded in the block based on the confirmed setting to carry out validity period confirmation.

Now, the providing process of a content a2 wherein a validity period for a sole content is recorded in the utilization controlling information is described.

When the server A 61 is to record a content, to which a validity period solely for a content is set, into the memory card 70, the validity period information which is a utilization permitted period of a providing content is recorded into the utilization controlling information (Usage Rule).

Further, utilization controlling information (Usage Rule) wherein the setting of the block-corresponding term validity decision bit (Subscription Enable bit) of the utilization controlling information (Usage Rule) is set to the bit "0" indicative of invalidity is produced. Then, the produced utilization controlling information (Usage Rule) is recorded into the general purpose area of the memory card together with the content.

A title key corresponding to this content is recorded into a block in the protected area into which writing by the server A 61 is permitted.

In the example illustrated in FIG. 13, the block #0 81 is a block into which writing by the server A 61 is permitted, and the title key is written into this block. It is to be noted that particularly conversion data of the title key which is a result of an XOR arithmetic operation with a hash value of the utilization controlling information (Usage Rule) for the title key is recorded.

It is to be noted that, in this block #0 81, validity period information for blocks corresponding to other providing contents of the server A are recorded together. However, with regard to the content a2, the validity period corresponding to a block is not used, but a validity period recoded in the utilization controlling information (Usage Rule) corresponding to the content a2 is used.

In particular, the user apparatus or host apparatus confirms the setting of the block-corresponding term validity decision bit (Subscription Enable bit) recorded in the utilization controlling information (Usage Rule) corresponding to the content a2 upon content reproduction. Then, the user apparatus or host apparatus refers to the validity period recorded in the utilization controlling information (Usage Rule) based on the confirmed setting to carry out validity period confirmation.

Now, an example of a utilization process of a content is described with reference to FIG. 14.

Figure 14:
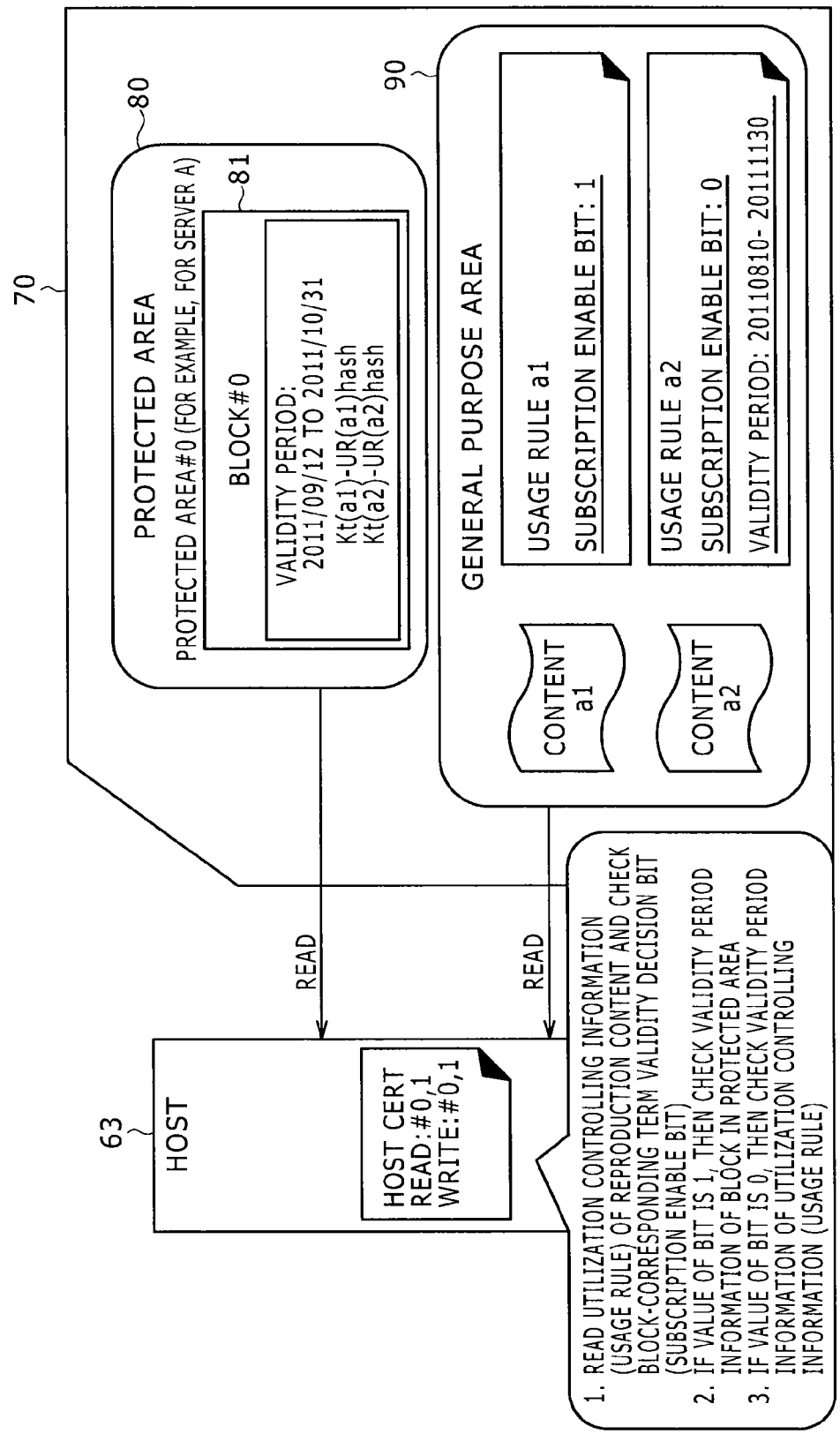
FIG. 14 is a diagrammatic view illustrating an example of a process executed by the host in the coexistence configuration of validity period information corresponding to a block and validity period information of utilization controlling information.

FIG. 14 shows the host apparatus 63 which is a user apparatus and uses a content and the memory card 70 in which contents and so forth are stored.

The host apparatus 63 executes the following process upon utilization of a content.

First, the host apparatus 63 acquires a utilization object content Con(xy) and corresponding utilization controlling information UR(xy) from the general purpose area of the memory card.

Then, the host apparatus 63 confirms the setting of the block-corresponding term validity decision bit (Subscription Enable bit) of the utilization controlling information UR(xy).

If the bit setting is the bit "0" representative of invalidity, then the host apparatus 63 refers to the validity period information in the utilization controlling information (Usage Rule).

However, if the bit setting is the bit "1" representative of validity, then the host apparatus 63 refers to the block-corresponding validity period information recorded in the block in the protected area in which a title key corresponding to the content is stored.

By such a process as described above, it is possible to allow coexistence of a validity period solely for a content recorded in the utilization controlling information and a block-corresponding validity period set commonly to a plurality of contents and selectively apply one of the validity period without an error in response to a content.

A content reproduction process sequence by a user apparatus or host apparatus which carries out utilization of a content is described with reference to a flow chart shown in FIG. 15.

Figure 15:
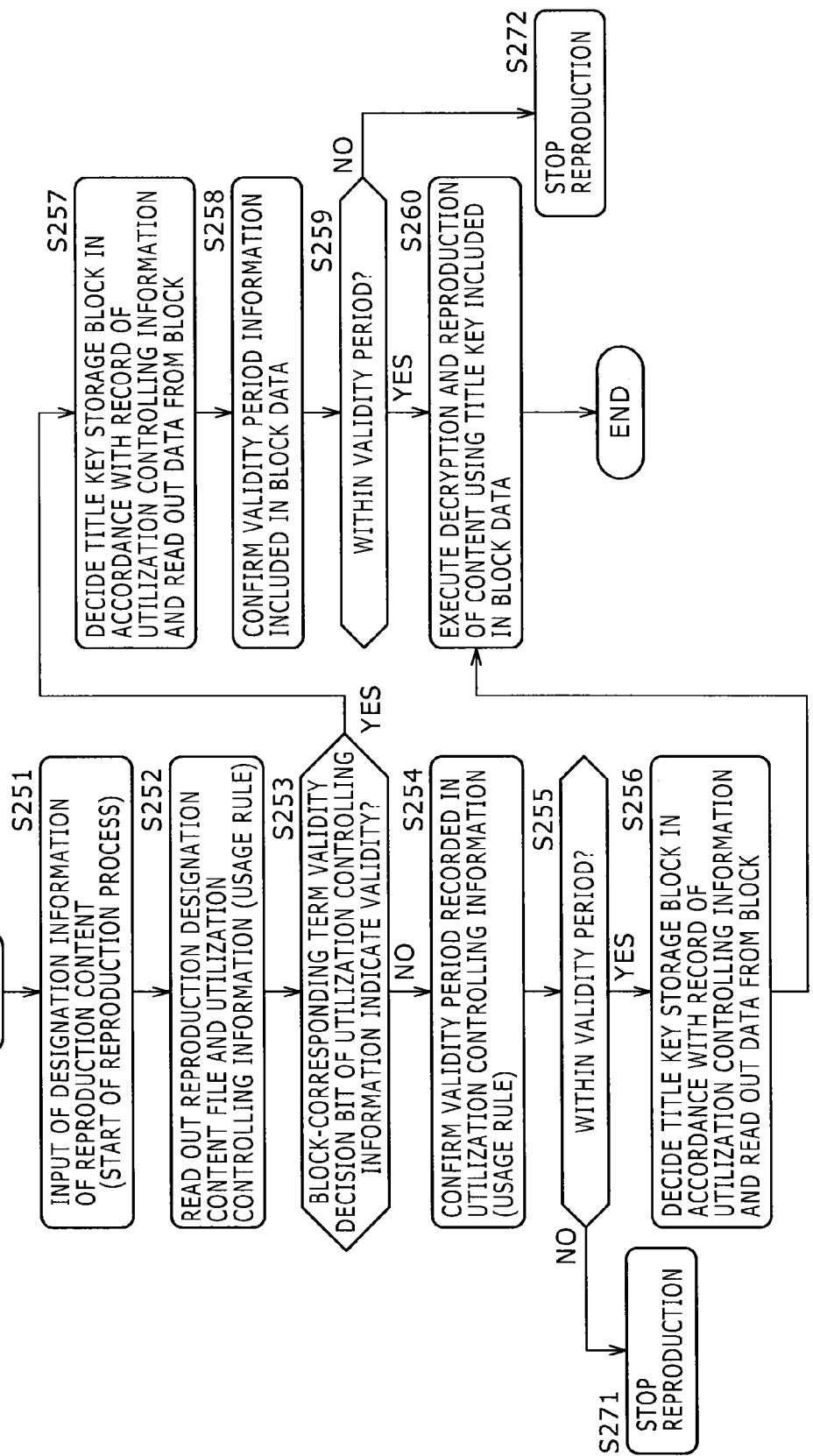
FIG. 15 is a flow chart illustrating a content reproduction processing sequence executed by the host in the coexistence configuration of validity period information corresponding to a block and validity period information of utilization controlling information.

The processing in accordance with the flow illustrated in FIG. 15 is executed by a data processing section such as a CPU of the user apparatus in accordance with a content reproduction program or host application stored in the user apparatus.

First at step S251, the data processing section detects an input of reproduction content designation information from the user. For example, the data processing section detects an input of content designation information which is an input of the user, for example, to a content list as a menu displayed on a display section of a reproduction apparatus.

Then at step S252, the data processing section reads the reproduction designation content and utilization controlling information from the general purpose area of the memory card loaded in the user apparatus. In particular, the data processing section acquires the utilization object content Con (xy) and the corresponding utilization controlling information UR(xy).

Then at step S253, the data processing section refers to the read utilization controlling information UR(xy) to confirm the setting of the block-corresponding term validity decision bit (Subscription Enable bit) of the utilization controlling information UR(xy).

If the bit setting is the bit "0" representative of invalidity, then the processing advances to step S254. However, if the bit setting is the bit "1" representative of validity, then the processing advances to step S257.

If the bit setting is the bit "0" representative of invalidity and the processing advances to step S254, then the data processing section refers to the validity period information in the utilization controlling information (Usage Rule) at step S254.

Then at step S255, the data processing section decides whether or not the current date is within the validity period. If the data processing section decides that the current date is not within the validity period, then the processing advances to step S271, at which the processing is stopped. In other words, decryption and utilization processes of the content are not carried out.

On the other hand, if it is decided at step S255 that the current date is within the validity period, then the processing advances to step S256.

At step S256, the data processing section discriminates a block in which a title key recorded in the utilization controlling information (Usage Rule) is stored and reads data from the block.

Finally at step S260, the data processing section acquires a title key stored in the data read from the block and carries out a decryption process of the content using the title key to carry out reproduction and utilization of the content.

On the other hand, if it is decided at step S253 that the setting of the block-corresponding term validity decision bit (Subscription Enable bit) of the utilization controlling information UR(xy) is the bit "1" representative of validity, then the processing advances to step S257. At step S257, the data processing section discriminates a block in which a title key recorded in the utilization controlling information (Usage Rule) is stored and reads data from the block.

Then at step S258, the data processing section carries out a reading out process of recorded data in the block and confirms the validity period information recorded as in-block data.

Then, the data processing section compares the block-corresponding validity period and the current date with each other to decide the current date is within the validity period.

If it is decided at step S259 that the current date is not within the validity period, then the processing advances to step S272, at which the processing is stopped. In other words, decryption and utilization processes of the content are not executed.

On the other hand, if it is decided at step S259 that the current date is within the validity period, then the processing advances to step S260.

At step S260, the data processing section acquires a title key recorded in the block and carries out a decryption process of the content using the title key to carry out reproduction and utilization of the content.

It is to be noted that the stored title key in the block is stored as a result of an exclusive ORing (XOR) arithmetic operation with a hash value of the utilization controlling information (Usage Rule), and acquisition of the title key by calculation of a UR hash, an XOR arithmetic operation process with a UR hash and so forth described hereinabove is carried out.

In this manner, when the current date is not within the validity period recorded in the block, the processing is stopped at the point of time. It is to be noted that, as described hereinabove, the current date information used upon the comparison process between the validity period information recorded as the in-block data and the current date information is preferably set so as to utilize time information provided by a reliable time information providing server.

In this manner, in the present embodiment, coexistence of the two kinds of validity period information including validity period information recorded in utilization controlling information and validity period information recorded in a block is allowed. Further, discrimination information regarding which one of the two kinds of validity period information should be used is recorded in content-corresponding utilization controlling information (Usage Rule).

By the settings, the server can set a validity period for a sole content and further can associate a block-corresponding validity period corresponding to a plurality of contents with the contents to be used.

Further, the user apparatus which is a content-utilizing apparatus can selectively apply one of the two types of validity periods without an error in response to a content.

7. Example of a Process of Setting Information of a Plurality of Validity Periods to a Block and Selectively Applying the Information in Response to a Content Now, an example of a process of setting information of a plurality of validity periods to a block and selectively applying the information in response to a content is described.

In the embodiment described above, only one validity period corresponding to a block is set to one block in the protected area of a memory card.

In the following, another configuration example is described wherein information of a plurality of validity periods is recorded in one block in the protected area of a memory card such that one validity period selected from the plural validity periods is referred to and utilized in response to a content.

The present embodiment is described with reference to FIG. 16.

Figure 16:
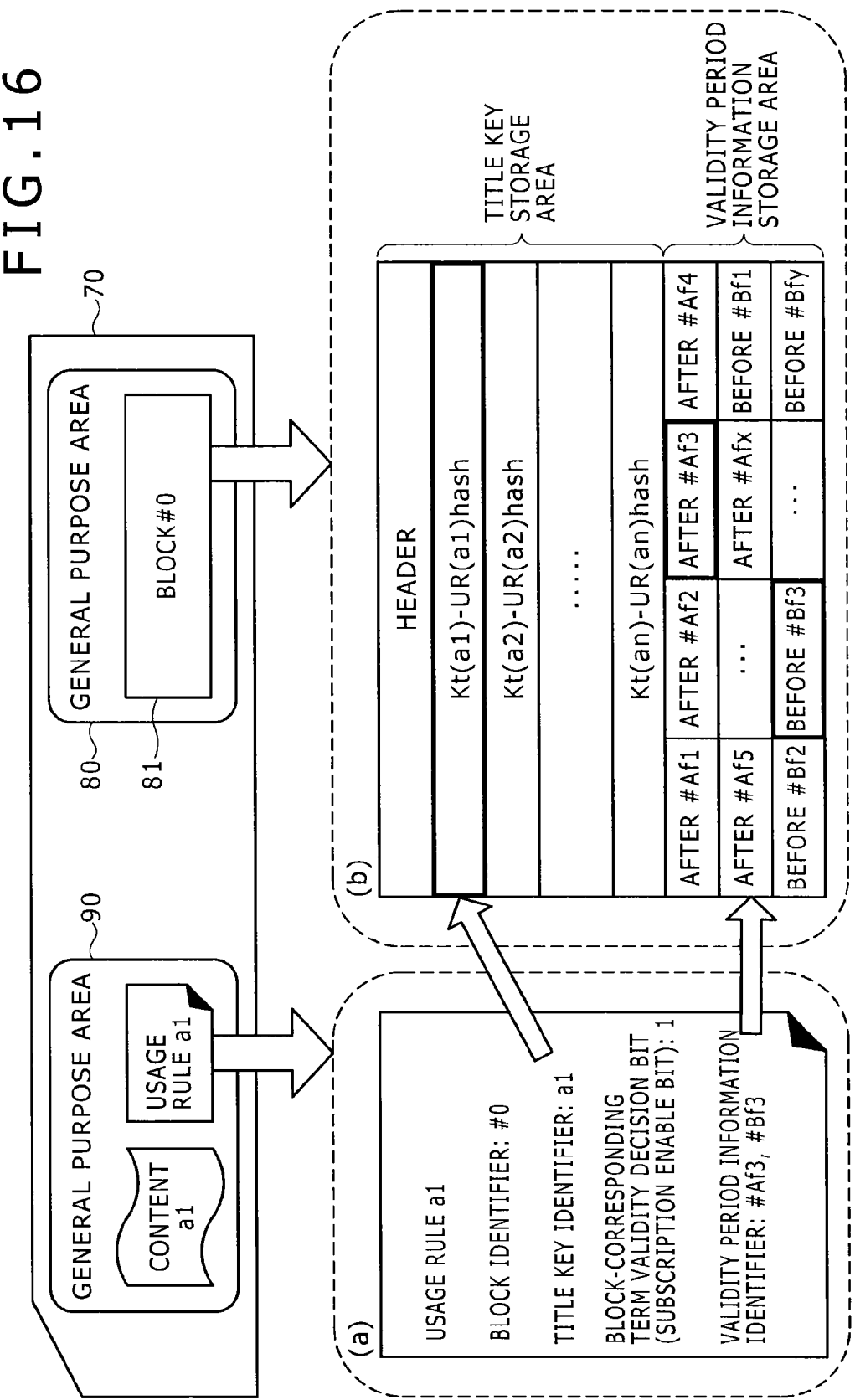
FIGS. 16 and 17 are diagrammatic views illustrating an example of a configuration wherein validity period information corresponding to a plurality of blocks is set to one block.

FIG. 16 illustrates an example of recorded data in the general purpose area 90 of the memory card 70 in which contents are recorded and recorded data of one block #0 81 of the protected area 80 of the memory card 70.

In the general purpose area 90, the following data:
a content a1 and
utilization controlling information (Usage Rule) a1
corresponding to the content a1
are recorded.

It is to be noted that, in the general purpose area 90, a large number of data sets including a content and utilization controlling information of the content are recorded additionally.

Meanwhile, in one block #0 81 of the protected area 80 for exclusive use for the server A from which the content a1 has been provided, title keys corresponding to a providing content of the server A are recorded in a title key storage area.

> In particular, such data as
> Kt(a1)-UR(a1)hash
> Kt(a2)-UR(a2)hash
> .
> .
> .
> Kt(an)-UR(an)hash illustrated in FIG. 16 are recorded. It is to be noted that each of the title keys is stored as a result of an XOR arithmetic operation with a hash value of the utilization controlling information (Usage Rule) as described hereinabove.

In the one block #0 81 of the protected area 80 for exclusive use for the server A, a validity period information storage area in which a plurality of validity period data are recorded is set in addition to the title keys described above.

In particular, such data as
After #Af1, After #Af2, After #Af3, . . .
Before #Bf1, Before #Bf2, Before #Bf3, . . .
are recorded in the validity period information storage area.

The data After #Af1, After #Af2, After #Af3, . . . are particularly such data as
After #Af1=After 2011/09/01
After #Af2=After 2011/10/01
After #Af3=After 2011/11/01.

The data After #Afn (n=1, 2, 3, . . . ) represents that utilization of the content is permitted on and after the date set thereto.

In this manner, information of a plurality of different validity period starting dates is recorded as the data After #Af1, After #Af2, After #Af3, . . . .

Meanwhile, the data Before #Bf1, Before #Bf2, Before #Bf3, . . . are particularly such data as
Before #Bf1=Before 2011/09/30.
Before #Bf2=Before 2011/10/31
Before #Bf3=Before 2011/11/30

The data Before #Bfn represents that utilization of the content is permitted on and before the date set thereto.

In this manner, information of a plurality of different validity period ending dates is recorded as the data Before #Bf1, Before #Bf2, Before #Bf3, . . . .

(a) of FIG. 16 illustrates a particular example of the utilization controlling information (Usage Rule) a1 corresponding to the content a1 recorded in the general purpose area 90.

In the utilization controlling information (Usage Rule), such data as block identifier, title key identifier, block-corresponding term validity decision bit, and validity period information identifier are recorded.

The block identifier is information representative of a storing block of a title key Kt(a1) for a content Con(a1) corresponding to the utilization controlling information (Usage Rule) UR(a1).

In the present example, the block identifier is #0, and the user apparatus or host apparatus which executes content reproduction can select the block #0.

The title key identifier is information representative of which one of a large number of title keys stored in the block #0 is for the corresponding content Con(a1) to the utilization controlling information (Usage Rule) UR(a1).

In the present example, the title key identifier is a1, and therefore, the title key Kt(a1) can be selected.

The block-corresponding term validity decision bit is information described hereinabove in connection with the preceding embodiment.

If the setting of the block-corresponding term validity decision bit (Subscription Enable Bit) is the bit "0" indicative of invalidity, then the validity period information in the utilization controlling information (Usage Rule) is referred to.

On the other hand, if the setting of the block-corresponding term validity decision bit (Subscription Enable Bit) is the bit "1" indicative of validity, then the validity period information recorded in the block in the protected area in which a title key corresponding to the content is stored is referred to.

The validity period information identifier is recorded in the case where the setting of the block-corresponding term validity decision bit (Subscription Enable Bit) is the bit "1" indicative of validity, or in other words, where the validity period information recorded in the block is valid.

This validity period information identifier represents which one of a large number of validity periods recorded in the validity period information storage area of the block is to be utilized.

In the example illustrated in FIG. 16, the validity period information identifier indicates the setting as validity period information identifier=Af3, Bf3. Actually, such data as After #Af3=After 2011/11/01 and Before #Bf3=Before 2011/11/30 are recorded.

Therefore, the valid utilization period of the corresponding content Con(a1) of the utilization controlling information (Usage Rule) UR(a1) is 2011/11/01 to 2011/11/30.

In this manner, the user apparatus or host apparatus which executes content reproduction can selectively utilize a validity period corresponding to the content from among a large number of validity periods set to the block based on the validity period information identifier recorded in the utilization controlling information (Usage Rule).

According to the present example, when title keys corresponding to a large number of contents are to be recorded into one block, it is possible to record individual validity periods for the contents or the title keys.

It is to be noted that, also in this setting, an updating process of a validity period can be executed by carrying out a process of rewriting the validity period information recorded in the block, and rewriting of individual utilization controlling information is not required.

It is to be noted that, according to the configuration described above, also such setting can be used that one block is used commonly by a plurality of different content providing servers instead of setting one block to one content providing constituent such as, for example, to only one server.

Figure 17:
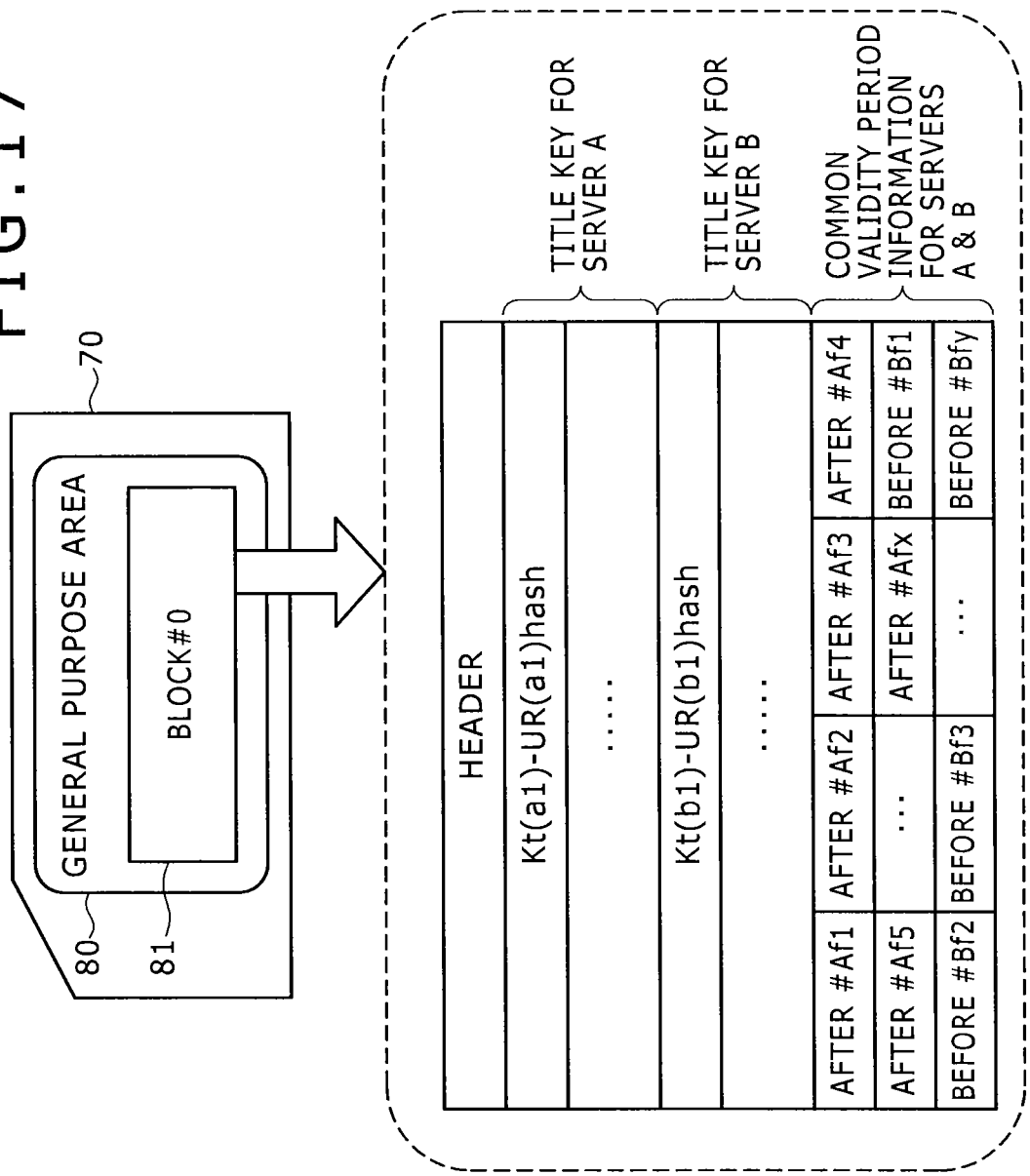

In particular, the title key storage area of one block is partitioned to set a title key storage area for the server A and another title key storage area for the server B as seen in FIG. 17.

Each of the content providing servers stores title keys corresponding to contents provided thereby into the respective title key storage area.

Meanwhile, the validity period information storing area is utilized commonly by the servers A and B.

Each of the servers records, when it provides a content, the various kinds of information described hereinabove with reference to (a) of FIG. 16, that is, block identifier, title key identifier, block-corresponding term validity decision bit, and validity period information identifier into the utilization controlling information (Usage Rule) in the general purpose area of the memory card.

By using such settings as described above, it is possible to allow one block to be used commonly by a plurality of servers to freely set a validity period in a unit of a server and in a unit of a content.

Figure 18:
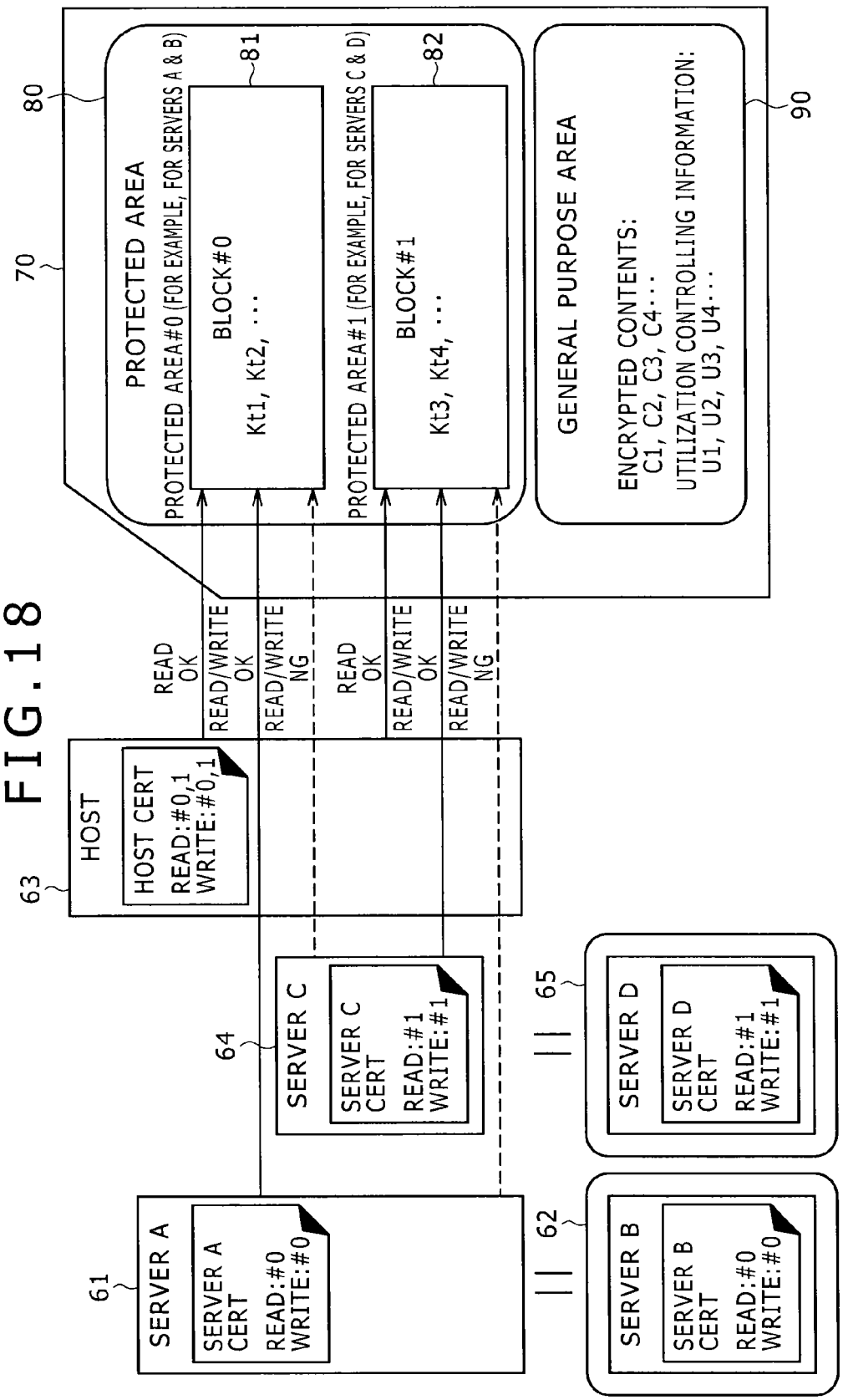
FIG. 18 is a diagrammatic view illustrating examples wherein one block is utilized by a plurality of servers in the configuration wherein validity period information corresponding to a plurality of blocks is set to one block.

An example of access privilege setting of servers in a setting example wherein one block of a memory card is used as title key writing areas for a plurality of servers in this manner is shown in FIG. 18.

FIG. 18 shows four servers including a server A 61, another server B 62, a further server C 64 and a still further server D 65.

The server A 61 and the server B 62 have an access privilege (Read/Write) to the block #0 81 of the protected area 80 of the memory card.

The server C 64 and the server D 65 have an access privilege (Read/Write) to the different block #1 82 of the protected area 80 of the memory card.

In such a case as just described, a server certificate owned by each server is recorded such that, as seen in FIG. 18, the server certificates owned by the server A 61 and the server B 62 have recorded therein access privilege (Read/Write) permission information to the block #0 81 and the server certificates owned by the server C 64 and the server D 65 have recorded therein access privilege (Read/Write) permission information to the block #1 82.

An example of data recorded in the memory card in such settings as described above is illustrated in FIG. 19.

As seen in FIG. 19, contents and utilization controlling information (Usage Rule) provided by the servers A to D are recorded in the general purpose area of the memory card.

Meanwhile, in the protected area of the memory card, the block #0 has stored therein title keys corresponding to providing contents of the server A and the server B, and the block #1 has stored therein title keys corresponding to providing contents of the server C and the server D.

It is to be noted that each title key is stored, for example, as a result of an XOR arithmetic operation thereof with a hash value of utilization controlling information (Usage Rule).

As described hereinabove, with the present configuration, it is possible to set validity periods individually for contents corresponding to title keys recorded in one block of the protected area. Also it is possible to achieve a setting wherein one block is used as a shared block which can be utilized by a plurality of servers.

8. Example of a Processing of Recording First Time Utilization Information of a Content Although it is possible to set absolute term information like such validity period as above described "2011/10/01 to 2011/10/31," also it is possible to apply such a form that a predetermined period from a point of time of first time utilization of the user as a start point such as one month from the date of first utilization of a content by the user is set as a utilization permission period.

In the case where such a utilization permission period as described above is set, the utilization permission period varies depending upon the time of the first-time utilization of the user, and consequently, period setting from the date of provision of a content from the server cannot be carried out. Further, the server cannot fixedly set a utilization term.

In the following, an example of a process which makes it possible to set such a content utilization term which depends upon the user process as described above is described.

An example of setting of recorded data in the protected area of the memory card for implementing the process just described is described with reference to FIG. 20.

Figure 20:
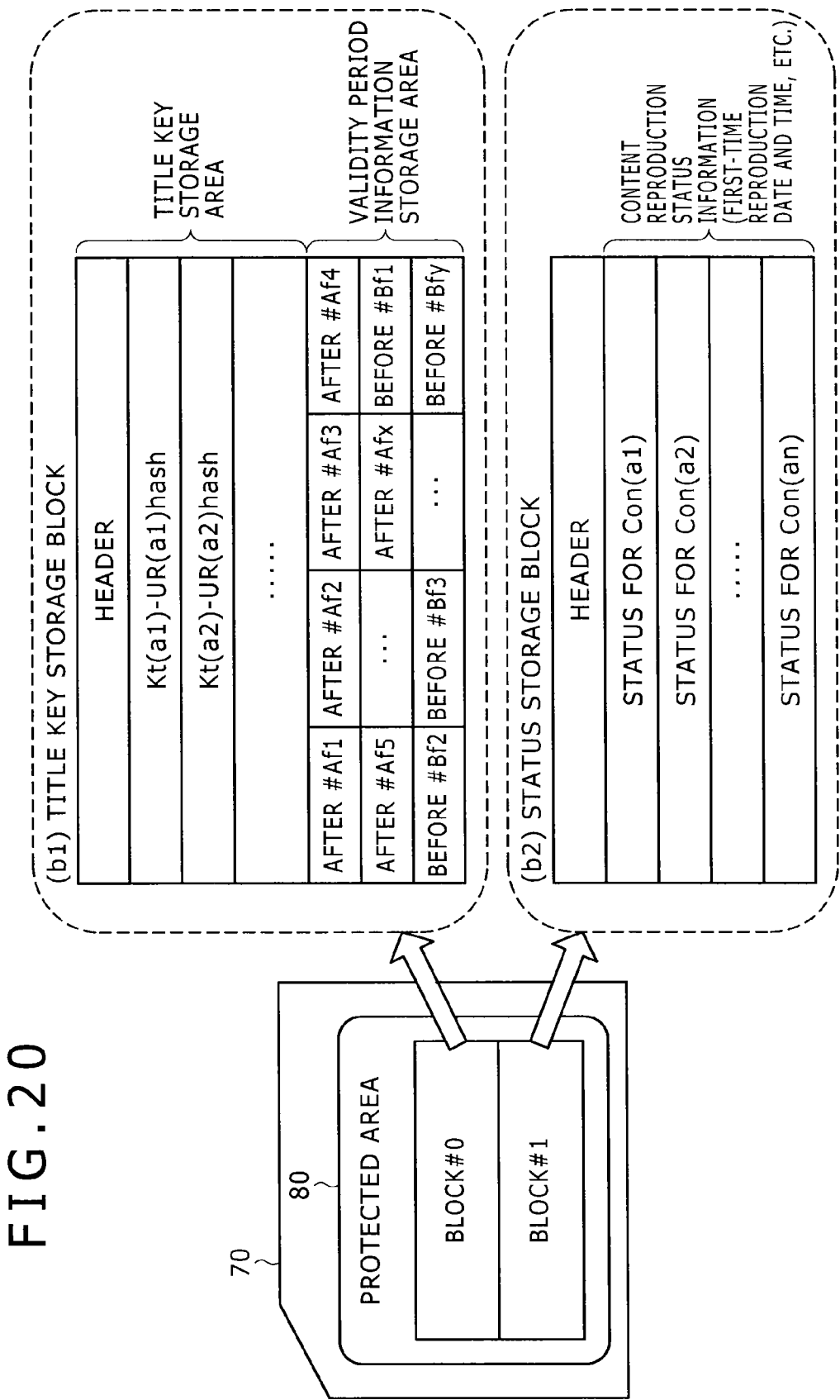
FIGS. 20, 21 and 22 are diagrammatic views illustrating different examples wherein status information upon first-time reproduction date and time of a content or the like is recorded and a content utilization term in accordance with the status information is set.

FIG. 20 illustrates an example of recorded data in two blocks set in the protected area 80 of the memory card 70, that is, in the block #0 and the block #1.

The block #0 is an area for recording data similar to those in the block #0 described hereinabove with reference to FIG. 16 in connection with the preceding embodiment.

In particular, the block #0 is an area in which title keys and validity period information are recorded as shown in (b1) of FIG. 20. This block is referred to as title key storage block.

In the present embodiment, a different block in the protected area 80 is utilized in addition to the title key storage block.

The different block is the block #1 illustrated in FIG. 20 and a status storage block illustrated in (b2) of FIG. 20.

Into this status storage block, first-time reproduction date and time information corresponding to contents Con(a1), Con(a2), . . . recorded in the general purpose area of the memory card are recorded.

For example, in (b2) of FIG. 20, status for Con(a1) denotes a recording area for first-time reproduction date and time information of the content Con(a1), and status for Con(a2) denotes a recording area for first-time reproduction date and time information of the content Con(a2).

It is to be noted that the first-time reproduction date and time information of the contents is recorded by the user apparatus or host apparatus which executes content reproduction.

The user apparatus or host apparatus retains a host certificate in which write permission information into the block #1 is recorded.

When the user apparatus or host apparatus reproduces a content, for example, the content Con(a1), for the first time, the apparatus records the first-time reproduction date and time information into the "Status for Con(a1)" area illustrated in (b2) of FIG. 20.

Examples of the configuration of the utilization controlling information (Usage Rule) in the present embodiment are described with reference to FIGS. 21 and 22.

Figure 21:
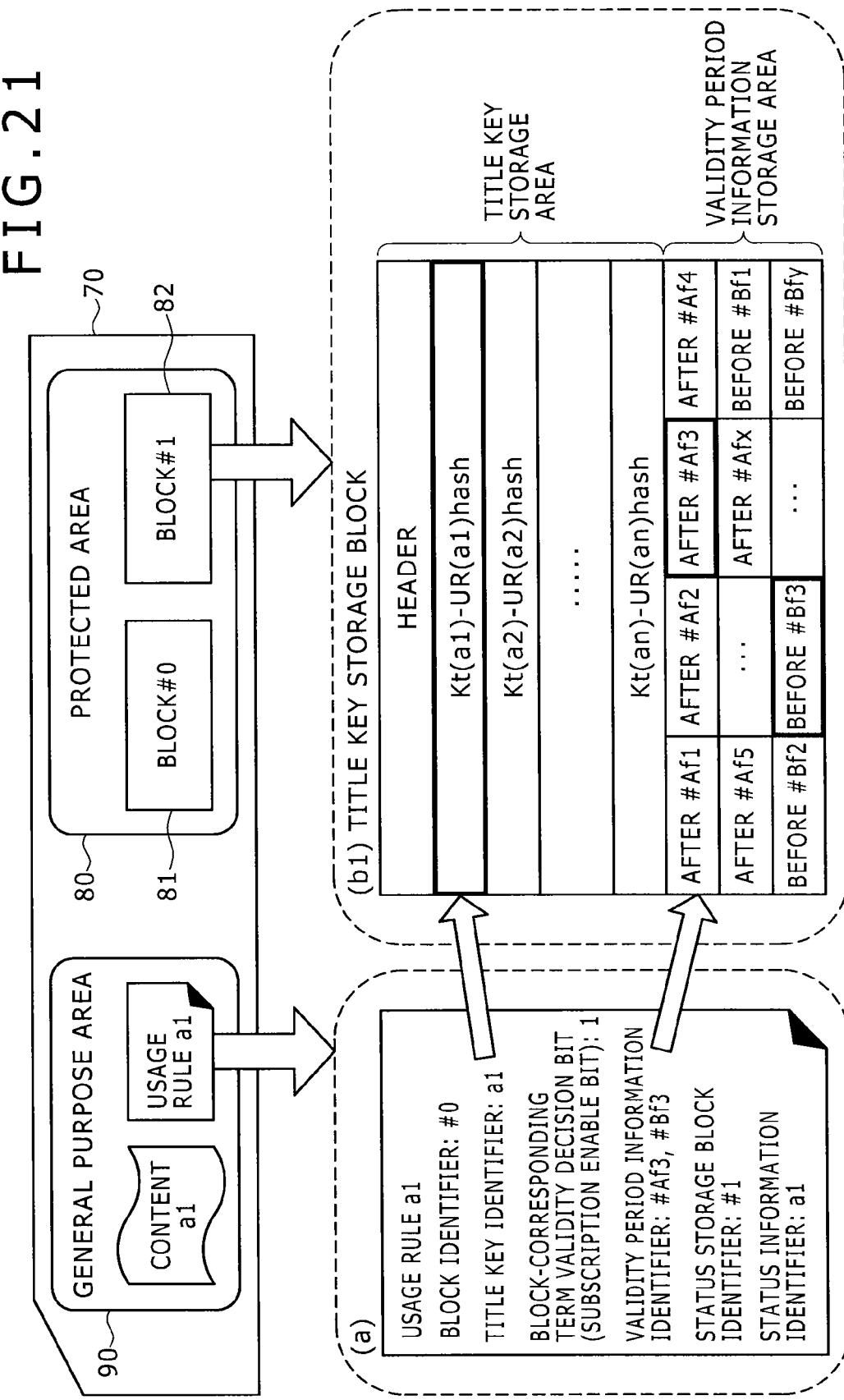

FIG. 21 illustrates an example of recorded data in the general purpose area 90 of the memory card 70 in which a content is recorded and recorded data in the block #0 81 which is a title key storage block of the protected area 80.

Figure 22:
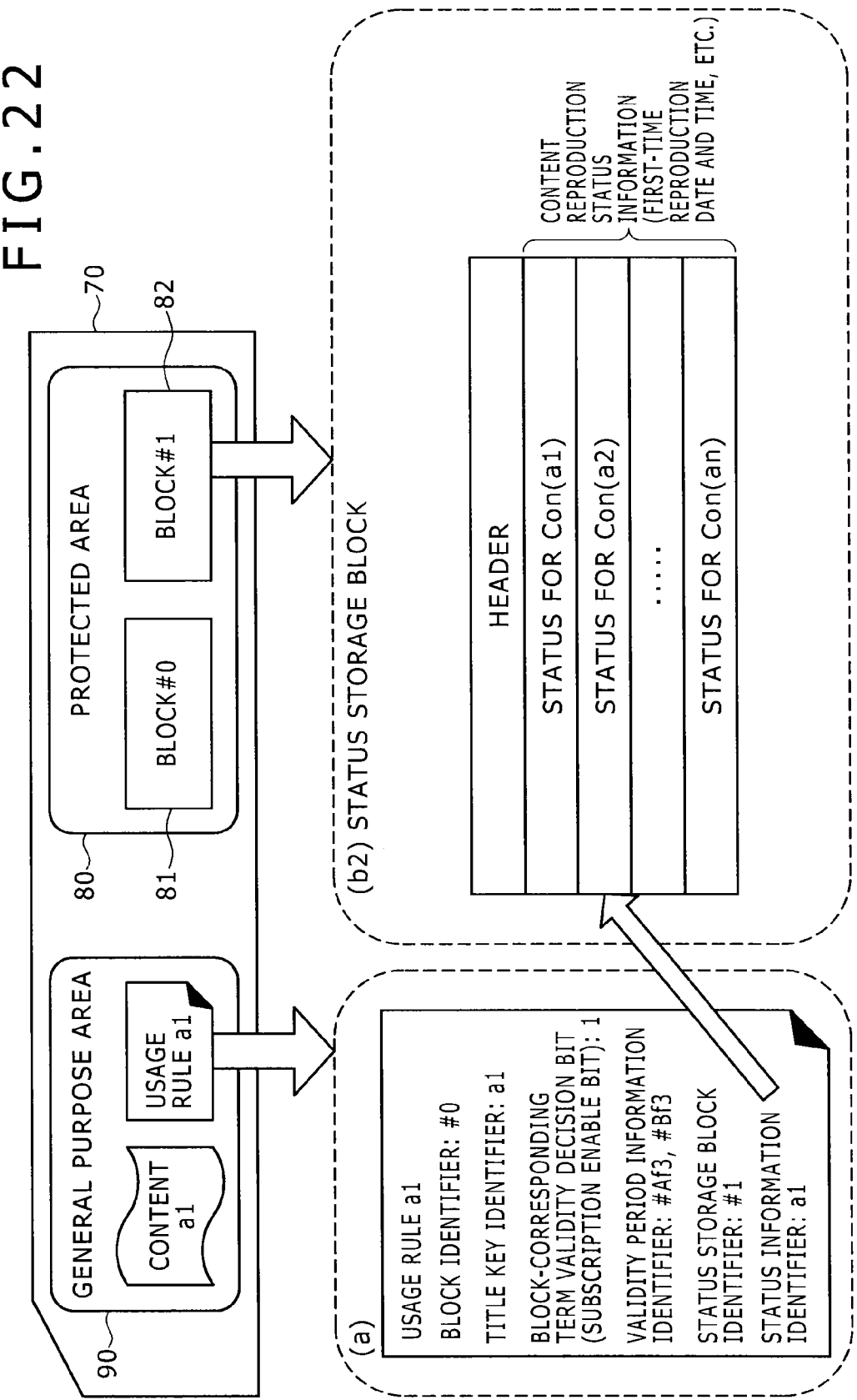

FIG. 22 illustrates an example of recorded data in the block #1 82 which is a status storage block of the protected area 80.

In the general purpose area 90 illustrated in FIG. 21, the following data:

a content a1 and
utilization controlling information (Usage Rule) corresponding to the content a1
are recorded.

It is to be noted that, in the general purpose area 90, data sets of a large number of contents and utilization controlling information of them are recorded.

On the other hand, in the title key storage area of the block #0 81 which is a title key storage block of the protected area 80 for exclusive use for the server A from which the content a1 is provided, title keys corresponding to providing contents of the server A are recorded as seen in (b1) of FIG. 21.

In particular, such data as

Kt(a1)-UR(a1)hash
Kt(a2)-UR(a2)hash
.
.
.
Kt(an)-UR(an)hash illustrated in FIG. 16 are recorded. It is to be noted that each of the title keys is stored as a result of an XOR arithmetic operation with a hash value of the utilization controlling information (Usage Rule) as described hereinabove.

In the one block #0 81 of the protected area 80 for exclusive use for the server A, a validity period information storage area in which a plurality of validity period data are recorded is set in addition to the title keys. In particular, validity period data After #Af1, After #Af2, After #Af3, . . . and Before #Bf1, Before #Bf2, Before #Bf3, . . . are stored in the validity period information storage area.

The data mentioned include data similar to those described hereinabove with reference to FIG. 16.

For example, the validity period data After #Af1, After #Af2, and After #Af3 are particularly such data as After #Af1=After 2011/09/01
After #Af2=After 2011/10/01
After #Af3=After 2011/11/01.

Each data After #Afn indicates that utilization of the content is permitted on and after the date set therein.

Meanwhile, the validity period data Before #Bf1, Before #Bf2, and Before #Bf3 are particularly such data, for example, as Before #Bf1=Before 2011/09/30
Before #Bf2=Before 2011/10/31
Before #Bf3=Before 2011/11/30.

Each data Before #Bfn indicates that utilization of the content is permitted on and before the date set therein.

The present embodiment has a configuration which can carry out such a validity period setting as After #Afp=After (Status for Con(xy)) or
Before #Bfq=Before (status for Con(xy)+one month)

in addition to such actual date information as described above.

The data After #Afp=After (Status for Con(xy)) represents that a period on and after the first-time reproduction date and time of the content recorded in the status storage block illustrated in (b2) of FIG. 20 is a utilization permission period of the content.

The data Before #Bfq=Before (Status for Con(xy)+one month) represents that a period until one month elapses after the first-time reproduction date and time of the content recorded in the status storage block illustrated in (b2) of FIG. 20 is a utilization permission period of the content.

By utilizing such settings, it is possible to set content validity period information corresponding to the first-time reproduction date and time of the content recorded in the status storage block illustrated in (b2) of FIG. 20.

(a) of FIG. 21 illustrates a particular example of the utilization controlling information (Usage Rule) a1 corresponding to the content a1 recorded in the general purpose area 90.

In the utilization controlling information (Usage Rule), such data as block identifier, title key identifier, block-corresponding term validity decision bit, validity period information identifier, status storage block identifier, and status information identifier are recorded.

The block identifier to the validity period information identifier are similar information to the information described hereinabove with reference to FIG. 16, and overlapping description of them is omitted herein to avoid redundancy.

The data are information corresponding to the title key storage block illustrated in (b1) of FIG. 21.

The data of the status storage block identifier and status information identifier are described below with reference to FIG. 22.

The data are information corresponding to the status storage block #1 82.

The status storage block identifier is information indicative of a status storage block in which status information of the corresponding content Con(a1) of the utilization controlling information (Usage Rule) UR(a1) is stored.

In the present example, the status storage block identifier=#1, and the user apparatus or host apparatus which executes content reproduction can discriminate that the storage block of the status information is the block #1.

The status information identifier is information indicative of which one of a large number of pieces of status information stored in the status storage block, that is, the block #1, represents a status of the corresponding content Con(a1) of the utilization controlling information (Usage Rule) UR(a1).

In the present example, the status information identifier=a1, and the status information (a1) can be selected.

In the block #1 82 which is a status storage block set to the protected area 80 of the memory card 70 illustrated in (b2) of FIG. 22, first-time reproduction date and time of the content is recorded.

The first-time reproduction date and time of the content is recorded by the user apparatus or host apparatus which utilizes the content.

It is to be noted that, upon content provision by a server, in the block #1 82 which is a status storage block set in the protected area 80 of the memory card 70, the content utilization starting date data is not recorded, but only a status data recording area for recording first-time reproduction date and time is set.

Each server records, upon content provision, the various kinds of information described hereinabove with reverence to (a) of FIG. 22, that is, block identifier, title key identifier, block-corresponding term validity decision bit, validity period information identifier, status storage block identifier, and status information identifier into the utilization controlling information (Usage Rule) in the general purpose area of the memory card.

Further, each server sets a recording area for the "content first-time reproduction date and time" as status information into the status storage block of the protected area of the memory card as described hereinabove.

When the user apparatus or host apparatus which executes content reproduction carries out first-time reproduction of the content, it records actual first-time reproduction date and time data into the status storage block of the protected area of the memory card.

A process executed by a server which executes a content providing process is described with reference to FIG. 23.

Figure 23:
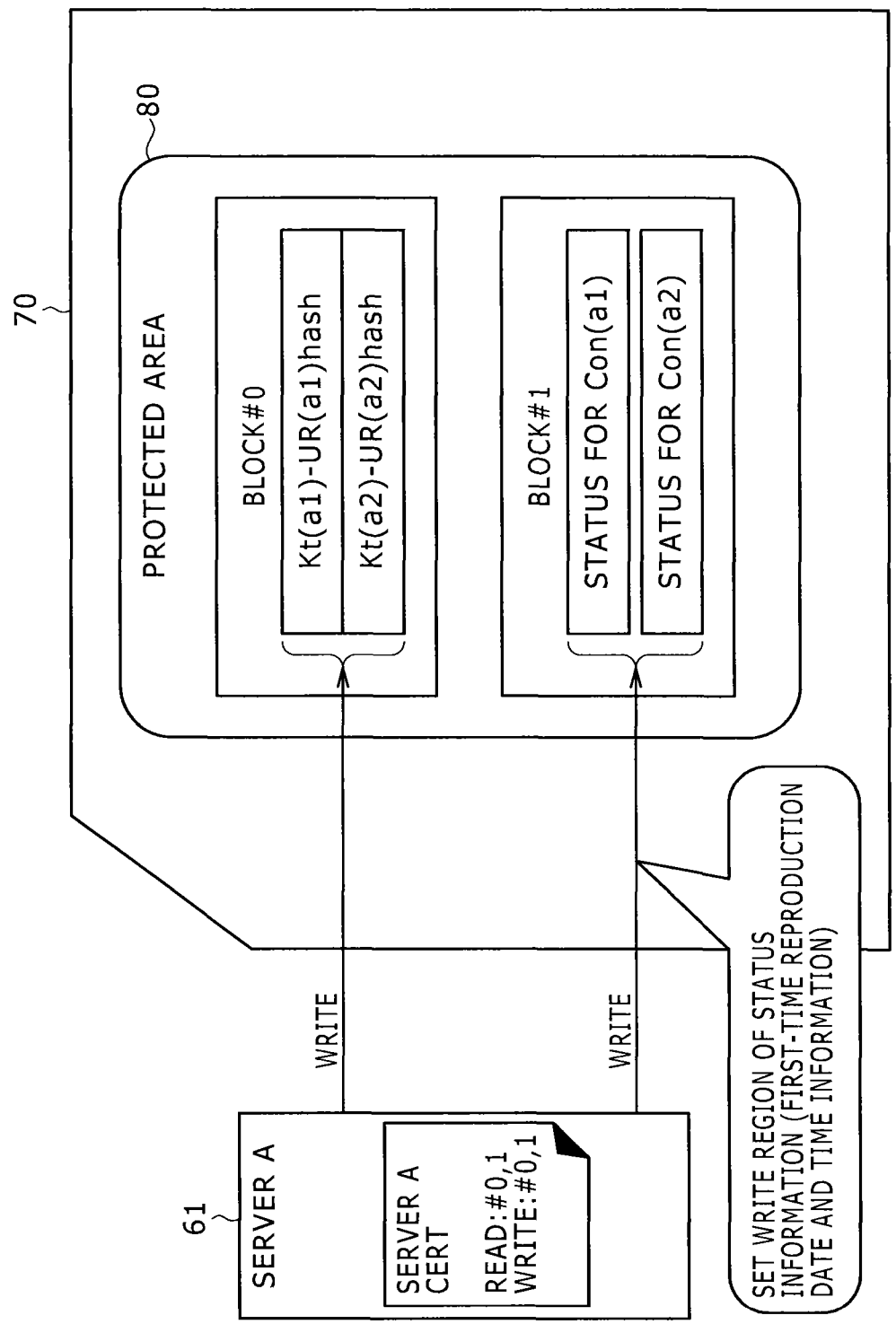
FIG. 23 is a schematic view illustrating a process of a server in the examples wherein status information upon first-time reproduction date and time of a content or the like is recorded and a content utilization term in accordance with the status information is set.

FIG. 23 illustrates a data recording process into the protected area 80 of the memory card 70 which is executed by the server A 61 which provides a content.

It is to be noted that the server A 61 executes, in addition to the data recording process into the protected area 80 illustrated in FIG. 23, a recording process of the content and the utilization controlling information (Usage Rule) described hereinabove with reference to FIGS. 21 and 22 into the general purpose area of the memory card 70.

As seen in FIG. 23, the server A 61 records title keys corresponding to a providing content into the block #0 81 which is a title key storage block of the protected area 80 of the memory card 70.

Further, prior to this recording process of the title key, the server A 61 sets a status recording area for the providing content to the block #1 82 of the protected area 80 of the memory card 70, and sets a recording region for the utilization starting date of each content.

The server A 61 retains a server certificate in which write permission information into the block #0 81 and the block #1 82 is recorded and presents the server certificate to the memory card 70. The server A 61 carries out a writing process of the title keys and recording area setting for status information into and to the blocks in response to a result of the access privilege decision process of the memory card 70.

Figure 24:
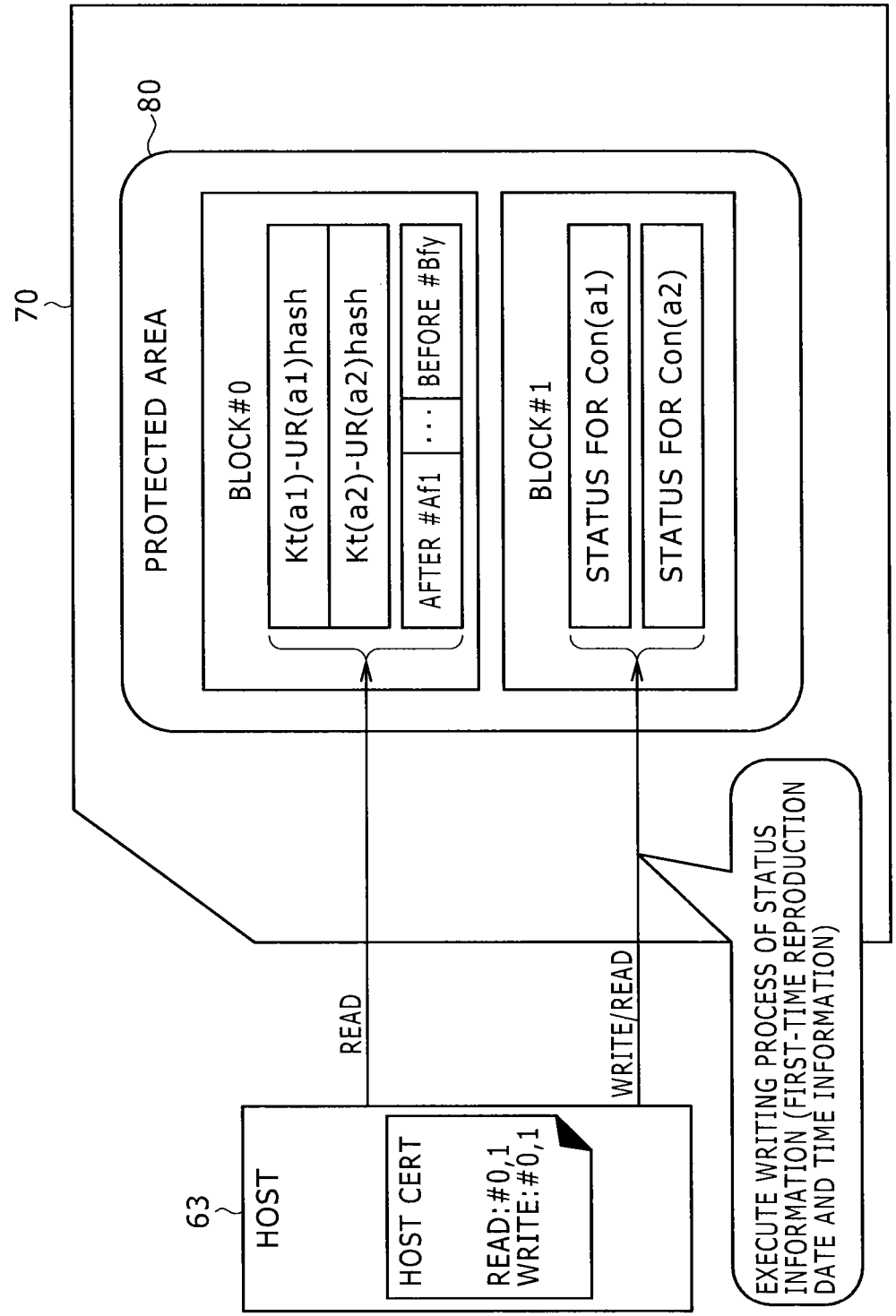
FIG. 24 is a schematic view illustrating a process of the host in the examples wherein status information upon first-time reproduction date and time of a content or the like is recorded and a content utilization term in accordance with the status information is set.

Now, a process of the host apparatus 63 which carries out content utilization is described with reference to FIG. 24.

When the host apparatus 63 utilizes a content, it discriminates a storage block of a title key and a storage block of a status in accordance with recorded information of the utilization controlling information (Usage Rule) corresponding to the utilizing content.

The processes are carried out in accordance with the recorded information of the utilization controlling information (Usage Rule) described hereinabove with reference to FIGS. 21 and 22.

The host apparatus 63 acquires the title keys corresponding to the utilization content from the block #0 81 which is a storage block of the title key.

Further, upon first-time reproduction of the content, the host apparatus 63 records first-time reproduction date and time information into the status information recording area of the status storage block.

It is to be noted that, upon this recording of the date and time information, preferably the host apparatus 63 acquires and records accurate date and time information from a reliable time information providing server or the like.

Not in the first-time reproduction process but in a later reproduction process of the content, the host apparatus 63 refers to the first-time reproduction date and time information recorded in the status information recording area of the status storage block and further refers to the validity period information recorded in the status information recording area of the status storage block to decide whether or not the current date is within the validity period of the content.

For example, it is assumed that the first-time reproduction date and time information recorded in the status information recording area in regard to a certain content Con(xy) is 2011/09/01.

Further, it is assumed that, in the utilization controlling information (UR: Usage Rule) corresponding to the content Con(xy), validity period information identifiers including block identifier #0 and validity period information identifiers #Afp and #Bfq are recorded.

The user apparatus or host apparatus selectively acquires the validity period information of the validity period information identifies #Afp and #Bfq from the block #0 of the protected area. It is assumed that the validity period information is set in the following manner:

After #Afp=After (Status for Con(xy)),

Before #Bfq=Before (Status for Con(xy)+one month).

In the case of this setting, the utilization permission period of the content is 2011/09/01 to 2011/09/31.

The user apparatus decides whether or not the current date is included in the content utilization permission period. If the current date is included in the content utilization permission period, then decryption and reproduction of the content are carried out. However, if the current date is not included in the content utilization permission period, then the content utilization is stopped.

It is to be noted that the current date and time information is preferably acquired from a reliable time information providing server or the like.

While, in the foregoing description, it is described that the first-time reproduction date and time recorded as the validity period information or the status information is set to a unit of a day, it may otherwise be set to a unit of time such as a unit of an hour, a minute and a second.

Now, a content reproduction process sequence by the user apparatus or host apparatus which carries out content utilization is described with reference to flow charts illustrated in FIGS. 25 and 26.

Figure 25:
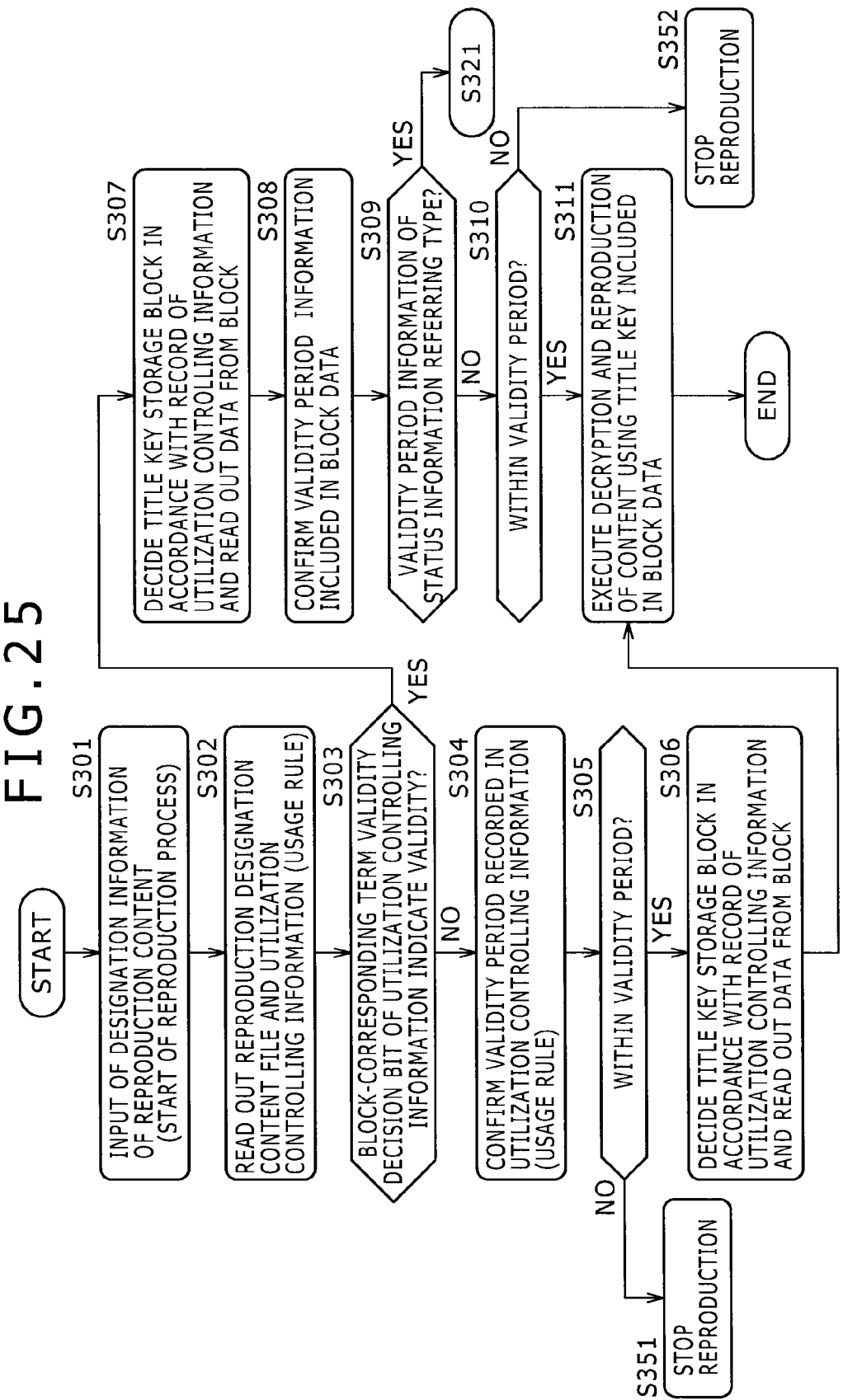
FIGS. 25 and 26 are flow charts illustrating a process of the host in the examples wherein status information upon first-time reproduction date and time of a content or the like is recorded and a content utilization term in accordance with the status information is set.
Figure 26:
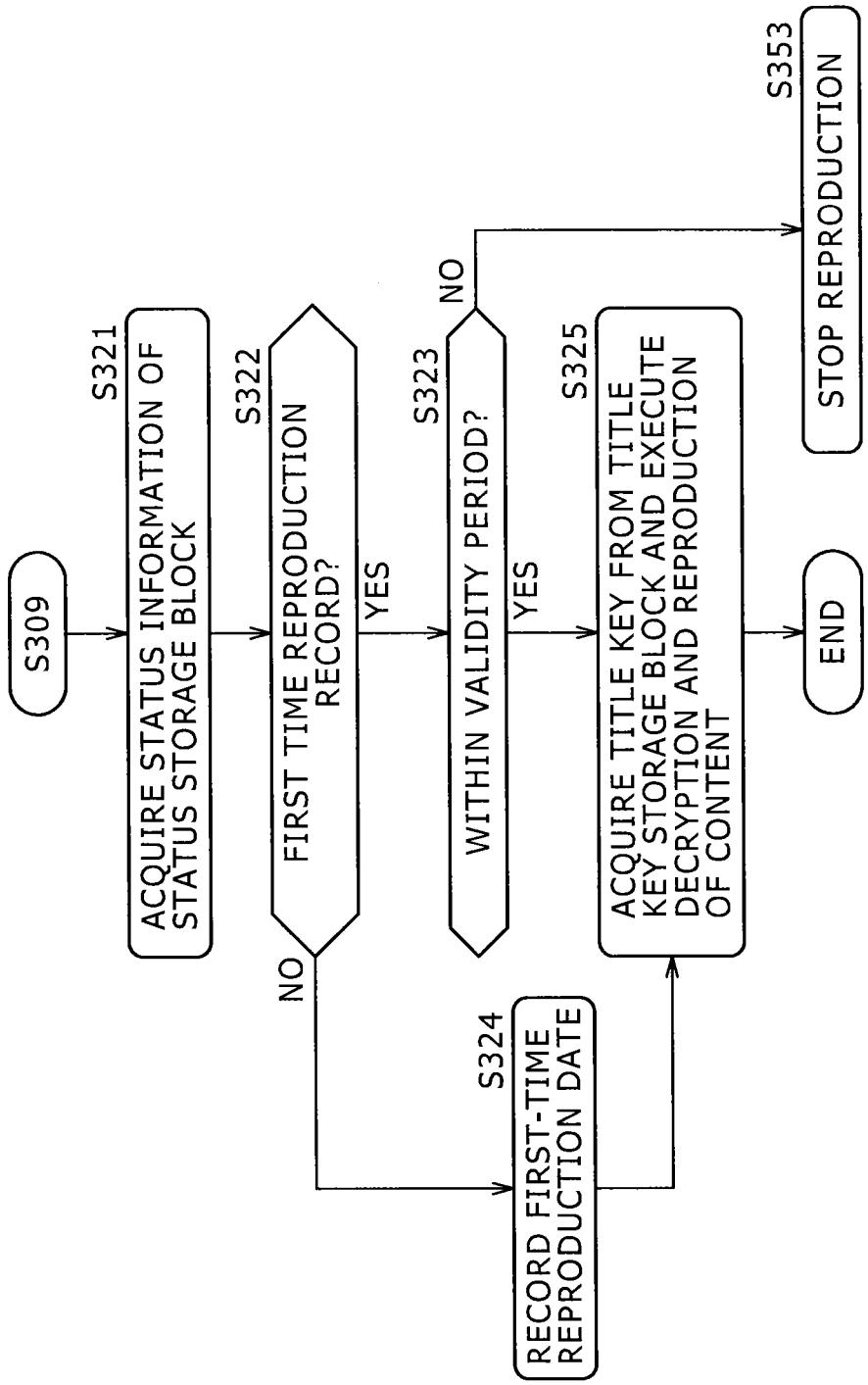

The process in accordance with the flow illustrated in FIGS. 25 and 26 is executed by a data processing section such as a CPU of the user apparatus in accordance with a content reproduction program or host application stored in the user apparatus.

First, at step S301, the data processing section of the user apparatus detects an input of reproduction content designation information from the user. For example, the data processing section detects an input of content designation information which is an input of the user, for example, on a content list as a menu displayed on a display section of the reproduction apparatus.

Then at step S302, the data processing section reads a reproduction designation content and utilization controlling information from the general purpose area of a memory card loaded in the user apparatus.

In particular, the data processing section acquires the utilization object content Con(xy), and the corresponding utilization controlling information UR(xy).

Then at step S303, the data processing section refers to the read utilization controlling information UR(xy) to confirm the setting of the block-corresponding term validity decision bit (Subscription Enable Bit) of the utilization controlling information UR(xy).

If the bit setting is the bit "0" representative of invalidity, then the processing advances to step S304. However, if the bit setting is the bit "1" indicative of validity, then the processing advances to step S307.

When the bit setting is the bit "0" representative of invalidity and the processing advances to step S304, the data processing section refers to the validity period information in the utilization controlling information (Usage Rule) at step S304.

At step S305, the data processing section decides whether or not the current date is within the validity period. If it is decided that the current date is not within the validity period, then the processing advances to step S351, at which the processing is stopped. In other words, the decryption and utilization processes of the content are not executed.

On the other hand, if it is decided at step S305 that the current date is within the validity period, then the processing advances to step S306.

At step S306, the data processing section decides a title key storage block recorded in the utilization controlling information (Usage Rule) and reads data from the block.

Finally at step S311, the data processing section acquires a title key stored in the data read from the block and carries out a decryption process of the content utilizing the title key and then carries out reproduction and utilization of the content.

It is to be noted that a stored title key in the block is stored as a result of an exclusive ORing (XOR) arithmetic operation with a hash value of the utilization controlling information (Usage Rule). The data processing section carries out acquisition of a title key by calculation of the UR hash described above, an XOR arithmetic operation process with the UR hash and so forth.

On the other hand, if it is decided at step S303 that the setting of the block-corresponding term validity decision bit (Subscription Enable Bit) of the utilization controlling information UR(xy) is the bit "1" indicative of validity, then the processing advances to step S307. At step S307, the data processing section discriminates a title key storage block recorded in the utilization controlling information (Usage Rule) and reads data from the block.

Then at step S308, the data processing section carries out a reading out process of recorded data in the block and confirms the validity period information recorded as in-block data.

Further, at step S309, the data processing section decides whether or not the validity period information recorded as in-block data is of the status information referring type.

The status information referring type is above described type of validity period information of such settings as described below:

After #Afp=After (Status for Con(xy)),

Before #Bfq=Before (Status for Con(xy)+one month).

In the case of such settings as just described, if the validity period information is of the status information referring type, then the processing advances to step S321.

If the validity period information is not of such a status information referring type as described above, the processing advances to step S310.

At step S310, the data processing section compares the validity period information acquired from the block and the current date with each other to decide whether or not the current date is within the validity period.

If it is decided at step S310 that the current date is not within the validity period, then the processing advances to step S352, at which the processing is stopped. In other words, the decryption and utilization processes are not executed.

On the other hand, if it is decided at step S310 that the current date is within the validity period, then the processing advances to S311.

At step S311, the data processing section acquires a title key recorded in the block and carries out a decryption process of the content utilizing the title key and then carries out reproduction and utilization of the content.

On the other hand, if it is decided at step S309 that the validity period information recorded as in-block data is of the status information referring type, then the processing advances to step S321.

In this instance, the data processing section acquires, at step S321 illustrated in FIG. 26, status information designated from the status storage block in accordance with a record of the utilization controlling information file.

Then at step S322, the data processing section decides whether or not first-time reproduction date and time information is recorded in the acquired status information.

If first-time reproduction date and time information is recorded in the status information, then the processing advances to step S323.

On the other hand, if first-time reproduction date and time information is not recorded in the status information, then the processing advances to step S324.

When first-time reproduction date and time information is not recorded in the status information and the processing advances to step S324, the data processing section records the first-time reproduction date and time information as the status information. It is to be noted that, upon this first-time reproduction information recording process, preferably the data processing section acquires accurate time information from a reliable time information providing server or the like and carries out the recording process of the time information.

After the recording process of the first-time reproduction date and time information, the processing advances to step S325, at which the data processing section acquires a title key recorded in the title key storage block and carries out a decryption process of the content utilizing the title key and then carries out reproduction and utilization of the content.

On the other hand, if it is discriminated at step S322 that first-time reproduction date and time information is recorded in the acquired status information, then the processing advances to step S323.

At step S323, the data processing section decides whether or not the current date is within the validity period based on the first-time reproduction date and time information recorded in the status information and the validity period information of the status information referring type acquired at step S308.

If it is decided at step S323 that the current date is not within the validity period, then the processing advances to step S353, at which the processing is stopped. In other words, the decryption and utilization processes of the content are not executed.

On the other hand, if it is decided at step S323 that the current date is within the validity period, then the processing advances to step S325.

At step S325, the data processing section acquires a title key recorded in the block and carries out a decryption process of the content utilizing the title key and carries out reproduction and utilization of the content.

In this manner, in the present embodiment, validity period information recorded in a block is configured as information of a status information referring type which can be recorded by a user apparatus thereby to implement a configure which permits, in a configuration wherein a utilization permission period of a content is set depending upon a content reproduction process of a user, content utilization within the setting range of the validity period of the utilization permission period.

9. Move Process of a Content Between Media

Now, a process when a content is moved between different media in the configuration wherein status information is recorded as described above is described.

More particularly, a process when a content recorded in a first medium which is a certain memory card is moved to a second medium which is another memory card is described.

In the case where validity period information of the status referring type is set for a content of a move object, also the status information is moved together.

For example, when a move process of a content Con(xy), to which validity period information of the status referring type is set, between different media is carried out, a process of moving the content Con(xy), utilization controlling information UR(xy) corresponding to the content Con(xy), a title key Kt(xy) corresponding to the content Con(xy), validity period information of a storing block of title key Kt(xy), and corresponding status information of a status storage block recorded in the utilization controlling information UR(xy)

is carried out.

Upon such data movement, data reading from blocks of the protected area of the first memory card which is the move source medium and a data recording process into blocks in the protected area of the second memory card which is the move destination medium are carried out.

Accordingly, a process by a server which has an access privilege to the blocks is carried out.

A process of a server in a move process of a content is described with reference to FIGS. 27 and 28.

Figure 27:
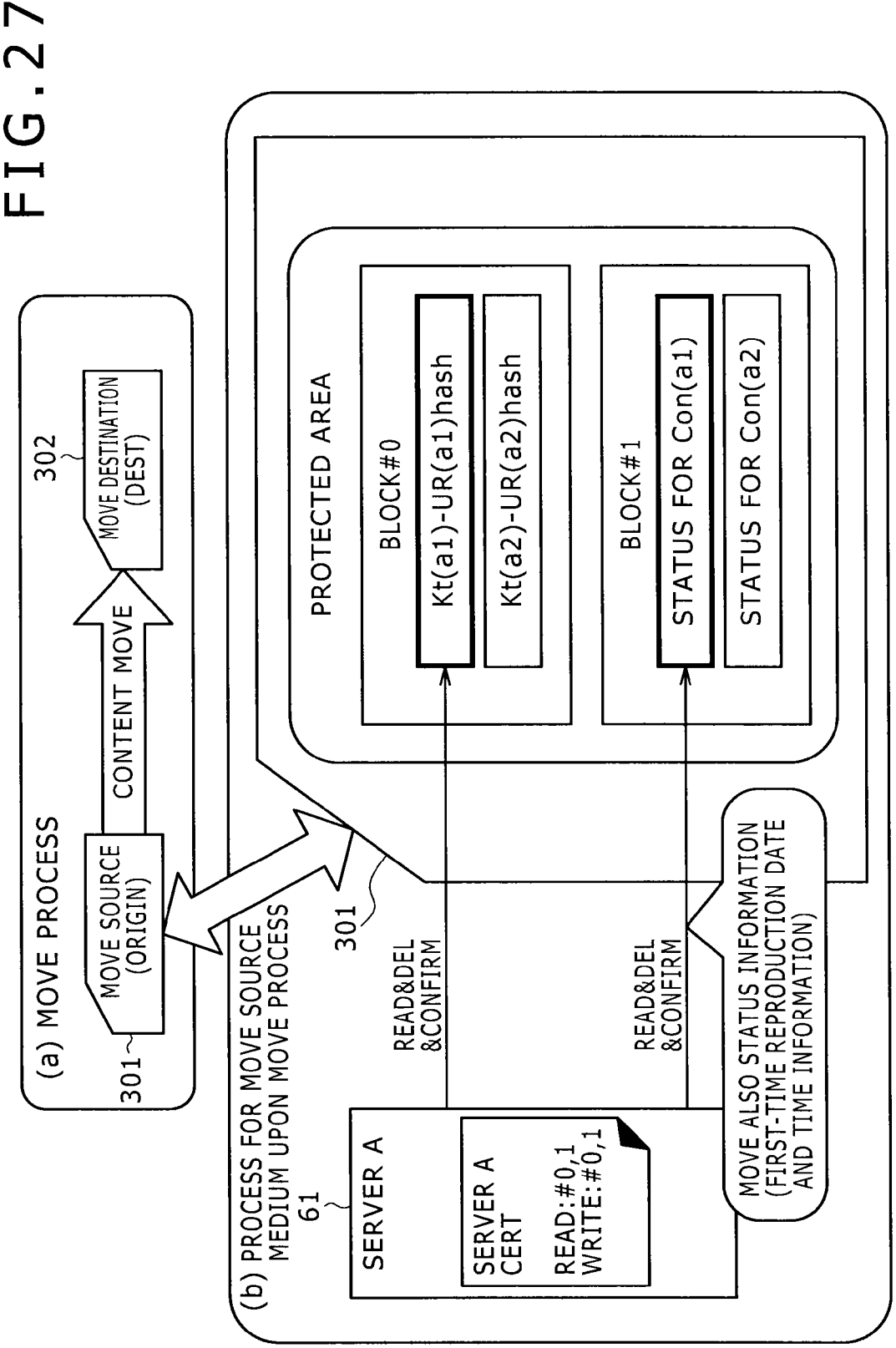
FIGS. 27 and 28 are diagrammatic views illustrating move processes of a content between different media.
Figure 28:
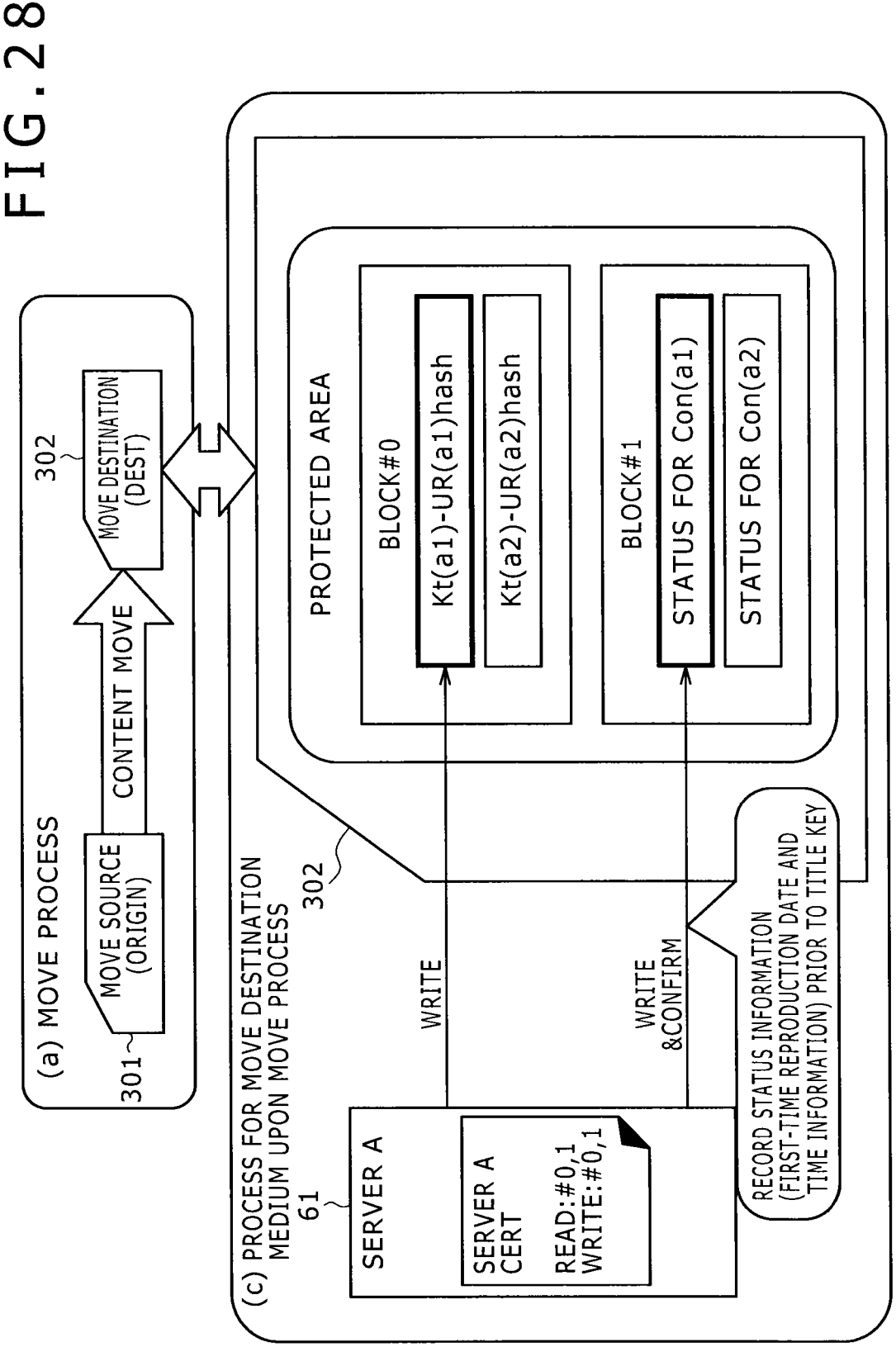

In particular, FIG. 27 illustrates a process for the move source medium, and FIG. 28 illustrates a process for the move destination medium.

It is to be noted that FIGS. 27 and 28 illustrate only processes for recording data of the protected area of the memory cards when a move process of a providing content of the server A 61 is executed.

The data movement of the general purpose area can be executed by the user apparatus.

First, the process for the move source medium is described with reference to FIG. 27.

The server A 61 reads out and acquires a title key corresponding to a move object content from the block #0 which is a title key storage block of a move source medium 301 and deletes title key data from the block #0.

Further, the server A 61 reads out and acquires status information corresponding to the move object content from the block #1 which is a status storage block of the move source medium 301 and then deletes the status information from the block #1.

By this process, the title key and the status information corresponding to the move object content are deleted from the move source medium 301.

Now, a process for the move destination medium is described with reference to FIG. 28.

The server A 61 records the title key corresponding to the move object content acquired from the move source medium into the block #0 which is a title key storage block of a move destination medium 302.

Further, the server A 61 records the status information corresponding to the move object content acquired from the move source medium into the block #1 which is a status storage block of the move destination medium 302.

By the processes, the title key and the status information corresponding to the move object content are recorded into the move destination medium 302.

It is to be noted that, upon the processes between the server A 61 and the move source medium 301 described above with reference to FIG. 27, a mutual authentication process between the server A 61 and the move source medium 301 is executed. Further, the move source medium 301 executes access privilege confirmation of the blocks based on a server certificate received from the server A 61.

Taking success in the authentication and confirmation of the access privilege as a condition, the process described hereinabove with reference to FIG. 27 is carried out.

Similarly, upon the processes between the server A 61 and the move destination medium 302 described above with reference to FIG. 28, a mutual authentication process between the server A 61 and the move destination medium 302 is executed. Further, the move destination medium 302 executes access privilege confirmation of the blocks based on a server certificate received from the server A 61.

Taking success in the authentication and confirmation of the access privilege as a condition, the process described hereinabove with reference to FIG. 28 is carried out.

10. Example of the Hardware Configuration of the Apparatus

Finally, examples of a hardware configuration of the apparatus which executes the processes described above are described with reference to FIGS. 29 and 30.

First, an example of the hardware configuration of a host apparatus which carries out a recording or reproduction process of data into or from a memory card loaded therein is described with reference to FIG. 29.

A CPU (Central Processing Unit) 701 functions as a data processing section which executes various processes in accordance with a program stored in a ROM (Read Only Memory) 702 or a storage section 708. For example, the CPU 701 executes a content reception process from a broadcasting station or a server, a recording process of reception data into a memory card, which is a removable medium 711 in FIG. 29, a data reproduction process from the memory card, that is, from the removable medium 711, and other processes. Programs to be executed by the CPU 701, data and so forth are suitably stored into a RAM (Random Access Memory) 703. The CPU 701, ROM 702 and RAM 703 are connected to each other by a bus 704.

The CPU 701 is connected to an input/output interface 705 through the bus 704, and an inputting section 706 formed from various switches, a keyboard, a mouse, a microphone and so forth and an outputting section 707 formed from a display unit, a speaker and so forth are connected to the input/output interface 705. The CPU 701 executes various processes in accordance with an instruction inputted from the inputting section 706 and outputs a result of the processes, for example, to the outputting section 707.

The storage section 708 connected to the input/output interface 705 is configured, for example, from a hard disk drive and stores programs to be executed by the CPU 701 and various data. A communication section 709 communicates with an external apparatus through a network such as the Internet or a local area network.

A drive 710 connected to the input/output interface 705 drives the removable medium 711 such as a magnetic disk, an optical disk, a magneto-optical disk or a memory card and acquires various data such as a content or key information recorded in the removable medium 711. For example, using the acquired content or key information, a decryption and reproduction process of the content is carried out in accordance with a reproduction program executed by the CPU 701.

FIG. 30 shows an example of the hardware configuration of a memory card.

Referring to FIG. 30, a CPU (Central Processing Unit) 801 functions as a data processing section which executes various processes in accordance with a program stored in a ROM (Read Only Memory) 802 or a storage section 807. For example, the CPU 801 executes a communication process with a server or a host apparatus described hereinabove in the foregoing description of the embodiments, such processes as writing and reading into and from the storage section 807, an access permission/rejection decision process in a unit of a partitioned region of a protected area 811 of the storage section 807, and other processes. Programs to be executed by the CPU 801, data and so forth are suitably stored into a RAM (Random Access Memory) 803. The CPU 801, ROM 802 and RAM 803 are connected to each other by a bus 804.

The CPU 801 is connected to an input/output interface 805 through the bus 804, and a communication section 806 and the storage section 807 are connected to the input/output interface 805.

The communication section 806 connected to the input/output interface 805 executes communication, for example, with a server or a host apparatus. The storage section 807 is a storage area for data and has the protected area 811 access to which is limited as described hereinabove and a general purpose area 812 into and from which data can be recorded and read out freely.

Figure 29:
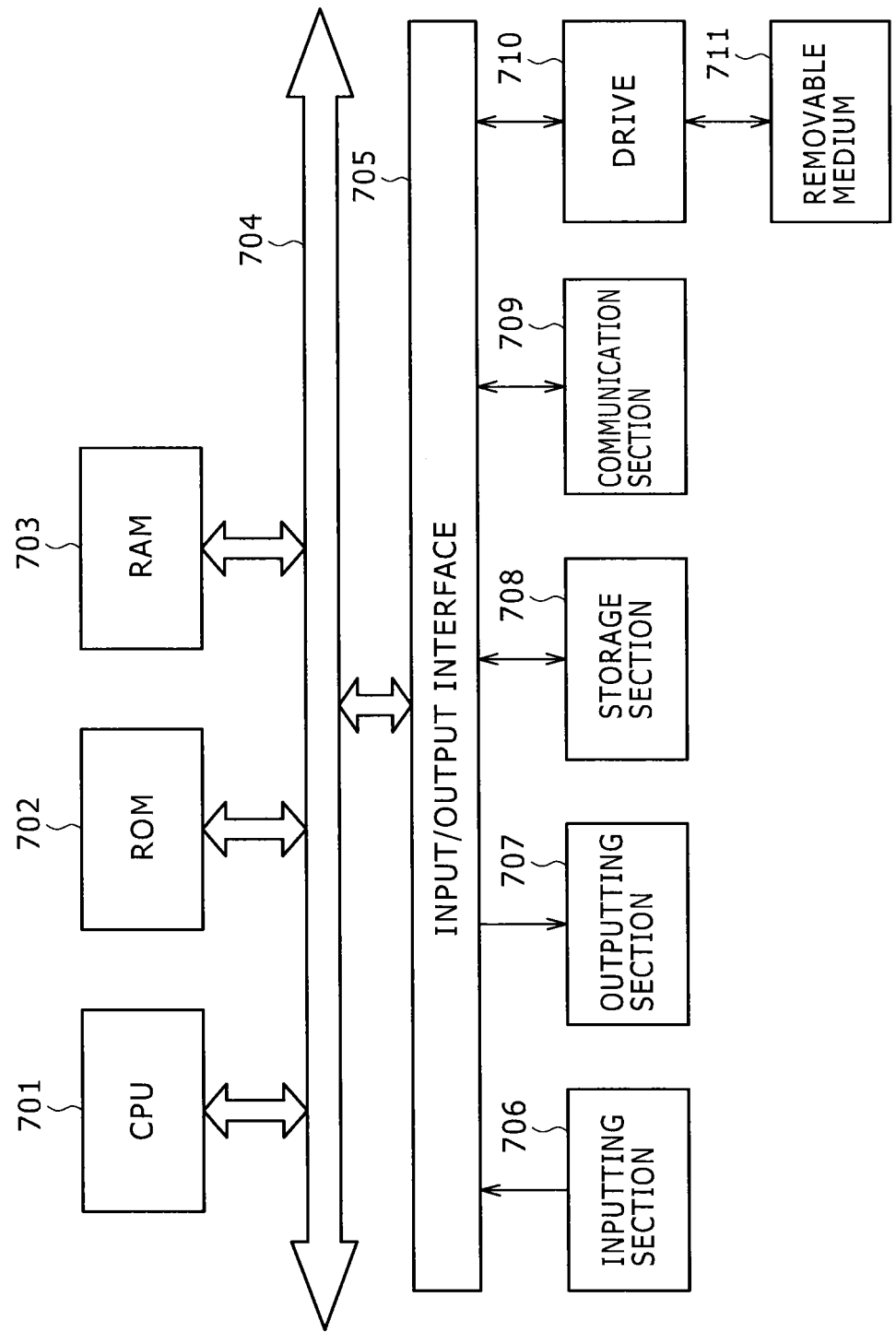
FIG. 29 is a block diagram showing an example of a hardware configuration of the host in the form of a reproduction apparatus.

It is to be noted that the server can be implemented by an apparatus having a hardware configuration similar to that, for example, of the host apparatus shown in FIG. 29.

11. Summary of the Configuration of the Present Disclosure

While the particular embodiments of the present disclosure have been described specifically, the present disclosure can be modified or altered in various manners based on the technical scope of the disclosure by those skilled in the art. In other words, the present disclosure has been given by way of illustration and shall not be interpreted restrictively. In order to decide the subject matter of the present disclosure, the claims should be referred to.

It is to be noted that the technology disclosed herein can have such configurations as described below.

(1) An information processing apparatus, including:
a data processing section configured to reproduce contents stored in a medium;
the medium having
a general purpose area in which encrypted contents and utilization controlling information corresponding to the encrypted contents are stored, and
a protected area configured from a plurality of blocks to which access limitation is set and which include a block in which an encryption key for decrypting the encrypted contents and information of a plurality of validity periods indicative of content utilization permission periods applied to the application contents of the encryption key are stored;
the data processing section being operable to
acquire the utilization controlling information of a reproduction object content from the general purpose area,
extract selection information of validity period information to be applied to the reproduction object content from within the information of the validity periods recorded in the block from the utilization controlling information, and
decide whether or not content reproduction is to be permitted by comparison between the validity period information selected from within the block and current date information in accordance with the selection information.

(2) The information processing apparatus according to (1) above, wherein
the utilization controlling information has stored therein
a block identifier of the block in which the encryption key for decrypting the encrypted contents is stored, and
an identifier of the validity period information to be applied to the reproduction object content;
the data processing section selects one block from within the protected area based on the block identifier; and
the data processing section selects validity period information to be applied to the reproduction object content from within the information of the validity periods recorded in the selected block based on the identifier of the validity period information.

(3) The information processing apparatus according to (1) or (2) above, wherein the validity period information recorded in the block in which the encryption key for decrypting the encrypted contents is stored and to which access limitation is set is applied commonly to a plurality of contents corresponding to a plurality of encryption keys recorded in the block.

(4) The information processing apparatus according to any one of (1) to (3) above, wherein the information of the validity periods recorded in the block includes validity period information for permitting content utilization on and after a prescribed date and validity period information for permitting content utilization on and before another prescribed date.

(5) The information processing apparatus according to any one of (1) to (4) above, wherein the data processing section carries out a process to which current date information acquired from a reliable time information providing server is applied when the comparison process between validity period information acquired from the utilization controlling information or the block and the current date information is carried out.

(6) The information processing apparatus according to any one of (1) to (5) above, wherein
the block in which the encryption key is stored is a block access to which is permitted based on access privilege decision by the medium; and
upon a data reading out process of the block, the data processing section transmits a certificate of the information processing apparatus to the medium and carries out data reading out of the block taking it as a condition that a data reading out privilege is confirmed by the access privilege decision by the medium.

(7) The information processing apparatus according to any one of (1) to (6) above, wherein
the block in which the encryption key is stored is a block access to which is permitted based on access privilege decision by the medium; and
the validity period information recorded in the block is written and updated by a server which has a privilege of a data writing process into the block.

(8) An information processing apparatus including:
a data processing section configured to record a content into a medium;
the medium having
a general purpose area in which encrypted contents and utilization controlling information corresponding to the encrypted contents are stored, and
a protected area configured from a plurality of blocks to which access limitation is set and which include a block in which an encryption key for decrypting the encrypted contents and information of a plurality of validity periods indicative of content utilization permission periods applied to the application contents of the encryption key are stored;
the data processing section
carrying out a process for recording an encrypted content and utilization controlling information corresponding to the encrypted content into the general purpose area,
recording an encryption key for decrypting encrypted contents recorded in the general purpose area into a block of the protected area,
carrying out a process for setting an identifier of validity period information to be selectively applied from within the information of the validity periods recorded in the block of the protected area to the utilization controlling information to be recorded into the general purpose area.

(9) The information processing apparatus according to (8) above, wherein
the block in which the encryption key is stored is a block access to which is permitted based on access privilege decision by the medium; and
upon a data recording process into the block, the data processing section transmits a certificate of the information processing apparatus to the medium and carries out the data recording process into the block taking it as a condition that it is confirmed that the information processing apparatus has a privilege of a data recording process by the access privilege decision by the medium.

(10) An information storage apparatus, including:
a data storage section;
the data storage section including
a general purpose area in which encrypted contents and utilization controlling information corresponding to the encrypted contents are stored, and
a protected area configured from a plurality of blocks to which access limitation is set and which include a block in which an encryption key for decrypting the encrypted contents and information of a plurality of validity periods indicative of content utilization permission periods applied to the application contents of the encryption key are stored;
the utilization controlling information having stored therein a block identifier of the block in which the encryption key for decrypting the encrypted contents is stored, and an identifier of validity period information to be applied to a reproduction object content;

the information processing apparatus causing a reproduction apparatus, which executes a reproduction process of the encrypted contents, to execute selection of the storage block of the encryption key and selection of validity period information to be applied based on recorded data of the utilization controlling information and carry out content reproduction permission/inhibition decision based on a referencing process to the selected validity period information.

(11) The information storage apparatus according to (10) above, further including a data processing section configured to acquire a certificate of an access requesting apparatus to a block of the protected area and carry out an access permission decision process based on the acquired certificate.

(12) An information processing system, including:

a medium configured to record data therein;

a reproduction apparatus configured to reproduce contents stored in the medium; and a server configured to carry out data recording into the medium;

the medium having a general purpose area in which encrypted contents and utilization controlling information corresponding to the encrypted contents are stored, and a protected area configured from a plurality of blocks to which access limitation is set and which include a block in which an encryption key for decrypting the encrypted contents and information of a plurality of validity periods indicative of content utilization permission periods applied to the application contents of the encryption key are stored;

the server being operable to carry out a process for recording the encrypted contents and the utilization controlling information corresponding to the encrypted contents into the general purpose area, record the encryption key for decrypting the encrypted contents recorded in the general purpose area into a block of the protected area, and carry out a process for setting an identifier of the validity period information to be selectively applied from within the information of the validity periods recorded in the block of the protected area to the utilization controlling information to be recorded into the general purpose area;

the reproduction apparatus being operable to acquire the utilization controlling information corresponding to the contents from the general purpose area, extract selection information of the validity period information to be applied to a reproduction object content from within the information of the validity periods recorded in the block from the utilization controlling information, and decide whether or not content reproduction is to be permitted based on comparison between the validity period information selected from within the block and current date information in accordance with the selection information.

Also methods of the processes executed in the apparatus and system described above and programs for executing the processes are included in the configurations of the present disclosure.

Further, the series of processes described hereinabove in the specification can be executed by hardware, software or a composite configuration of them. In the case where the series of processes is executed by software, a program in which a processing sequence is recorded is installed into a memory in a computer incorporated in hardware for exclusive use so as to be executed by the computer. Or the program may be installed into a computer for universal use which can execute various functions so as to be executed by the computer. For example, it is possible to record the program in advance into a recording medium. The program may be installed from the recording medium into a computer. Or, the program may be received through a network such as a LAN (Local Area Network) or the Internet and installed into a built-in recording medium such as a hard disk.

It is to be noted that the various processes described in the present disclosure may be processed in a time series in the order as described or may be executed in parallel or individually based on processing capacities of the component apparatus or as occasion demands. Again, in the present specification, the term "system" is used to represent a logical aggregate configuration of a plurality of apparatus and is not limited to a system wherein the component apparatus are accommodated in the same housing.

As described above, with the configurations of the embodiments of the present disclosure, apparatus and methods wherein validity period information corresponding to a block is set to an encryption key storage block of contents stored in a medium and setting and updating of a collective validity period of a plurality of contents can be carried out are implemented.

In particular, a content stored in a medium having a general purpose area in which encrypted contents and utilization controlling information are stored and a protected area configured from a plurality of blocks to which access limitation is set and which includes a block in which an encryption key for decrypting the encrypted contents is stored is reproduced. A reproduction apparatus acquires the utilization controlling information corresponding to a content from the general purpose area. Then, the reproduction apparatus decides, based on the recorded data of the utilization controlling information, whether validity period information indicative of a content utilization permission period is to be acquired from the utilization controlling information or the block in which the encryption key is stored. Then, the reproduction apparatus acquires the validity period information from the utilization controlling information or the block in response to a result of the decision and then decides permission or inhibition of content reproduction by comparison between the acquired validity period information and current date information.

By the processes, apparatus and methods which can set block-corresponding validity period information to the encryption key storage block of a content stored in the medium and carry out setting and updating of a collective validity period of a plurality of contents are implemented.

The present disclosure contains subject matter related to that disclosed in Japanese Priority Patent Application JP 2011-202185 filed in the Japan Patent Office on Sep. 15, 2011, the entire content of which is hereby incorporated by reference.

What is claimed is:

1. An information processing apparatus, comprising:

data processing circuitry configured to reproduce contents stored in a non-transitory computer-readable storage medium;

the non-transitory computer-readable storage medium having a general purpose area in which encrypted contents and utilization controlling information corresponding to the encrypted contents are stored, and a protected area configured from a plurality of blocks to which access limitation is set and which include a block in which an encryption key for decrypting the encrypted contents and information of a plurality of validity periods indicative of content utilization permission periods applied to application contents of the encryption key are stored;

said data processing circuitry being further configured to acquire the utilization controlling information of a reproduction object content from the general purpose area, extract selection information of validity period information to be applied to the reproduction object content from within the information of the validity periods recorded in the block included in the protected area configured from the plurality of blocks, from the utilization controlling information, and decide whether or not content reproduction is to be permitted by comparison between the validity period information selected from within the block included in the protected area configured from the plurality of blocks, and current date information in accordance with the selection information, wherein the validity period information includes at least one of at least a first content validity period set for at least a first content recorded in the utilization controlling information, and at least a block-corresponding validity period set commonly for a plurality of contents, and wherein the decision whether or not content reproduction is to be permitted is based on a reading of both said at least the first content validity period and said at least the block-corresponding validity period, such that one of the validity periods can be selectively applied to permit the content reproduction.

2. The information processing apparatus according to claim 1, wherein the utilization controlling information has stored therein a block identifier of the block in which the encryption key for decrypting the encrypted contents is stored, and an identifier of the validity period information to be applied to the reproduction object content;

said data processing circuitry being further configured to select one block from within the protected area based on the block identifier; and said data processing circuitry being further configured to select validity period information to be applied to the reproduction object content from within the information of the validity periods recorded in the selected block based on the identifier of the validity period information.

3. The information processing apparatus according to claim 1, wherein the validity period information recorded in the block in which the encryption key for decrypting the encrypted contents is stored and to which access limitation is set is applied commonly to a plurality of contents corresponding to a plurality of encryption keys recorded in the block.

4. The information processing apparatus according to claim 1, wherein the information of the validity periods recorded in the block includes validity period information for permitting content utilization on and after a prescribed date and validity period information for permitting content utilization on and before another prescribed date.

5. The information processing apparatus according to claim 1, wherein said data processing circuitry being further configured to carry out a process to which current date information acquired from a reliable time information providing server is applied when the comparison process between validity period information acquired from the utilization controlling information or the block and the current date information is carried out.

6. The information processing apparatus according to claim 1, wherein the block in which the encryption key is stored is a block access to which is permitted based on access privilege decision by the medium; and upon a data reading out process of the block, said data processing circuitry being further configured to transmit a certificate of the information processing apparatus to the non-transitory computer-readable storage medium and to carry out data reading out of the block taking it as a condition that a data reading out privilege is confirmed by the access privilege decision by the non-transitory computer-readable storage medium.

7. The information processing apparatus according to claim 1, wherein the block in which the encryption key is stored is a block access to which is permitted based on access privilege decision by the medium; and the validity period information recorded in the block is written and updated by a server which has a privilege of a data writing process into the block.

8. An information processing apparatus, comprising:

data processing circuitry configured to record a content into a non-transitory computer-readable storage medium;

said non-transitory computer-readable storage medium having a general purpose area in which encrypted contents and utilization controlling information corresponding to the encrypted contents are stored, and a protected area configured from a plurality of blocks to which access limitation is set and which include a block in which an encryption key for decrypting the encrypted contents and information of a plurality of validity periods indicative of content utilization permission periods applied to application contents of the encryption key are stored;

said data processing circuitry being further configured to carry out a process for recording an encrypted content and utilization controlling information corresponding to the encrypted content into the general purpose area, record an encryption key for decrypting encrypted contents recorded in the general purpose area into the block of the protected area configured from the plurality of blocks, and carry out a process for setting an identifier of validity period information to be selectively applied from within the information of the validity periods recorded in the block of the protected area configured from the plurality of blocks to the utilization controlling information to be recorded into the general purpose area, wherein the validity period information includes at least one of at least a first content validity period set for at least a first content recorded in the utilization controlling information, and at least a block-corresponding validity period set commonly for a plurality of contents, and wherein a decision whether or not a content reproduction is to be permitted is based on a reading of both said at least the first content validity period and said at least the block-corresponding validity period, such that one of the validity periods can be selectively applied to permit the content reproduction.

9. The information processing apparatus according to claim 8, wherein
the block in which the encryption key is stored is a block to which access is permitted based on access privilege decision by the medium; and
upon a data recording process into the block, the data processing circuitry being further configured to transmit a certificate of the information processing apparatus to the non-transitory computer-readable storage medium and to carry out the data recording process into the block taking it as a condition that it is confirmed that the information processing apparatus has a privilege of a data recording process by the access privilege decision by the non-transitory computer-readable storage medium.

10. An information storage apparatus, comprising:
data storage circuitry;
said data storage circuitry including
a general purpose area in which encrypted contents and utilization controlling information corresponding to the encrypted contents are stored, and
a protected area configured from a plurality of blocks to which access limitation is set and which include a block of the plurality of blocks in which an encryption key for decrypting the encrypted contents and information of a plurality of validity periods indicative of content utilization permission periods applied to application contents of the encryption key are stored;
the utilization controlling information having stored therein
a block identifier of the block of the plurality of blocks in which the encryption key for decrypting the encrypted contents is stored, and
an identifier of validity period information to be applied to a reproduction object content; and
the information processing apparatus causing a reproduction apparatus, which executes a reproduction process of the encrypted contents, to execute selection of the block of the plurality of blocks of the encryption key and selection of validity period information to be applied based on recorded data of the utilization controlling information and carry out content reproduction permission/inhibition decision based on a referencing process to the selected validity period information,
wherein the validity period information includes at least one of at least a first content validity period set for at least a first content recorded in the utilization controlling information, and at least a block-corresponding validity period set commonly for a plurality of contents, and
wherein the decision whether or not the content reproduction is to be permitted is based on a reading of both said at least the first content validity period and said at least the block-corresponding validity period, such that one of the validity periods can be selectively applied to permit the content reproduction.

11. The information storage apparatus according to claim 10, further comprising data processing circuitry configured to acquire a certificate of an access requesting apparatus to the block of the plurality of blocks of the protected area and to carry out an access permission decision process based on the acquired certificate.

12. An information processing system, comprising:
a non-transitory computer-readable storage medium configured to record data therein;
a reproduction apparatus configured to reproduce contents stored in said non-transitory computer-readable storage medium; and
a server configured to carry out data recording into said non-transitory computer-readable storage medium;
said non-transitory computer-readable storage medium having
a general purpose area in which encrypted contents and utilization controlling information corresponding to the encrypted contents are stored, and
a protected area configured from a plurality of blocks to which access limitation is set and which include a block of the plurality of blocks in which an encryption key for decrypting the encrypted contents and information of a plurality of validity periods indicative of content utilization permission periods applied to application contents of the encryption key are stored;
said server being configured to
carry out a process for recording the encrypted contents and the utilization controlling information corresponding to the encrypted contents into the general purpose area,
record the encryption key for decrypting the encrypted contents recorded in the general purpose area into the block of the plurality of blocks of the protected area, and
carry out a process for setting an identifier of the validity period information to be selectively applied from within the information of the validity periods recorded in the block of the plurality of blocks of the protected area to the utilization controlling information to be recorded into the general purpose area;
said reproduction apparatus being configured to
acquire the utilization controlling information corresponding to the contents from the general purpose area,
extract selection information of the validity period information to be applied to a reproduction object content from within the information of the validity periods recorded in the block of the plurality of blocks from the utilization controlling information, and
decide whether or not content reproduction is to be permitted based on comparison between the validity period information selected from within the block of the plurality of blocks and current date information in accordance with the selection information,
wherein the validity period information includes at least one of at least a first content validity period set for at least a first content recorded in the utilization controlling information, and at least a block-corresponding validity period set commonly for a plurality of contents, and
wherein the decision whether or not content reproduction is to be permitted is based on a reading of both said at least the first content validity period and said at least the block-corresponding validity period, such that one of the validity periods can be selectively applied to permit the content reproduction.

13. An information processing method executed by an information processing apparatus that executes a content reproduction process and has data processing circuitry configured to reproduce contents stored in a non-transitory computer-readable storage medium, which has a general purpose area in which encrypted contents and utilization controlling information corresponding to the encrypted contents are stored and a protected area configured from a plurality of blocks to which access limitation is set and which include a block in which an encryption key for decrypting the encrypted contents and information of a plurality of validity periods indicative of content utilization permission periods applied to application contents of the encryption key are stored, the information processing method being executed by the data processing circuitry and comprising:

acquiring, using the data processing circuitry, the utilization controlling information of a reproduction object content from the general purpose area;

extracting, using the data processing circuitry, selection information of validity period information to be applied to the reproduction object content from within the information of the validity periods recorded in the block of the plurality of blocks from the utilization controlling information; and deciding, using the data processing circuitry, whether or not content reproduction is to be permitted based on comparison between the validity period information selected from within the block of the plurality of blocks and current date information in accordance with the selection information, wherein the validity period information includes at least one of at least a first content validity period set for at least a first content recorded in the utilization controlling information, and at least a block-corresponding validity period set commonly for a plurality of contents, and wherein the deciding whether or not content reproduction is to be permitted is based on a reading of both said at least the first content validity period and said at least the block-corresponding validity period, such that one of the validity periods can be selectively applied to permit the content reproduction.

14. An information processing method executed by an information processing apparatus which carries out a content recording process into a non-transitory computer-readable storage medium, which has a general purpose area in which encrypted contents and utilization controlling information corresponding to the encrypted contents are stored and a protected area configured from a plurality of blocks to which access limitation is set and which include a block in which an encryption key for decrypting the encrypted contents and information of a plurality of validity periods indicative of content utilization permission periods applied to application contents of the encryption key are stored, the information processing method being executed by the information processing apparatus and comprising:

carrying out a process, using circuitry, for recording an encrypted content and utilization controlling information corresponding to the encrypted content into the general purpose area;

recording, using the circuitry, an encryption key for decrypting encrypted contents recorded in the general purpose area into the block of the plurality of blocks in the protected area; and carrying out a process, using the circuitry, for setting an identifier of validity period information to be selectively applied from within the information of the validity periods recorded in the block of the plurality of blocks of the protected area to the utilization controlling information to be recorded into the general purpose area, wherein the validity period information includes at least one of at least a first content validity period set for at least a first content recorded in the utilization controlling information, and at least a block-corresponding validity period set commonly for a plurality of contents, and wherein a decision whether or not a content reproduction is to be permitted is based on a reading of both said at least the first content validity period and said at least the block-corresponding validity period, such that one of the validity periods can be selectively applied to permit the content reproduction.

15. A non-transitory computer-readable storage medium including executable program instructions stored therein that, when executed, cause an information process to be executed by an information processing apparatus that executes a content reproduction process and has data processing circuitry configured to reproduce contents stored in the non-transitory computer-readable storage medium, wherein the non-transitory computer-readable storage medium has a general purpose area in which encrypted contents and utilization controlling information corresponding to the encrypted contents are stored and a protected area configured from a plurality of blocks to which access limitation is set and which include a block in which an encryption key for decrypting the encrypted contents and information of a plurality of validity periods indicative of content utilization permission periods applied to application contents of the encryption key are stored, the program instructions stored therein further causing the data processing circuitry to execute:

a process, using the data processing circuitry, for acquiring the utilization controlling information of a reproduction object content from the general purpose area;

a process, using the data processing circuitry, for extracting selection information of validity period information to be applied to the reproduction object content from within the information of the validity periods recorded in the block of the plurality of blocks from the utilization controlling information; and a process, using the data processing circuitry, for deciding whether or not content reproduction is to be permitted based on comparison between the validity period information selected from within the block of the plurality of blocks and current date information in accordance with the selection information, wherein the validity period information includes at least one of at least a first content validity period set for at least a first content recorded in the utilization controlling information, and at least a block-corresponding validity period set commonly for a plurality of contents, and wherein the decision whether or not the content reproduction is to be permitted is based on a reading of both said at least the first content validity period and said at least the block-corresponding validity period, such that one of the validity periods can be selectively applied to permit the content reproduction.

16. A non-transitory computer-readable storage medium including executable program instructions stored therein that, when executed, cause an information process to be executed by an information processing apparatus that carries out a content recording process into the non-transitory computer-readable storage medium, wherein the non-transitory computer-readable storage medium has a general purpose area in which encrypted contents and utilization controlling information corresponding to the encrypted contents are stored and a protected area configured from a plurality of blocks to which access limitation is set and which include a block in which an encryption key for decrypting the encrypted contents and information of a plurality of validity periods indicative of content utilization permission periods applied to application contents of the encryption key are stored, the program instructions stored therein further causing the information processing apparatus to execute:

a process, using circuitry, for recording an encrypted content and utilization controlling information corresponding to the encrypted content into the general purpose area;

a process, using the circuitry, for recording an encryption key for decrypting encrypted contents recorded in the general purpose area into the block of the plurality of blocks in the protected area; and a process, using the circuitry, for setting an identifier of validity period information to be selectively applied from within the information of the validity periods recorded in the block of the plurality of blocks of the protected area to the utilization controlling information to be recorded into the general purpose area, wherein the validity period information includes at least one of at least a first content validity period set for at least a first content recorded in the utilization controlling information, and at least a block-corresponding validity period set commonly for a plurality of contents, and wherein a decision whether or not a content reproduction is to be permitted is based on a reading of both said at least the first content validity period and said at least the block-corresponding validity period, such that one of the validity periods can be selectively applied to permit the content reproduction.

* * * * *